(12) United States Patent
Terada et al.

(10) Patent No.: US 9,530,031 B2
(45) Date of Patent: Dec. 27, 2016

(54) POSITION DETECTION SYSTEM

(75) Inventors: Takahide Terada, Tokyo (JP); Hiroshi Shinoda, Tokyo (JP); Kazunori Hara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 239 days.

(21) Appl. No.: 14/363,571

(22) PCT Filed: Dec. 9, 2011

(86) PCT No.: PCT/JP2011/078545
§ 371 (c)(1),
(2), (4) Date: Jun. 6, 2014

(87) PCT Pub. No.: WO2013/084349
PCT Pub. Date: Jun. 13, 2013

(65) Prior Publication Data
US 2014/0354417 A1 Dec. 4, 2014

(51) Int. Cl.
*G06K 7/10* (2006.01)
*H04W 64/00* (2009.01)
*H01Q 13/22* (2006.01)
*G01S 11/06* (2006.01)
*H01Q 1/12* (2006.01)
*H01Q 1/24* (2006.01)
*H01Q 21/00* (2006.01)
(Continued)

(52) U.S. Cl.
CPC .............. *G06K 7/10* (2013.01); *G01S 11/06* (2013.01); *H01Q 1/125* (2013.01); *H01Q 1/246* (2013.01);
(Continued)

(58) Field of Classification Search
CPC .......... G01S 11/06; G06K 7/10; H01Q 13/22; H01Q 21/0043; H01L 23/552
(Continued)

(56) References Cited

U.S. PATENT DOCUMENTS 4,932,617 A 6/1990 Heddebaut et al.
7,145,502 B2 * 12/2006 Uebo .................... G01S 13/887
342/118
(Continued)

FOREIGN PATENT DOCUMENTS

EP 1 077 536 A2 2/2001
JP 63-164636 A 7/1988
(Continued)

OTHER PUBLICATIONS

International Search Report (PCT/ISA/210) dated Jan. 24, 2012 with English translation thereof {Nine (9) pages}.
(Continued)

*Primary Examiner* — Steven Lim
*Assistant Examiner* — Mancil Littlejohn, Jr.
(74) *Attorney, Agent, or Firm* — Crowell & Moring LLP

(57) ABSTRACT

An electromagnetic wave propagation medium 1 extends in the propagation direction of an electromagnetic wave and has an electromagnetic wave propagation space sandwiched between conductors in the direction perpendicular to the electromagnetic wave propagation direction. A base unit 2 and multiple terminals 3 are placed on the electromagnetic wave propagation medium 1. When the position of a terminal 3 is detected, the base unit 2 transmits a position detection signal through the electromagnetic wave propagation medium 1 to the terminal 3. This position detection signal is attenuated more heavily during its propagation through the electromagnetic wave propagation medium 1 than a communication signal for use in normal communication is. The signal strength of the position detection signal drops as it moves away from the base unit 2. Hence the position of each terminal 3 can be detected based on the signal strength of the position detection signal received by each terminal 3.

13 Claims, 29 Drawing Sheets

(52) U.S. Cl.
CPC .......... *H01Q 13/22* (2013.01); *H01Q 21/0043* (2013.01)

(58) Field of Classification Search
USPC .. 340/10.1–10.6, 572.1–572.9, 8.1; 343/771, 343/711; 342/175, 70; 333/136, 333/137.24
See application file for complete search history.

(56) References Cited

U.S. PATENT DOCUMENTS

| | | | |
|---|---|---|---|
| 2009/0085746 A1 | 4/2009 | Erickson et al. | |
| 2010/0164827 A1* | 7/2010 | Miyagawa | H01Q 13/28 343/843 |

FOREIGN PATENT DOCUMENTS

| | | | | |
|---|---|---|---|---|
| JP | EP 1077536 A2 * | 2/2001 | ............ | G01S 13/74 |
| JP | 2001-60905 A | 3/2001 | | |
| JP | 2005-109700 A | 4/2005 | | |
| JP | 2007-127529 A | 5/2007 | | |
| JP | 2009-105600 A | 5/2009 | | |
| JP | 2010-541396 A | 12/2010 | | |

OTHER PUBLICATIONS

Japanese-language Written Opinion (PCT/ISA/210) dated Jan. 24, 2012 {Five (5) pages}.

Japanese Office Action dated Apr. 7, 2015, with partial English translation (six (6) pages).

* cited by examiner

FIG. 18

|  | Distance from | | |
|---|---|---|---|
|  | 3f | 3l | 3t |
| to 3m | d1×2 | d1×1 | d1×2 |
| to 3l | d1×3 | — | d1×3 |
| to 3t | d1×3 | d1×3 | — |

FIG. 24
| OPERATIONS OF TERMINALS 3a, 3b, 3c, 3e and 3f | All OFF | 3a ON | 3b ON | 3c ON | 3e ON | 3f ON |
|---|---|---|---|---|---|---|
| SIGNAL STRENGTH OF TERMINAL 3d (RELATIVE VALUE) [dB] | 0 | −3 | −3 | −3 | 0 | 0 |
FIG. 25
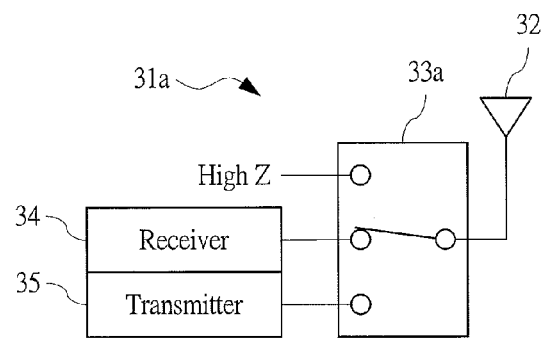
FIG. 26
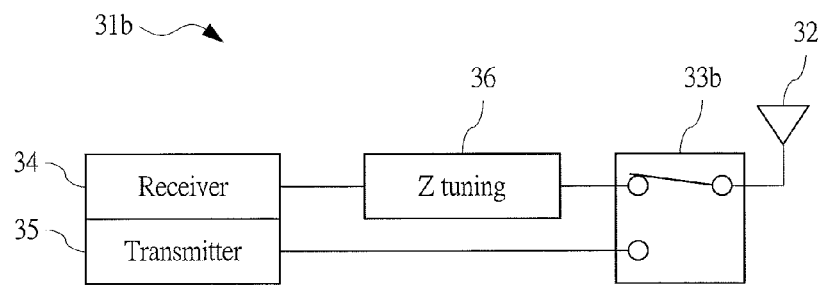

POSITION DETECTION SYSTEM

TECHNICAL FIELD

The present invention relates to a position detection system, particularly to technique that effectively applies to position detection of a communication device placed near an electromagnetic wave propagation medium, such as a waveguide or electromagnetic wave transmission sheet that propagates electromagnetic waves.

BACKGROUND ART

For example, Japanese Patent Application Laid-Open Publication No. 2009-105600 (Patent Document 1) discloses a position estimating apparatus that includes a sheet-like signal transmission device and two communication devices placed at given positions near the sheet-like signal transmitting device. According to this position estimating apparatus, a first communication device transmits a presence confirmation request signal to a second communication device, the second communication device having received the presence confirmation request signal transmits a presence confirmation response signal to the first communication device, and the sheet-like signal transmitting device estimates the position at which the second communication device is placed, based on a time that has passed from transmission of the presence confirmation request signal by the first communication device to reception of the presence confirmation response signal by the same.

Japanese Patent Application Laid-Open Publication No. 2007-127529 (Patent Document 2) discloses an apparatus including electromagnetic wave transmitting means, a measurement subject, and detecting means that detect signal strength. According to this apparatus, the detecting means detect the signal strength of a synthesized wave signal created by synthesizing an electromagnetic wave transmitted from the transmitting means and a reflected wave resulting from reflection of the electromagnetic wave by the measurement subject, and the distance of the measurement subject is calculated from the detected signal strength.

Japanese Patent Application Laid-Open Publication No. 2001-60905 (Patent Document 3) discloses a position detection method for a system including a receiver and a transmitter having two antennas. According to this position detection method, the transmitter transmits electromagnetic waves with a changed interference pattern from two antennas, as an interference wave, the receiver receives the incoming interference wave and feeds back information of the strength of a received electric field to the transmitter, and the transmitter detects the position of the receiver based on the feedback information from the receiver.

CITATION LIST

Patent Documents

Patent Document 1: Japanese Patent Application Laid-Open Publication No. 2009-105600
Patent Document 2: Japanese Patent Application Laid-Open Publication No. 2007-127529
Patent Document 3: Japanese Patent Application Laid-Open Publication No. 2001-60905

DISCLOSURE OF THE INVENTION

Problems to be Solved by the Invention

The position estimating apparatus described in Patent Document 1 carries out position estimation based on a time of transmission of a signal between two communication devices. However, the precision of position estimation depends on the precision of time resolution by the communication devices. Realizing highly precise position estimation, therefore, requires higher communication device costs. In addition, the second communication device carries out signal processing during a period between signal reception and signal transmission and a time required for this signal processing results in an error in position estimation.

The distance measuring apparatus described in Patent Document 2 measures the distance between the electromagnetic wave transmitting means and the measurement subject that reflects an electromagnetic wave, using a synthesized wave created by synthesizing two electromagnetic waves. This Patent Document, however, does not disclose any technique that applies to a case where the measurement subject is a communication device. Patent Document 2 proposes a measurement principle utilizing a synthesized wave but does not disclose any technique related to a specific mean, configuration, method, etc., that applies to an electromagnetic wave transmitting apparatus using an electromagnetic wave propagation medium.

The position detection method described in Patent Document 3 is executed to detect the position of the receiver using an interference pattern of electromagnetic waves. However, this Patent Document proposes a detection principle utilizing an interference pattern but does not disclose any technique related to a specific mean, configuration, method, etc., that applies to an electromagnetic wave transmitting apparatus using an electromagnetic wave propagation medium.

A preferred aim of the present invention is to provide an apparatus, a method, and a system for detecting the position of a communication device disposed near an electromagnetic wave propagation medium.

Another preferred aim of the present invention is to provide an apparatus, a method, and a system by which the position of each communication device is identified in a communication system including multiple communication devices arranged near an electromagnetic propagation medium at regular intervals.

The above and other preferred aims and novel characteristics of the present invention will be apparent from the description of the present specification and the accompanying drawings.

Means for Solving the Problems

The typical ones of the inventions disclosed in the present application will be briefly described as follows.

A position detection system according to a typical embodiment includes: an electromagnetic wave propagation medium; and a plurality of communication devices placed near the electromagnetic wave propagation medium. In the position detection system, the plurality of communication devices include a first communication device whose position is known in advance. And, the first communication device transmits a first position detection signal through the electromagnetic wave propagation medium to the plurality of communication devices other than the first communication device and detects positions of a plurality of the communication devices other than the first communication device based on reception signal strength of the first position detection signal. The first position detection signal is different in frequency from a communication signal used for communication carried out between the plurality of communication devices through the electromagnetic wave propagation medium, and is attenuated more heavily during its propagation through the electromagnetic wave propagation medium than the communication signal is.

In addition, a position detection system according to another typical embodiment includes: an electromagnetic wave propagation medium; and a plurality of communication devices placed near the electromagnetic wave propagation medium. In the position detection system, the plurality of communication devices include a first communication device whose position is known in advance. And when a position of a second communication device among the plurality of communication devices is detected, the first communication device transmits a position detection signal multiple times through the electromagnetic wave propagation medium to the second communication device as reception states of a plurality of the communication devices other than the first and second communication devices are switched, and the position of the second communication device is detected based on signal reception strength of the position detection signal received by the second communication device multiple times.

Moreover, in a position detection system according to still another typical embodiment, when detection of positions of the plurality of communication devices placed near the electromagnetic wave propagation medium is carried out, an interference wave is used, the interference wave being generated out of two or more electromagnetic waves in the electromagnetic wave propagation medium.

Effects of the Invention

The effects obtained by typical aspects of the present invention will be briefly described below.

The position of a device near electromagnetic wave propagation medium can be detected accurately.

BRIEF DESCRIPTIONS OF THE DRAWINGS

FIG. 18 is an explanatory diagram of a method of identifying a terminal;

FIG. 24 is a table indicating signal strength values for a position detection signal received by a certain terminal in the position detection system of FIG. 23;

FIG. 25 is an explanatory diagram of a configuration example of a communication device incorporated in each terminal used by the position detection system according to the third embodiment of the present invention;

FIG. 26 is an explanatory diagram of another configuration example of the communication device incorporated in each terminal used by the position detection system according to the third embodiment of the present invention;

Figure 31:
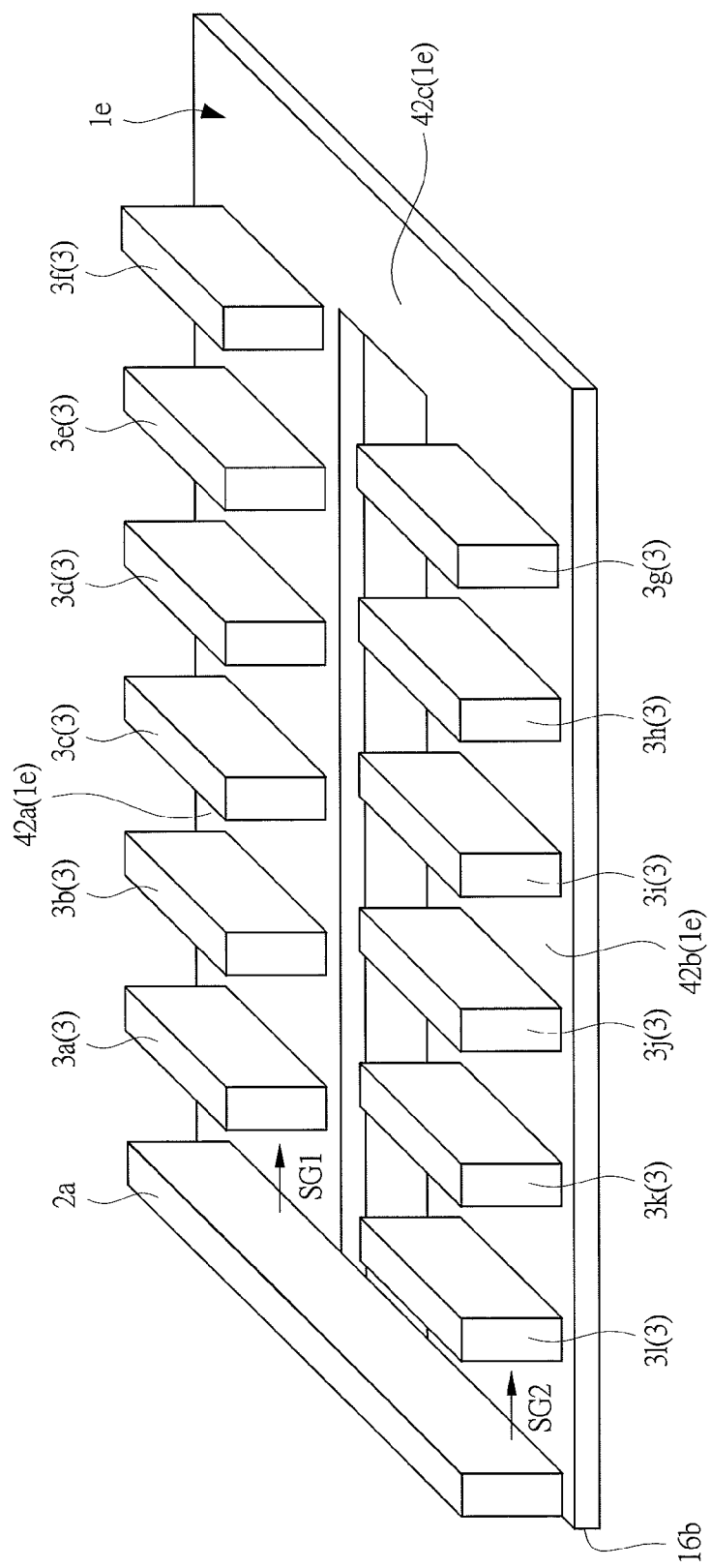
Figure 32:
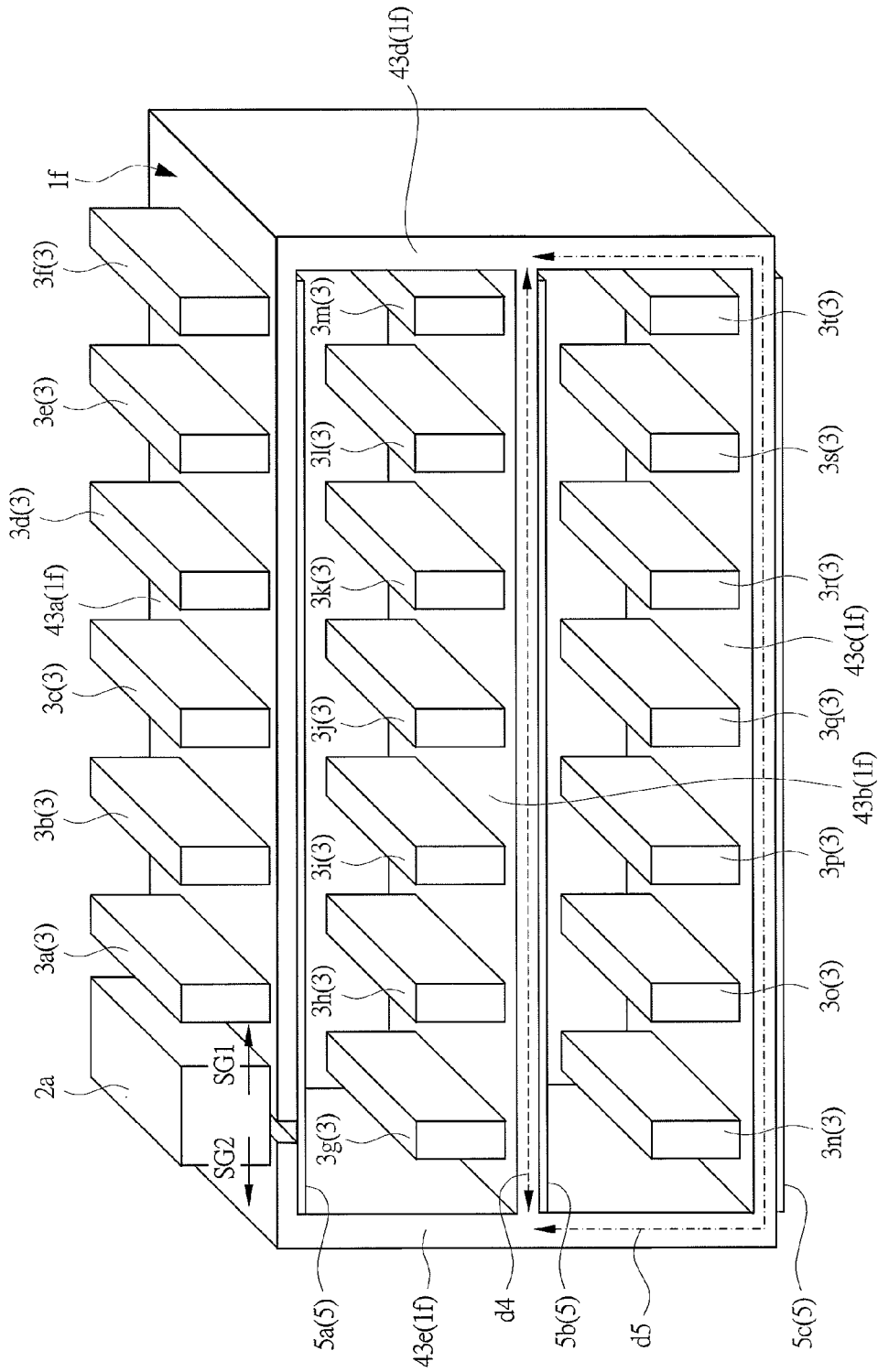

FIG. 31 is an explanatory diagram of still another configuration example of the position detection system according to the fourth embodiment of the present invention; and FIG. 32 is an explanatory diagram (perspective view) of a configuration example of the position detection system in which the base unit and terminals are housed in the housing and the electromagnetic wave propagation medium is placed in the housing.

DESCRIPTIONS OF THE PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable. Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Also, in the following embodiments, mentioning "conductor" means a material being conductive in the electromagnetic wave frequency range used in propagation of electromagnetic waves. Mentioning "dielectric" means a material being dielectric in the electromagnetic wave range used in propagation of electromagnetic waves. Thus, using a conductor, a semiconductor, an insulator, or else to direct current does not directly limit anything. In addition, conductor and dielectric are designed in accordance with their characteristics in relation with electromagnetic waves. Thus, aspects like being rigid, liquid, gas or else or component materials are not limited.

Also, in some drawings used in the embodiments, hatching is not used even in a cross-sectional view so as to make the drawings easy to see. In addition, in some drawings used in the embodiments, hatching is used even in a plan view so as to make the drawings easy to see. Also, components having the same function are denoted by the same reference symbols throughout the drawings for describing the embodiments, and a repetitive description thereof is omitted. In addition, the description of the same or similar portions is not repeated in principle unless particularly required in the following embodiments.

(First Embodiment)

A first embodiment of the present invention will be described by explaining examples of a position detection system (position detection apparatus) that detects the position of a communication device placed (disposed) near an electromagnetic wave propagation medium or of a position detection method, referring to the drawings.

Figure 1:
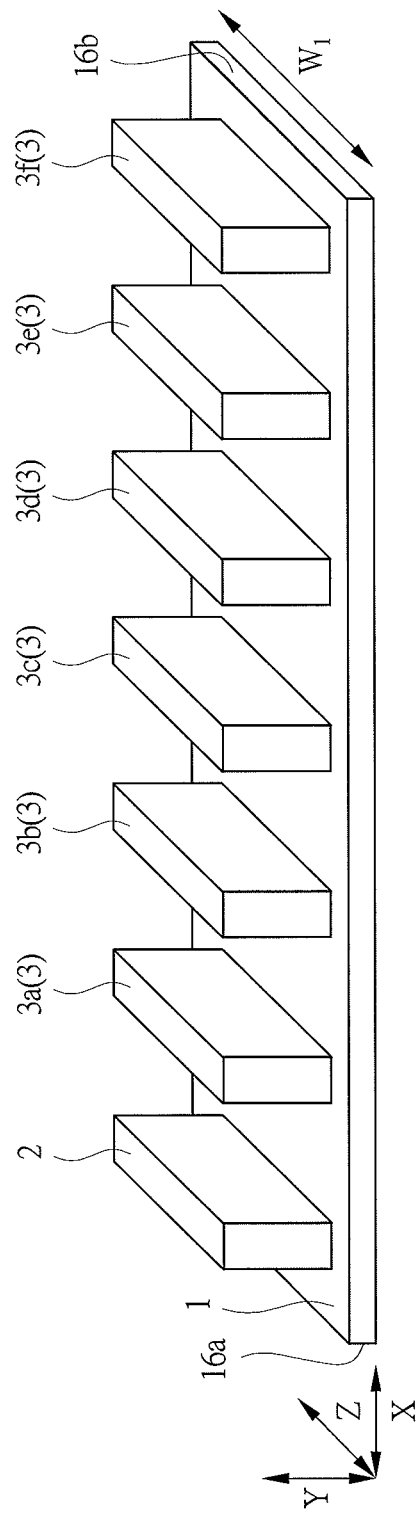
FIG. 1 is a perspective view of a configuration example of a position detection system (position detection apparatus) according to a first embodiment of the present invention.

FIG. 1 is a perspective view of a configuration example of the position detection system.

In the position detection system, a plurality of communication devices (base unit 2 and terminals 3) are placed (disposed) near an electromagnetic wave propagation medium 1. Each of the communication devices (base unit 2 and terminals 3) is capable of transmitting or receiving an electromagnetic wave (signal) propagated through the electromagnetic wave propagation medium 1. The position detection system will hereinafter be described in detail.

As shown in FIG. 1, the base unit 2 and terminals 3, i.e., communication devices (electromagnetic wave transmitting apparatuses) are placed on the electromagnetic wave propagation medium 1. The base unit 2 and the terminals 3 transmit/receive electromagnetic waves (signals) to/from each other through the electromagnetic wave propagation medium 1 thereby communicate with each other. At least one terminal 3 is placed on the electromagnetic wave propagation medium 1. Preferably, multiple terminals 3 be placed on the electromagnetic wave propagation medium 1. These base unit 2 and terminals 3 are placed (arranged) in a row on the electromagnetic wave propagation medium 1. In the example of FIG. 1, six terminals 3a, 3b, 3c, 3d, 3e, and 3f are placed as the terminals 3 on the electromagnetic wave propagation medium 1. However, the number of the terminals 3 placed on the electromagnetic wave propagation medium 1 is not limited to six and may be changed on a necessary basis.

Each of the base unit 2 and terminals 3 is capable of inputting (transmitting) an electromagnetic wave to the electromagnetic wave propagation medium 1 and of extracting an electromagnetic wave from the electromagnetic wave propagation medium 1 (receiving an electromagnetic wave output from the electromagnetic wave propagation medium 1). An electromagnetic wave input from the base unit 2 or terminal 3 to the electromagnetic wave propagation medium 1 propagates (travels) through the electromagnetic wave propagation medium 1.

Hence, an electromagnetic wave input from the base unit 2 to the electromagnetic wave propagation medium 1 propagates (travels) through the electromagnetic wave propagation medium 1, and the terminal 3 receives the incoming electromagnetic wave. Alternately, an electromagnetic wave input from the terminal 3 to the electromagnetic wave propagation medium 1 propagates (travels) through the electromagnetic wave propagation medium 1, and the base unit 2 receives the incoming electromagnetic wave. In this manner, the base unit 2 and the terminal 3 transmit an electromagnetic wave to/from each other (transmit/receive, communicate with each other) through the electromagnetic wave propagation medium 1.

In another configuration, an electromagnetic wave input from the terminal 3 to the electromagnetic wave propagation medium 1 and propagating therethrough is received (extracted) by a different terminal 3. In this configuration, an electromagnetic wave is transmitted to/from each other (transmitted/receive, communication is made) between different terminals 3 through the electromagnetic wave propagation medium 1.

As it will be described later, when the position of the base unit 2 is known in advance, the position of each terminal 3 (position information) can be detected based on the position of the base unit 2 defined as a reference position. The system (apparatus) including the base unit 2 and terminals 3 placed on the electromagnetic wave propagation medium 1, therefore, may be regarded as a position detection system (position detection apparatus). The system (apparatus) including the base unit 2 and terminals 3 placed on the electromagnetic between the base unit 2 and the terminals 3 or between different terminals 3. The system, therefore, may also be regarded as a communication system (communication apparatus). The system (apparatus) including the base unit 2 and terminals 3 placed on the electromagnetic wave propagation medium 1 has both communication function and position detection function. The system, therefore, may also be regarded as a communication system (communication apparatus) having a position detection function.

Figure 2:
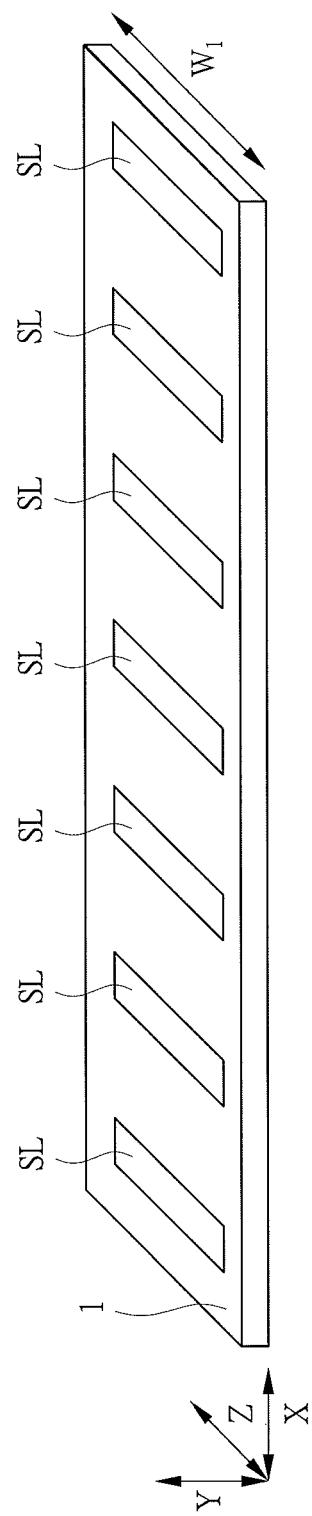
FIG. 2 is a perspective view of a configuration example of an electromagnetic wave propagation medium used in the position detection system of FIG. 1.
Figure 3:
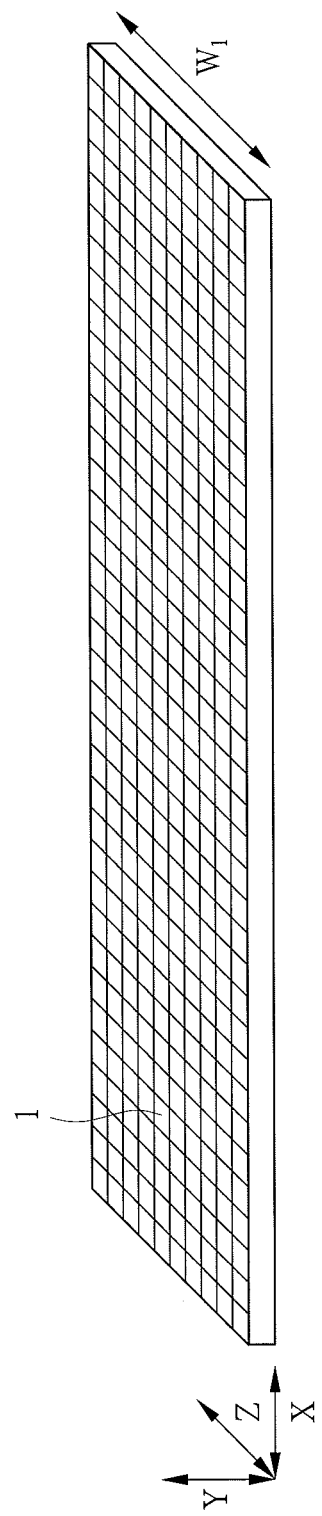
FIG. 3 is a perspective view of another configuration example of the electromagnetic wave propagation medium used in the position detection system of FIG. 1.
Figure 4:
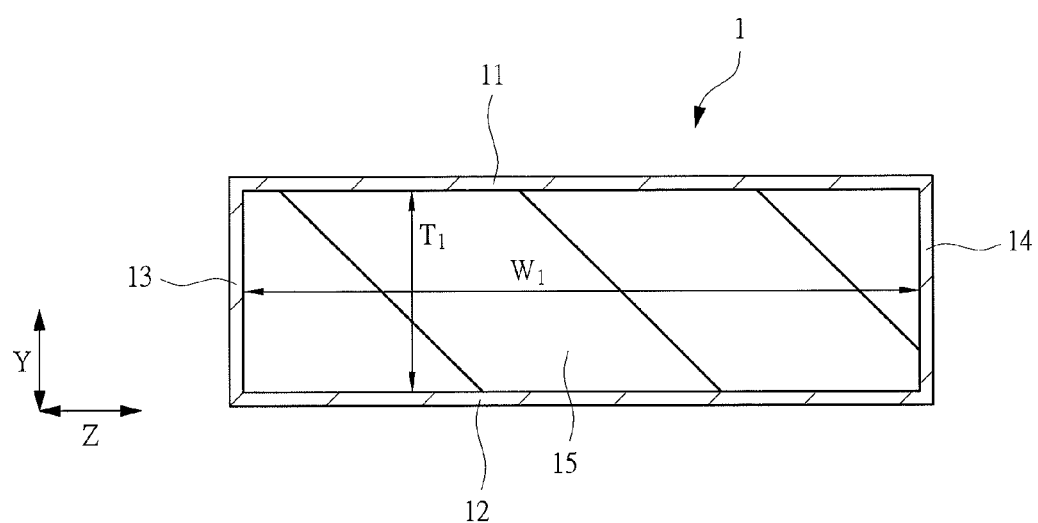
FIG. 4 is a cross-sectional view of the electromagnetic wave propagation medium of FIG. 3 or 4.
Figure 5:
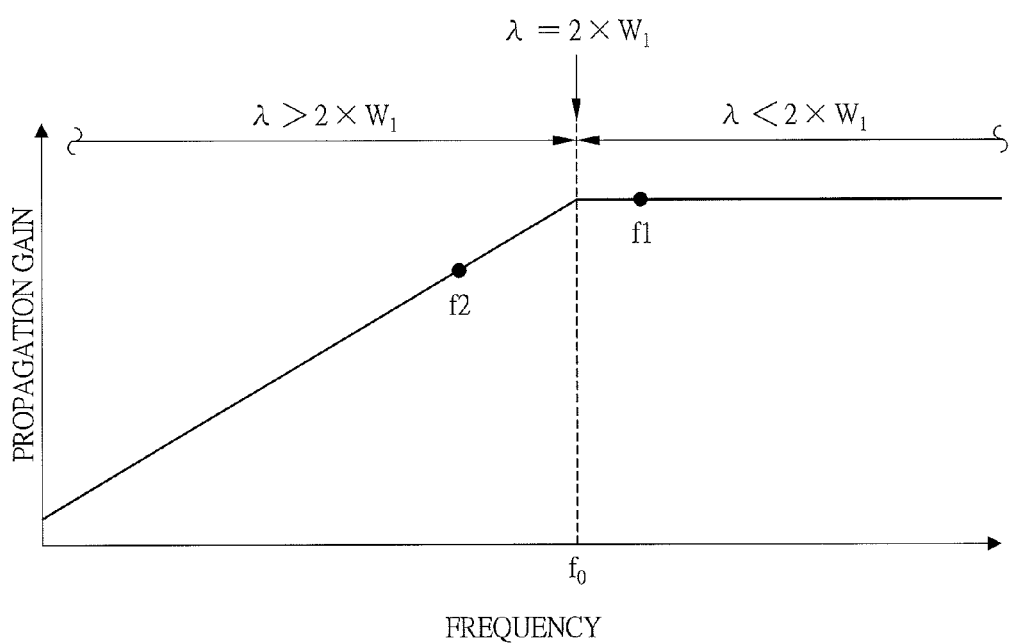
FIG. 5 is an explanatory diagram (graph) of an example of the propagation characteristics (frequency characteristics) of the electromagnetic wave propagation medium.

FIG. 2 is a perspective view of a configuration example of the electromagnetic wave propagation medium 1. FIG. 3 is a perspective view of another configuration example of the electromagnetic wave propagation medium 1. FIG. 4 is a cross-sectional view of the electromagnetic wave propagation medium 1 of FIG. 3 or 4. FIG. 5 is an explanatory diagram (graph) of an example of the propagation characteristics (frequency characteristics) of the electromagnetic wave propagation medium 1.

FIG. 2 shows the configuration example in which slots SL are formed on a conductor 11 making up the upper surface of the electromagnetic wave propagation medium 1. FIG. 3 shows a configuration example in which the conductor 11 making up the upper surface of the electromagnetic wave propagation medium 1 is meshed. FIG. 4 shows a cross-sectional view perpendicular to the direction of propagation (travel) of an electromagnetic wave through the electromagnetic wave propagation medium 1. FIG. 5 shows a graph of propagation characteristics (frequency characteristics) that result when an electromagnetic wave propagates through the electromagnetic wave propagation medium 1 having a width $W_1$.

An electromagnetic wave propagation medium (electromagnetic wave propagation medium 1 in this example) extends in the direction of propagation of an electromagnetic wave, and has an electromagnetic wave propagation space sandwiched between conductors in the direction perpendicular to the electromagnetic wave propagation direction. Specific configurations of the electromagnetic wave propagation medium 1 of FIGS. 2 to 4 will hereinafter be described.

As shown in FIGS. 2 to 4, the electromagnetic wave propagation medium 1 has conductors (conductive portions, conductive layers, conductive surfaces) 11, 12, 13, and 14, and an electromagnetic wave propagation space 15 sandwiched between the conductors 11 and 12 in the Y direction and between the conductors 13 and 14 in the Z direction. The direction of propagation (travel) of an electromagnetic wave through the electromagnetic wave propagation medium 1 is the X direction, and the Y and Z directions are the directions perpendicular to the direction of propagation (travel) of an electromagnetic wave through the electromagnetic wave propagation medium 1 (X direction). The electromagnetic wave propagation medium 1 extends in the direction of propagation (travel) of an electromagnetic wave through the electromagnetic wave propagation medium 1 (X direction). The direction of propagation (travel) of an electromagnetic wave through the electromagnetic wave propagation medium 1 (X direction), therefore, represents the direction of extension of the electromagnetic wave propagation medium 1 (axial direction).

An electromagnetic wave propagates (travels) through the electromagnetic wave propagation space 15 of the electromagnetic wave propagation medium 1. Hereinafter, therefore, a statement "an electromagnetic wave propagates (travels) through the electromagnetic wave propagation medium (1)" actually means "an electromagnetic wave propagates (travels) through the electromagnetic wave propagation space (15) of the electromagnetic wave propagation medium (1)".

The electromagnetic wave propagation space 15 is formed between the conductors 11 and 12 and is sandwiched between the conductors 11 and 12 in the Y direction, and is formed between the conductors 13 and 14 and is sandwiched between the conductors 13 and 14 in the Z direction. In other words, the electromagnetic wave propagation space 15 is encircled with the conductors 11, 12, 13, and 14. It can also be said that the conductors 11 and 12 are opposite to each other across the electromagnetic wave propagation space 15 in the Y direction while the conductors 13 and 14 are opposite to each other across the electromagnetic wave propagation space 15 in the Z direction. It can also be said from another perspective that the conductors 13 and 14 are formed on both side faces of the electromagnetic wave propagation medium 1 (side faces opposite to each other in the Z direction) and that the conductors 11 and 12 are connected (linked) and shorted via the conductor 13 on one side face (side face on which the conductor 13 is formed) while connected (linked) and shorted via the conductor 14 on the other side face (side face on which the conductor 14 is formed).

The electromagnetic wave propagation space 15 is filled with a material having a dielectric property, such as air, glass, ceramics, and water. The electromagnetic wave propagation medium 1 also has two end faces (side faces) 16a and 16b opposite to each other across the electromagnetic wave propagation space 15 in the X direction (direction of propagation (travel) of an electromagnetic wave through the electromagnetic wave propagation medium 1). On these end faces 16a and 16b, a conductor may be or may not be formed.

Each of the conductors 11 and 12 is shaped into a tabular conductor having long sides in the X direction and short sides in the Z direction (tabular conductor having a thickness in the Y direction). Each of the conductors 13 and 14 is shaped into a tabular conductor having long sides in the X direction and short sides in the Y direction (tabular conductor having a thickness in the Z direction). One long side of the conductor 11 is connected to one long side of the conductor 13, of which the other long side is connected to one long side of the conductor 12, of which the other long side is connected to one long side of the conductor 14, of which the other long side is connected to the other long side of the conductor 11. These conductors 11, 12, 13, and 14 may be formed integrally. FIG. 4 shows a structure in which the conductors 11 and 12 are formed respectively on the upper and lower sides of the electromagnetic wave propagation space 15 having a given thickness in the Y direction, thus sandwiching the electromagnetic wave propagation space 15 in the Y direction and the conductors 13 and 14 are formed respectively on the left and right sides of the electromagnetic wave propagation space 15 having a given width in the Z direction, thus sandwiching the electromagnetic wave propagation space 15 in the Z direction.

As shown in FIG. 1, when the base unit 2 and the terminals 3 are placed on the electromagnetic wave propagation medium 1, the base unit 2 and the terminals 3 are located on the conductor 11 of the electromagnetic wave propagation medium 1. The base unit 2 and the terminals 3 put electromagnetic waves from the side of conductor 11 into the electromagnetic wave propagation space 15 and extract electromagnetic waves out of the electromagnetic wave propagation space 15. The conductor 11, therefore, is capable of inputting/outputting electromagnetic waves to/from the electromagnetic wave propagation space 15.

According to the electromagnetic wave propagation medium 1 of FIG. 2, multiple slots (openings) SL are formed on the conductor 11, as openings through which electromagnetic waves can be input and output. Each slot SL is an opening formed on the conductor 11 and is made into an oblong having long sides in the Z direction and short sides in the X direction in a plan view. Because the slots SL are formed on the conductor 11, an electromagnetic wave can be input to the electromagnetic wave propagation space 15 through each slot SL to propagate the electromagnetic wave through the electromagnetic wave propagation space 15. An electromagnetic wave propagating through the electromagnetic wave propagation space 15 can be output (extracted) through each slot SL.

When such openings through which electromagnetic waves can be input and output (the slots SL in FIG. 2 and the meshed openings in FIG. 3) are formed on the conductor, electromagnetic waves can be input and output to and from the electromagnetic wave propagation space through the openings.

In a case where the electromagnetic wave propagation medium 1 of FIG. 2 is applied to the system of FIG. 1, the base unit 2 and the terminals 3 are positioned counter to the slots SL on the conductor 11, respectively. Each of the base unit 2 and the terminals 3 is capable of inputting an electromagnetic wave to the electromagnetic wave propagation space 15 and receiving an output electromagnetic wave therefrom through each slot SL. For example, each of the base unit 2 and the terminal 3 has an antenna (not depicted), which inputs an electromagnetic wave to the electromagnetic wave propagation space 15 and receives an output electromagnetic wave therefrom through the slot SL. Hence the base unit 2 and the terminal 3 can transmit/receive electromagnetic waves to/from each other (communicate with each other). For example, they transmit a communication signal or supply power to each other. The antenna collectively represents input/output interfaces for inputting/outputting electromagnetic waves, which are referred to as coupler, coil, etc., according to their shapes and functions. Transmission of electromagnetic waves through the electromagnetic wave propagation space 15 realizes a highly reliable transmission system (communication system) that is hardly subjected to external interference and that allows less signal leakage (electromagnetic wave leakage).

In the case of the electromagnetic wave propagation medium 1 of FIG. 3, the conductor 11 is the meshed conductor. This "meshed conductor" is an integrally formed conductor having a plurality of openings sectioned by multiple lead wires. Through the openings, electromagnetic waves can be input/output to/from the electromagnetic wave propagation space 15. The openings of the meshed conductor 11 are placed (arranged) regularly and evenly on the conductor 11.

In the case of the electromagnetic wave propagation medium 1 of FIG. 3, the use of the meshed conductor as the conductor 11 allows input and output of an electromagnetic wave at any given position on the meshed conductor 11 (through an opening at that position). In a case where the electromagnetic wave propagation medium 1 of FIG. 3 is applied to the system of FIG. 1, each of the base unit 2 and the terminals 3 placed on the conductor 11 of the electromagnetic wave propagation medium 1 can input an electromagnetic wave to the electromagnetic wave propagation space 15 and receive an output electromagnetic wave therefrom through mesh openings present in a location where the base unit 2 and the terminals 3 are placed (mesh openings on the conductor 11). For example, each of the base unit 2 and the terminals 3 has an antenna, which inputs an electromagnetic wave to the electromagnetic wave propagation space 15 and receives an output electromagnetic wave therefrom through the mesh openings. Hence the base unit 2 and the terminals 3 can transmit/receive electromagnetic waves to/from each other (communicate with each other). For example, they transmit a communication signal or supply power to each other. Transmission of electromagnetic waves through the electromagnetic wave propagation space 15 realizes a highly reliable transmission system (communication system) that is hardly subjected to external interference and that allows less signal leakage (electromagnetic wave leakage).

FIG. 3 shows the conductor made by combining together multiple lead wires placed at fixed intervals in the X direction and extending in the Z direction and multiple lead wires placed at fixed intervals in the Z direction and extending in the X direction, as the meshed conductor 11. The directions of extension of these lead wires should be the directions in which the lead wires are parallel with each other on the XZ plane (which includes the X direction and the Z direction). However, those directions are not limited to the X and Z directions. In the example of FIG. 3, the intervals between the lead wires placed in the X direction is fixed and the intervals between the lead wires placed in the Z direction is also fixed. However, those intervals are not limited to the fixed intervals. In FIG. 3, the lead wires placed in the X direction are perpendicular to the lead wires placed in the Z direction (both lead wires make a right angle with each other), which is not the only case. Both lead wires may make an angle other than a right angle.

FIG. 5 is a graph showing propagation characteristics (frequency characteristics) that are observed when an electromagnetic wave is propagated through the electromagnetic wave propagation medium 1 having a width $W_1$. The horizontal axis of the graph of FIG. 5 represents the frequency of an electromagnetic wave propagated (transmitted) through the electromagnetic wave propagation medium 1, while the vertical axis of the graph of FIG. 5 represents a propagation gain that results when the electromagnetic wave is propagated (transmitted) through the electromagnetic wave propagation medium 1. When values plotted along the vertical axis of the graph of FIG. 5 (propagation gain) decreases, it means an increase in a propagation loss. The graph of FIG. 5 is drawn on the assumption that the electromagnetic wave propagation medium 1 has the width $W_1$.

The graph of FIG. 5 demonstrates that when the frequency of an electromagnetic wave propagating through the electromagnetic wave propagation medium 1 (hereinafter, "frequency f") is equal to or higher than a given frequency $f_0$, that is, $f \geq f_0$ is satisfied, the electromagnetic wave suffers little loss (power loss) during its propagation, thus attenuating little, in which case the electromagnetic wave can be propagated (transmitted) with its strength (signal strength) hardly decreased. In contrast, when the frequency f of an electromagnetic wave propagating through the electromagnetic wave propagation medium 1 is lower than the frequency $f_0$, that is, $f < f_0$ is satisfied, the electromagnetic wave suffers greater loss (power loss) during its propagation, thus attenuating heavily, in which case its strength (signal strength) drops significantly. In other words, the graph of FIG. 5 demonstrates that the extent of attenuation of the electromagnetic wave during its propagation is extremely small and almost constant when the frequency f is equal to or higher than the frequency $f_0$ but starts increasing sharply when the frequency f becomes lower than the frequency $f_0$. The graph, therefore, indicates a tendency that the extent of attenuation of the electromagnetic wave grows larger as the frequency f becomes lower.

When a wavelength for the frequency $f_0$ is denoted as $\lambda_0$, $W_1=\lambda_0/2$ is satisfied, for which the reasons is described as follows.

To propagate an electromagnetic wave through the electromagnetic wave propagation space 15 while suppressing loss of the electromagnetic wave in its propagation direction (X direction), an electric field must be caused to exist in either the direction perpendicular to the conductors 11 and 12 (thickness direction, vertical direction, Y direction) or the direction perpendicular to the conductors 13 and 14 (width direction, horizontal direction, Z direction). Because an electric field does not have an amplitude on the end surface where the conductors are present, the wavelength of the electromagnetic wave in the electromagnetic wave propagation medium 1 (electromagnetic wave propagation space 15) that allows the electric field to exist in the direction perpendicular to the conductors 13 and 14 (Z direction) must be equal to or shorter than 2 times the width $W_1$, that is, $\lambda \leq W_1 \times 2$ must be satisfied. In other words, to cause the electric field to exist in the direction perpendicular to the conductors 13 and 14 (Z direction), the distance between the conductor 13 and the conductor 14 (i.e., width $W_1$) must be equal to or longer than ½ of the wavelength of the propagating electromagnetic wave in the electromagnetic wave propagation space 15, that is, $W_1 \geq \lambda/2$ must be satisfied.

This means that when an electromagnetic wave with a wavelength of $\lambda$ propagates through the electromagnetic wave propagation medium 1 (electromagnetic wave propagation space 15), if the distance between the conductor 13 and the conductor 14 (i.e., width $W_1$) is equal to or longer than ½ of the wavelength $\lambda$, that is, $W_1 \geq \lambda/2$ is satisfied, the electromagnetic wave can be propagated with its loss kept little. In contrast, if the distance between the conductor 13 and the conductor 14 (i.e., width $W_1$) is smaller than ½ of the wavelength $\lambda$, that is, $W_1 < \lambda/2$ is satisfied, the loss becomes greater. In other words, when an electromagnetic wave with a wavelength of $\lambda$ propagates through the electromagnetic wave propagation medium 1 (electromagnetic wave propagation space 15), if the wavelength $\lambda$ of the electromagnetic wave is equal to or shorter than 2 times the distance between the conductor 13 and the conductor 14 (i.e., width $W_1$), that is, $W_1 \times 2 \geq \lambda$ is satisfied, the electromagnetic wave can be propagated with its loss kept little. In contrast, if the wavelength $\lambda$ is larger than 2 times the distance between the conductor 13 and the conductor 14 (i.e., width $W_1$), that is, $W_1 \times 2 < \lambda$ is satisfied, the loss becomes greater.

For example, when a dielectric constant in the electromagnetic wave propagation medium 1 (electromagnetic wave propagation space 15) is determined to be 1 and the frequency of an electromagnetic wave propagated with its loss kept little for effective communication is determined to be 2.5 GHz, the lower limit value for the width $W_1$ that keeps the propagation loss little is about 6 cm. The width $W_1$ shorter than 6 cm, therefore, leads to an increase in loss of the electromagnetic wave of 2.5 GHz. To put it another way, if the dielectric constant in the electromagnetic wave propagation medium 1 (electromagnetic wave propagation space 15) is 1 and the width $W_1$ is about 6 cm, an electromagnetic wave with a frequency of 2.5 GHz or higher can be propagated through the electromagnetic wave propagation medium 1 (electromagnetic wave propagation space 15) as loss of the electromagnetic wave is kept little. However, when an electromagnetic wave with a frequency lower than 2.5 GHz (which means a long wavelength) is propagated, the loss turns out to be greater.

Now, the wavelength of an electromagnetic wave propagating through the electromagnetic wave propagation medium 1 (electromagnetic wave propagation space 15) is denoted as $\lambda$, which means that the wavelength $\lambda$ represents the wavelength of the propagating electromagnetic wave in the electromagnetic wave propagation medium 1 (electromagnetic wave propagation space 15). Hereinafter, a statement "the wavelength of an electromagnetic wave propagating through the electromagnetic wave propagation medium (1) in the electromagnetic wave propagation medium (1)" actually means "the wavelength of an electromagnetic wave propagating through the electromagnetic wave propagation space 15 of the electromagnetic wave propagation medium (1) in the electromagnetic wave propagation space (15)". The width $W_1$ is the distance (gap) between the conductor 13 and the conductor 14 along the Z direction and corresponds to the dimension (width) of the electromagnetic wave propagation space 15 in its Z direction, thus approximately corresponding to the dimension (width) of the electromagnetic wave propagation medium 1 in its Z direction. The thickness $T_1$ is the distance (gap) between the conductor 11 and the conductor 12 along the Y direction and corresponds to the dimension (thickness) of the electromagnetic wave propagation space 15 in its Y direction, thus approximately corresponding to the dimension (thickness) of the electromagnetic wave propagation medium 1 in its Y direction. The direction of the width $W_1$ (Z direction) and the direction of the thickness $T_1$ (Y direction) are perpendicular to each other, and the thickness $T_1$ is equal to or smaller than the width $W_1$ (i.e., $W_1 \geq T_1$). Therefore, the electromagnetic wave propagation medium 1 has the width $W_1$ (dimension in the Z direction) and the thickness $T_1$ (dimension in the Y direction), as dimensions in the directions perpendicular to the direction of propagation (travel) of the electromagnetic wave.

Since the thickness $T_1$ is equal to or smaller than the width $W_1$, when the width $W_1$ is equal to or longer than ½ of the wavelength $\lambda$ (i.e., $W_1 \geq \lambda/2$) irrespective of the size of the thickness $T_1$, an electromagnetic wave with the wavelength $\lambda$ can be propagated as loss of the electromagnetic wave is kept little. In contrast, when the width $W_1$ is shorter than ½ of the wavelength $\lambda$ (i.e., $W_1 < \lambda/2$) irrespective of the size of the thickness $T_1$, loss of the electromagnetic wave with the wavelength $\lambda$ during propagation becomes greater. This means that propagation loss the electromagnetic wave with the wavelength $\lambda$ suffers during its propagation through the electromagnetic wave propagation medium 1 depends on the relation between larger one of the width $W_1$ and the thickness $T_1$ (width $W_1$ in this example), which are dimensions in the directions perpendicular to the direction of propagation of the electromagnetic wave, and the wavelength $\lambda$.

When the frequency of an electromagnetic wave having a wavelength two times the width $W_1$ (i.e., wavelength $\lambda_0 = W_1 \times 2$) is $f_0$, therefore, if the frequency f of an electromagnetic wave propagated through the electromagnetic wave propagation medium 1 is equal to or higher than the frequency $f_0$, that is, $f \geq f_0$ is satisfied, loss of the electromagnetic wave during its propagation is kept little, so that the electromagnetic wave can be transmitted with its strength (signal strength) hardly dropping. In contrast, if the frequency f of an electromagnetic wave propagated (transmitted) through the electromagnetic wave propagation medium 1 becomes lower than the frequency $f_0$, that is, $f < f_0$ is satisfied, loss of the electromagnetic wave during its propagation increases sharply. As a result, the propagating electromagnetic wave attenuates, reducing in strength (signal strength) significantly. As indicated in the graph of FIG. 5, loss of the electromagnetic wave during its propagation through the electromagnetic wave propagation medium 1 is small and almost constant when the frequency of the electromagnetic wave is equal to or higher than the frequency $f_0$ but starts increasing sharply when the frequency becomes lower than the frequency $f_0$. The graph, therefore, indicates a tendency that loss of the electromagnetic wave grows larger as its frequency becomes lower.

In other words, an electromagnetic wave having a frequency that makes the wavelength $\lambda$ of the electromagnetic wave in the electromagnetic wave propagation medium 1 (electromagnetic wave propagation space 15) equal to or shorter than two times the width $W_1$, which frequency is equal to or higher than the frequency $f_0$, shows characteristics such that when the electromagnetic wave is propagated (transmitted) through the electromagnetic wave propagation medium 1, the electromagnetic wave suffers little loss, which is almost constant for the frequency range that satisfies $\lambda \leq W_1 \times 2$. In contrast, an electromagnetic wave having a frequency that makes the wavelength of the electromagnetic wave in the electromagnetic wave propagation medium 1 (electromagnetic wave propagation space 15) longer than 2 times the width $W_1$, which frequency is lower than the frequency $f_0$, shows characteristics such that the larger (longer) the wavelength $\lambda$ becomes (the lower the frequency becomes), the greater propagation loss in the electromagnetic wave propagation medium 1 becomes.

According to this embodiment, such frequency characteristics of the electromagnetic wave propagation medium 1 are utilized separately for ordinary communication and for detection of the position of each terminal 3. Specifically, when communication is carried out between the base unit 2 and each terminal 3 or between different terminals 3, an electromagnetic wave having a frequency f1 (communication signal) is used as a communication signal. When detection of the position of each terminal 3 is carried out, an electromagnetic wave having a frequency f2 different from the frequency f1 (position detection signal) is used as a position detection signal. The frequency f1 of the communication signal and the frequency f2 of the position detection signal are each selected so that the attenuation (loss) of an electromagnetic wave serving as the position detection signal (electromagnetic wave having the frequency f2) that propagates through the electromagnetic wave propagation medium 1 (electromagnetic wave propagation space 15) is greater than the attenuation (loss) of an electromagnetic wave serving as the communication signal (electromagnetic wave having the frequency f1) that propagates through the electromagnetic wave propagation medium 1 (electromagnetic wave propagation space 15). The frequency f2 is lower than the frequency f1 (F2<f1). It is preferable that the frequency f1 be equal to or higher than the frequency $f_0$ (i.e., $f1 \geq f_0$) and that the frequency f2 be lower than the frequency $f_0$ (i.e., $f2 < f_0$).

An electromagnetic wave (communication electromagnetic wave) used for ordinary communication between the base unit 2 and each terminal 3 or between different terminals 3 (communication other than transmission/reception of the position detection signal) is referred to as communication signal, and an electromagnetic wave (position detection electromagnetic wave) used for detection of the position of each terminal 3 is referred to as position detection signal.

Figure 6:
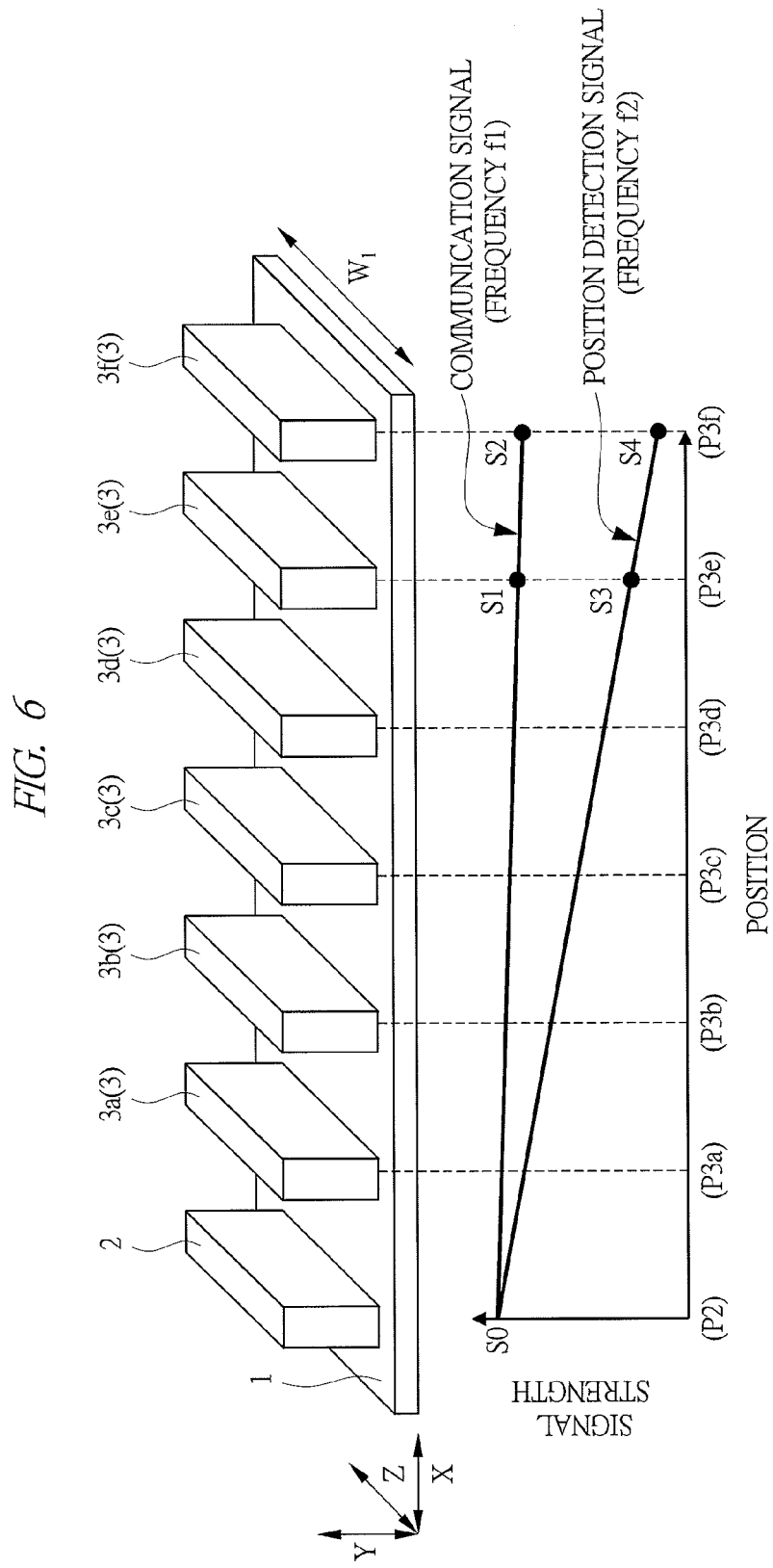
FIG. 6 is an explanatory diagram for explaining a position detection method executed by the position detection system of FIG. 1.

A position detection method according to this embodiment will be described referring to FIG. 6. FIG. 6 is an explanatory diagram for explaining the position detection method executed by the position detection system (position detection apparatus), showing the view of FIG. 1 with a graph added thereto. The graph of FIG. 6 indicates the signal strength of signals (electromagnetic waves) transmitted through the electromagnetic wave propagation medium 1. The horizontal axis of the graph of FIG. 6 represents positions on the electromagnetic wave propagation medium 1, which positions correspond to distances to the base unit 2. The vertical axis of the graph of FIG. 6 represents the strength (signal strength) of signals (electromagnetic waves) transmitted through the electromagnetic wave propagation medium 1 (electromagnetic wave propagation space 15). Positions P2 and P3a to P3f indicated on the horizontal axis of the graph of FIG. 6 signify a positional relation such that the position P2 represents the position of placement of the base unit 2 on the electromagnetic wave propagation medium 1, the position P3a represents the position of placement of a terminal 3a on the electromagnetic wave propagation medium 1, the position P3b represents the position of placement of a terminal 3b on the electromagnetic wave propagation medium 1, the position P3c represents the position of placement of a terminal 3c on the electromagnetic wave propagation medium 1, the position P3d represents the position of placement of a terminal 3d on the electromagnetic wave propagation medium 1, the position P3e represents the position of placement of a terminal 3e on the electromagnetic wave propagation medium 1, and the position P3f represents the position of placement of a terminal 3f on the electromagnetic wave propagation medium 1.

The graph of FIG. 6 exhibits a change in the signal strength of a communication signal with the frequency f1 that is input from the base unit 2 to the electromagnetic wave propagation medium 1 and is transmitted therethrough, and a change in the signal strength of a position detection signal with the frequency f2 that is input from the base unit 2 to the electromagnetic wave propagation medium 1 and is transmitted therethrough. A decrease in values plotted along the vertical axis of the graph of FIG. 6 means a decrease in the signal strength. The horizontal axis of the graph of FIG. 6 represents respective distances to the position P2 of the base unit 2 defined as a reference position. An increase in values plotted along the horizontal axis of the graph of FIG. 6 means an increase in the distance to the position P2 (position of the base unit 2), that is, moving further away from the position P2 of the base unit 2.

When a signal (electromagnetic wave) is transmitted (propagated) through the electromagnetic wave propagation medium 1, if the signal (electromagnetic wave) attenuates during transmission, a longer transmission distance results in heavier signal attenuation, leading to a drop in the signal strength (electromagnetic wave strength). As described above, the frequency f1 and the frequency f2 are each selected so that the attenuation (loss) of the position detection signal (electromagnetic wave) with the frequency f2 that propagates through the electromagnetic wave propagation medium 1 is greater than the attenuation (loss) of the communication signal (electromagnetic wave) with the frequency f1 that propagates through the electromagnetic wave propagation medium 1. As indicated by the graph of FIG. 6, when the communication signal with the frequency f1 is input from the base unit 2 to the electromagnetic wave propagation medium 1 and is transmitted therethrough, even if the signal attenuates and its strength drops as the transmission distance grows longer (as the signal moves further away from the position P2 of the base unit 2), the extent of strength drop is small. In contrast, when the position detection signal with the frequency f2 is input from the base unit 2 to the electromagnetic wave propagation medium 1 and is transmitted therethrough, as indicated by the graph of FIG. 6, the signal attenuates and its strength drops as the transmission distance grows longer (as the signal moves further away from the position P2 of the base unit 2), and the extent of strength drop in this case is large.

Comparison between the case of inputting the communication signal with the frequency f1 from the base unit 2 to the electromagnetic wave propagation medium 1 with the case of inputting the position detection signal with the frequency f2 from the base unit 2 to the electromagnetic wave propagation medium 1 (on the assumption that the input signal strength is the same in both cases) reveals that a signal strength difference between the communication signal with the frequency f1 and the position detection signal with the frequency f2 is almost zero at the position P2 of the base unit 2 but the signal strength of the position detection signal with the frequency f2 becomes lower than the same of the communication signal with the frequency f1 at a position at which both signals are away from the position P2 of the base unit 2 across the same given distance. In other words, when the communication signal with the frequency f1 and the position detection signal with the frequency f2 are transmitted across the same distance through the electromagnetic wave propagation medium 1, the extent of a drop in the signal strength (attenuation rate) of the signal with the frequency f2 is larger than the same of the signal with the frequency f1. In the graph of FIG. 6, therefore, the gradient of a signal strength curve of the position detection signal with the frequency f2 is larger than the gradient of a signal strength curve of the communication signal with the frequency f1.

Under a condition where among the base unit 2 and multiple terminals 3 placed (disposed) on the electromagnetic wave propagation medium 1, the position of the base unit 2 is known in advance (the base unit 2 being disposed at the position P2 is known in advance), the position of each terminal 3 is detected, using the position detection signal, based on the known position of the base unit 2 defined as the reference position. When a need or request for identifying the position of a terminal 3 arises under a condition where the position of the base unit 2 is known but the position of the terminal 3 is not known, the position of the terminal 3 is detected using the position detection signal. In such a case, the base unit 2 transmits the position detection signal through the electromagnetic wave propagation medium 1 to each terminal 3 and detects the position of the terminal 3 based on the reception strength of the position detection signal received by each terminal 3.

The position of the terminal 3 is detected using the position detection signal with the frequency f2. This is because that the position detection signal with the frequency f2, which is input from the base unit 2 to the electromagnetic wave propagation medium 1 and is transmitted therethrough, is received by the terminal 3 and position information of the terminal 3 can be obtained based on the signal strength of the position detection signal received by the terminal 3. Compared to the communication signal, the position detection signal attenuates more heavily during its propagation through the electromagnetic wave propagation medium 1, and the signal strength of the position detection signal drops further as it moves further away from the transmission origin (base unit 2). Hence position information of each terminal 3 can be obtained based on the signal strength of the position detection signal received by each terminal 3.

The position information indicates, for example, the distance from the base unit 2 to each terminal 3, the position of each terminal 3 placed on the electromagnetic wave propagation medium 1, or order of arrangement of the terminals 3 on the electromagnetic wave propagation medium 1 (placement order, arrangement order).

A statement "the distance from the base unit 2 to the terminal 3" or "the distance between the base unit 2 and the terminal 3" means "the distance from the base unit 2 to the terminal 3 along the electromagnetic wave propagation path in the electromagnetic wave propagation medium 1" or "the distance between the base unit 2 and the terminal 3 along the electromagnetic wave propagation path in the electromagnetic wave propagation medium 1". A statement "the distance between different terminals 3" means "the distance between one terminal and another terminal 3 along the electromagnetic wave propagation path in the electromagnetic wave propagation medium 1".

For example, the correlation between signal strength and a transmission distance in the electromagnetic wave propagation medium 1 (distance a signal has traveled in the electromagnetic wave propagation medium 1) in the case of inputting a signal with the frequency F2 from the base unit 2 to the electromagnetic wave propagation medium 1 (this correlation will hereinafter be referred to as "the correlation between the signal strength of the signal with the frequency f2 and its transmission distance" and is equivalent to the data shown in the graph of FIG. 6) is obtained in advance. By applying the signal strength of the position detection signal with the frequency f2 received by the terminal 3 (i.e., reception signal strength) to the corresponding signal strength of the position detection signal indicated in the correlation graph (correlation between the signal strength of the signal with the frequency f2 and its transmission distance), the distance from the position of the base unit 2 having transmitted the position detection signal with the frequency f2 to the position of the terminal 3 having received the position detection signal can be grasped (detected).

As shown in FIG. 6, when the base unit 2 inputs a position detection signal having signal strength S0 and the frequency f2 to the electromagnetic wave propagation medium 1 and the position detection signal propagates through the electromagnetic wave propagation medium 1, the position detection signal received by the terminal 3e shows its signal strength of S3 and the position detection signal received by the terminal 3f shows its signal strength of S4. The signal strength S4 is lower than the signal strength S3 (i.e., S3>S4). When the correlation between the signal strength of the signal with the frequency f2 and its transmission distance (which is equivalent to the data shown in the graph of FIG. 6) is obtained in advance, therefore, if the signal strength of the position detection signal received by one terminal 3 is the signal strength S3, the position of that terminal 3 is determined to be the position P3e. If the signal strength of the position detection signal received by another terminal 3 is the signal strength S4, the position of that terminal 3 is determined to be the position P3f.

A case is assumed where based on the correlation between the signal strength of the signal with the frequency f2 and its transmission distance (which is equivalent to the data shown in the graph of FIG. 6), it is known in advance that when a signal is transmitted across a distance L through the electromagnetic wave propagation medium 1, the signal strength drops to 30% of its pre-transmission strength (i.e., strength S0). In this case, when the base unit 2 inputs the position detection signal having the signal strength S0 and frequency f2 to the electromagnetic wave propagation medium 1 and the signal strength of the position detection signal received by one terminal 3 is found to be 30% of the signal strength S0, the distance from that terminal 3 to the base unit 2 (distance along the electromagnetic wave propagation medium 1) is determined to be the distance L, which means the terminal 3 is at a position separated away from the base unit 2 across the distance L.

It is also determined that the terminal 3*f* having received the position detection signal with the signal strength S4 lower than the signal strength S3 is at a position further away from the base unit 2 (position separated away from the base unit 2 across a longer distance of transmission through the electromagnetic wave propagation medium 1) than the position of the terminal 3*e* having received the position detection signal with the signal strength S3. Hence, if the sizes of signal strength of the position detection signals received by respective terminals 3 decrease in increasing order of the terminal 3*a*, terminal 3*b*, terminal 3*c*, terminal 3*d*, terminal 3*e*, and terminal 3*f*, it is determined that the terminal 3*a*, terminal 3*b*, terminal 3*c*, terminal 3*d*, terminal 3*e*, and terminal 3*f* are arranged in increasing order along the electromagnetic wave transmission path in the electromagnetic wave propagation medium 1 in the direction of moving away from the base unit 2 (direction in which the electromagnetic wave transmission distance increases).

In this manner, by using the position detection signal with the frequency f2 whose signal strength gets lower as the transmission distance becomes longer when the position detection signal is transmitted through the electromagnetic wave propagation medium 1, position information of each terminal 3 (the distance from the base unit 2 to each terminal 3, the position of each terminal 3 disposed on the electromagnetic wave propagation medium 1, or order of arrangement of the terminals 3 on the electromagnetic wave propagation medium 1) can be obtained.

The base unit 2 inputs the position detection signal having signal strength S0 and the frequency f2 to the electromagnetic wave propagation medium 1, and the position detection signal propagating through the electromagnetic wave propagation medium 1 is received by each terminal 3 (3*a*, 3*b*, 3*c*, 3*d*, 3*e*, 3*f*). In this case, the reception signal strength of the position detection signal at each terminal 3 (3*a*, 3*b*, 3*c*, 3*d*, 3*e*, 3*f*) is different (in attenuation rate) according to the distance from each terminal 3 (3*a*, 3*b*, 3*c*, 3*d*, 3*e*, 3*f*) to the base unit 2. Each terminal 3 (3*a*, 3*b*, 3*c*, 3*d*, 3*e*, 3*f*) transmits information of the reception signal strength of the position detection signal to the base unit 2 through the electromagnetic wave propagation medium 1 (at which the information should preferably be transmitted in the form of a communication signal with the frequency f1), and the base unit 2 receives the information of the reception signal strength of the position detection signal at each terminal 3. Based on the information of the reception signal strength of the position detection signal at each terminal 3, the base unit 2 can obtain (determine) position information of each terminal 3 (the distance from the base unit 2 to each terminal 3, the position of each terminal 3 disposed on the electromagnetic wave propagation medium 1, or order of arrangement of the terminals 3 on the electromagnetic wave propagation medium 1). The correlation between the signal strength of the signal with the frequency f2 and its transmission distance (which is equivalent to the data shown in the graph of FIG. 6) is saved by the base unit 2 as pre-acquired data, but may be saved by the terminal 3. In another case, a separate device different from the base unit 2 and the terminal 3 may save the data of the correlation between the signal strength of the signal with the frequency f2 and its transmission distance (which is equivalent to the data shown in the graph of FIG. 6), in which case the device communicates with the base unit 2 to allow the base unit 2 to acquire the data of the correlation between the signal strength of the signal with the frequency f2 and its transmission distance (which is equivalent to the data shown in the graph of FIG. 6) on a necessary basis. Based on the information of the reception signal strength of the position detection signal sent from each terminal 3 and the data of the correlation between the signal strength of the signal with the frequency f2 and its transmission distance (which is equivalent to the data shown in the graph of FIG. 6), the base unit can obtain the position information of each terminal 3. In this manner, the position of each terminal 3 is detected.

The reason for using the signal with the frequency f2 as the position detection signal will then be described.

When the position detection signal is transmitted through the electromagnetic wave propagation medium 1, the signal's strength becomes lower as its transmission distance gets longer. A larger extent of signal strength drop (equivalent to the gradient of the position detection signal curve shown in the graph of FIG. 6) leads to an improvement in the precision of detection of the position of the terminal 3. In the graph of FIG. 6, for example, when a difference between the signal strength S3 and the signal strength S4 is denoted as $\Delta S_{3-4}$ ($\Delta S_{3-4}$=S3−S4), this difference $\Delta S_{3-4}$ should preferably be large to some extent. If the strength of a signal received by the terminal 3*e* is slightly smaller than the signal strength S3 due to an unknown element of error, the position of the terminal 3*e* may possibly be wrongly determined to be the position P3*f*, instead of the position P3*e*. A risk of this error becomes greater as the difference $\Delta S_{3-4}$ becomes smaller. The causes of the error of signal strength of the position detection signal received by the terminal 3 include, for example, the irregularity of manufacturing of the terminals 3 and the irregularity of arrangement of the terminals 3 on the electromagnetic wave propagation medium 1. If the $\Delta S_{3-4}$ is sufficiently large, the position of the terminal 3*e* can be detected accurately not as the position P3*f* but as the position P3*e* even if the reception signal strength at the terminal 3*e* slightly shifts from the signal strength S3 due to an unknown element of error. This holds true also for terminals 3 other than the terminal 3*e*. For this reason, the frequency of the position detection signal is selected as the frequency (frequency f2) that causes the position detection signal to readily attenuate when it is transmitted through the electromagnetic wave propagation medium 1. By selecting such a frequency, the position of the terminal 3 can be detected accurately even if the signal strength of the position detection signal received by the terminal 3 slightly shifts due to an unknown element of error. When the base unit 2 transmits the position detection signal through the electromagnetic wave propagation medium 1 to each terminal 3*a*, 3*b*, 3*c*, 3*d*, 3*e*, and 3*f* and each terminal receives the incoming position detection signal, it is preferable that the reception signal strength at each terminal 3*a*, 3*b*, 3*c*, 3*d*, 3*e*, and 3*f* be lower to some extent than the strength S0 of the position detection signal at the time of its transmission by the base unit 2 and that a reception signal strength difference between the terminals 3*a*, 3*b*, 3*c*, 3*d*, 3*e*, and 3*f* be large.

In contrast, it is preferable that the communication signal attenuate (reduce in signal strength) little when transmitted through electromagnetic wave propagation medium 1. This is because that when communication is carried out between the base unit 2 and the terminal 3 or between different terminals 3, less attenuation of the communication signal that keeps its reception signal strength high allows accurate transmission/reception of the communication signal, in which case communication performance remains better even if the signal transmission distance in the electromagnetic wave propagation medium 1 becomes longer.

As shown in FIG. 6, when the base unit 2 inputs a communication signal having signal strength S0 and the frequency f1 to the electromagnetic wave propagation medium 1 and the communication signal propagates through the electromagnetic wave propagation medium 1, the communication signal received by the terminal 3e shows its signal strength of S1 and the communication signal received by the terminal 3f shows its signal strength of S2. The signal strength S1 is higher than the signal strength S3 (i.e., S1>S3), and the signal strength S2 is higher than the signal strength S4 (i.e., S2>S4). In this manner, the reception signal strength of the communication signal at the terminals 3e and 3f is ensured adequately. This holds true also for terminals other than the terminals 3e and 3f. Hence, at each terminal 3, the reception signal strength of the communication signal is ensured adequately, which allows accurate transmission/reception of the communication signal. When the base unit 2 transmits the communication signal through the electromagnetic wave propagation medium 1 to each of the terminals 3a, 3b, 3c, 3d, 3e, and 3f and each terminal receives the incoming communication signal, it is preferable that the reception signal strength at each of the terminals 3a, 3b, 3c, 3d, 3e, and 3f be close to the strength S0 of the communication signal at the time of its transmission by the base unit 2 and that a reception signal strength difference between each of the terminals 3a, 3b, 3c, 3d, 3e, and 3f be small. In the graph of FIG. 6, for example, when a difference between the signal strength S1 and the signal strength S2 is denoted as $\Delta S_{1\text{-}2}$ ($\Delta S_{1\text{-}2}$=S1−S2), this difference $\Delta S_{1\text{-}2}$ should preferably be small, more specifically, be smaller than $\Delta S_{3\text{-}4}$ ($\Delta S_{1\text{-}2} < \Delta S_{3\text{-}4}$).

If the frequency f1 is adopted as the frequency of both communication signal and position detection signal by executing a method different from the method of this embodiment, the precision of terminal position detection becomes inferior. When the frequency f2 is adopted as the frequency of both communication signal and position detection signal by executing a method different from the method of this embodiment, the reception signal strength of the communication signal at the terminal 3 turns out to be lower, in which case better communication performance becomes impossible when the signal transmission distance in the electromagnetic wave propagation medium 1 becomes longer.

According to this embodiment, the frequency f1 of the communication signal and the frequency f2 of the position detection signal are selected so that when the position detection signal and the communication signal are propagated (transmitted) through the electromagnetic wave propagation medium 1, the position detection signal attenuates more heavily than the communication signal does. In other words, the frequency f1 of the communication signal and the frequency f2 of the position detection signal are selected so that when the position detection signal and the communication signal are transmitted through the electromagnetic wave propagation medium 1 across the same distance, the signal strength drop rate of the position detection signal is larger than the same of the communication signal. The signal strength drop rate is given by an equation: signal strength drop rate=(pre-transmission signal strength−post-transmission signal strength)/pre-transmission signal strength. In this manner, the attenuation of the communication signal is suppressed to allow accurate transmission/reception of the communication signal so that better communication is performed even if the signal transmission distance in the electromagnetic wave propagation medium 1 becomes longer. In addition, by using the position detection signal of which attenuation is greater than that of the communication signal, the precision of detection of the position of the terminal 3 is improved.

In other words, a reception signal strength difference between the terminals 3a, 3b, 3c, 3d, 3e, and 3f in the case of the base unit 2 transmitting the position detection signal through the electromagnetic wave propagation medium 1 to each of the terminals 3a, 3b, 3c, 3d, 3e, and 3f and each terminal receiving the incoming position detection signal is larger than a reception signal strength difference between the terminals 3a, 3b, 3c, 3d, 3e, and 3f in the case of the base unit 2 transmitting the communication signal through the electromagnetic wave propagation medium 1 to each of the terminals 3a, 3b, 3c, 3d, 3e, and 3f and each terminal receiving the incoming communication signal. Hence the communication signal is transmitted and received accurately and the precision of detection of the position of the terminal 3 is improved.

The frequency f2 of the position detection signal is lower than the frequency f1 of the communication signal (f2<f1). It is preferable that the frequency f1 of the communication signal be equal to or higher than the frequency $f_0$ (f1≥$f_0$) and that the frequency f2 of the position detection signal be lower than the frequency $f_0$ (f2<$f_0$). By determining the frequency f1 of the communication signal to be equal to or higher than the frequency $f_0$ (f1≥$f_0$), attenuation of the communication signal during its transmission through the electromagnetic wave propagation medium 1 is suppressed adequately, which allows more accurate transmission/reception of the communication signal. As a result, even if the transmission distance in the electromagnetic wave propagation medium 1 gets longer, more accurate communication is performed. By determining the frequency f2 of the position detection signal to be lower than the frequency $f_0$ (f2<$f_0$), attenuation of the position detection signal during its transmission through the electromagnetic wave propagation medium 1 is increased. As a result, the precision of detection of the position of the terminal 3 is further improved.

According to this embodiment, among multiple communication devices (base unit 2 and terminals 3) placed (disposed) near the electromagnetic wave propagation medium (1), the position of a first communication device (base unit 2) is known in advance, and the position of each communication device (terminal 3) other than the first communication device is detected based on the known position of the first communication device (base unit 2) defined as the reference position. In this case, the first communication device (base unit 2) transmits a position detection signal to each communication device (terminal 3) other than the first communication device through the electromagnetic wave propagation medium (1) and detects the position of the communication device (terminal 3) other than the first communication device (base unit 2) based on the reception strength of the position detection signal (reception signal strength at each terminal 3). The position detection signal used in this case is different in frequency from the communication signal used for communication carried out between the communication devices (base unit 2 and terminals 3) through the electromagnetic wave propagation medium (1), and attenuates more heavily than the communication signal does during propagation through the electromagnetic wave propagation medium (1). Because the position detection signal attenuates more heavily than the communication signal does, the reception signal strength of the position detection signal changes significantly according to the distance from the first communication device (base unit 2) to the position detection signal. This allows accurate detection of the position of the communication device (terminal 3) other than the first communication device (base unit 2). Meanwhile, use of the communication signal attenuating less than the position detection signal does suppresses a drop in the reception signal strength, thereby ensures accurate communication performance. Hence improved communication performance and improved position detection precision are achieved simultaneously.

In selecting the frequencies f1 an f2, for example, from the 2.4 GHz band belong to the ISM (Industry Science Medical) band, about 2.48 GHz is selected as the frequency f1 of the communication signal and about 2.40 GHz is selected as the frequency f1 of the position detection signal. In another case, different frequency bands may be used for the frequency f1 of the communication signal and the frequency f2 of the position detection signal, respectively, in such a way that the 2.4 GHz band belonging to the ISM band is used as the frequency band for the frequency f2 of the position detection signal while the 5.8 GHz band belonging to the ISM band may be used as the frequency band for the frequency f1 of the communication signal. Not only the ISM band but also other frequency bands for RFID (Radio Frequency Identification), cellular phones, etc., may be used for the frequencies f1 and f2 in the above manner.

It is preferable that the end surface of the electromagnetic wave propagation medium 1 (end surface in the direction of travel of an electromagnetic wave, which is the end surface in the Z direction in the case of the electromagnetic wave propagation medium 1 of FIG. 1) do not reflect an electromagnetic wave. However, even if the end surface does reflects the electromagnetic wave, it has less negative effect on the position detection signal because the signal attenuates during its propagation through the electromagnetic wave propagation medium 1 (attenuates heavily before reaching the end surface of the electromagnetic wave propagation medium 1). Because the position detection signal shows a large attenuation rate in the electromagnetic wave propagation medium 1, the end surface of the electromagnetic wave propagation medium 1 (end surface in the direction of travel of an electromagnetic wave, which is the end surface in the Z direction in the case of the electromagnetic wave propagation medium 1 of FIG. 1) may have an electromagnetic wave reflection property, instead of terminating with given impedance or having an electromagnetic wave absorber.

Another position detection method of this embodiment will be described, referring to FIGS. 7 and 8.

Figure 7:
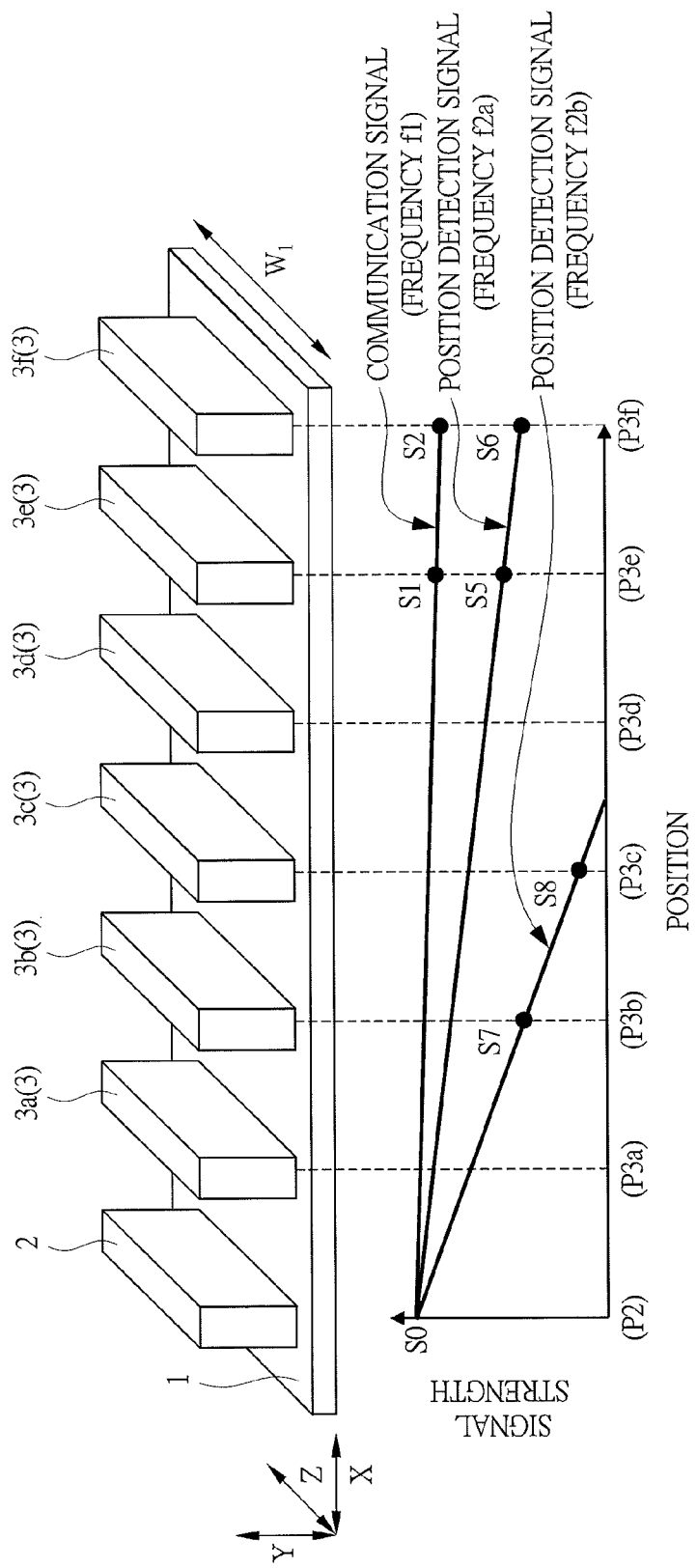
FIG. 7 is an explanatory diagram for explaining a position detection method executed by the position detection system.
Figure 8:
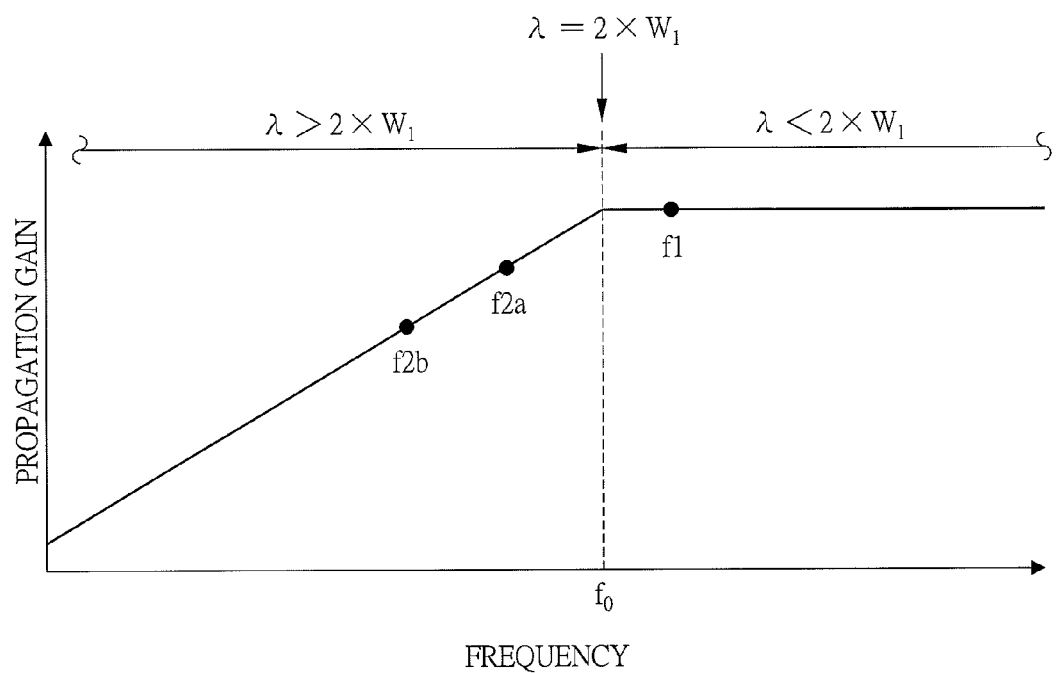
FIG. 8 is a graph indicating the propagation characteristics (frequency characteristics) of the electromagnetic wave propagation medium that results when it transmits an electromagnetic wave.

FIG. 7 is an explanatory diagram for explaining a position detection method executed by the position detection system (position detection apparatus), showing a diagram corresponding to the diagram of FIG. 6. FIG. 7 shows a graph different from the graph of FIG. 6 but depicts the same system configuration as depicted in FIG. 6 (the electromagnetic wave propagation medium 1 and the base unit 2 and terminals 3 placed thereon). The vertical axis and the horizontal axis of the graph of FIG. 7 are the same as the vertical axis and the horizontal axis of the graph of FIG. 6. FIG. 8 depicts a graph indicating the propagation characteristics (frequency characteristics) of the electromagnetic wave propagation medium 1 having the width $W_1$ that results when the electromagnetic wave propagation medium 1 transmits an electromagnetic wave, showing a graph corresponding to the graph of FIG. 5. The graph of FIG. 8 is basically the same as the graph of FIG. 5 except that frequencies f2a and f2b are indicated in the graph of FIG. 8 in place of the frequency f2 indicated in the graph of FIG. 5.

According to the position detection method described referring to FIGS. 5 and 6, the position detection signal with the frequency f2 is used for detecting the position of the terminal 3. According to the position detection method that will be described referring to FIGS. 7 and 8, a position detection signal with the frequency f2a and a position detection signal with the frequency f2b are used for detecting the position of the terminal 3.

The frequencies f2a and f2b are selected in the same manner as the frequency f2 is selected. When ordinary communication (communication not involving transmission/reception of the position detection signal) is carried out between the base unit 2 and each terminal 3 or between different terminals 3, the communication signal with the frequency f1 is used in the same manner as describe above. When detection of the position of the terminal 3 is carried out, however, the position detection signal with the frequency f2a and the position detection signal with the frequency f2b are used. The frequencies f2a and f2b are selected in the following manner.

The frequencies f2a and f2b are each selected so that the attenuation (signal strength drop) of the position detection signal with the frequency f2a that propagates through the electromagnetic wave propagation medium 1 is greater than the attenuation (signal strength drop) of the communication signal with the frequency f1 that propagates through the electromagnetic wave propagation medium 1, and so that the attenuation (signal strength drop) of the position detection signal with the frequency f2b that propagates through the electromagnetic wave propagation medium 1 is greater than the attenuation (signal strength drop) of the position detection signal with the frequency f2a that propagates through the electromagnetic wave propagation medium 1. Specifically, in an assumed case where the communication signal with the frequency f1, the position detection signal with the frequency f2a, and the position detection signal with the frequency f2b each having the same initial signal strength are input to the electromagnetic wave propagation medium 1, the position detection signal with the frequency f2a is lower in signal strength than the communication signal with the frequency f1 and the position detection signal with the frequency f2b is lower in signal strength than the position detection signal with the frequency f2a at a position at which the transmission distances of these signals are the same. The frequency f2a is lower than the frequency f1 and the frequency f2b is lower than the frequency f2a (f2b<f2a<f1). As described above, it is preferable that the frequency f1 be equal to or higher than the frequency $f_0$ (f1≥$f_0$) and that the frequencies f2a and f2b are lower than the frequency $f_0$ (f2a<$f_0$ and f2b<$f_0$). The position detection signal with the frequency f2a attenuates when it is transmitted through the electromagnetic wave propagation medium 1. However, the position detection signal with the frequency f2a is so selected as to retain sufficient signal strength that allows the signal to reach the terminal 3 located at the farthest position from the base unit 2 (terminal 3f in FIG. 7) when the signal is input from the base unit 2 to the electromagnetic wave propagation medium 1 and is transmitted therethrough. When the signal with the frequency f2a is used as the position detection signal, this position detection signal reaches every terminal 3 placed on the electromagnetic wave propagation medium 1, thus allowing each terminal 3 to detect (receive) the position detection signal. However, because the position detection signal with the frequency f2a is so selected as to retain sufficient signal strength that allows the signal to reach every terminal 3 placed on the electromagnetic wave propagation medium 1, a signal strength difference between the position detection signals with the frequency f2a received by different terminals 3 adjacent to each other turns out to be relatively small. For example, when the base unit 2 inputs a position detection signal having the signal strength S0 and the frequency f2a to the electromagnetic wave propagation medium 1 and causes the signal to propagate through electromagnetic wave propagation medium 1, the signal strength of the position detection signal with frequency f2a at the terminal 3e, where the signal is received, is S5 and the signal strength of the position detection signal with frequency f2a at the terminal 3f, where the signal is received, is S6. In this case, a difference $\Delta S_{5-6}$ between the strength S5 and the strength S6 ($\Delta S_{5-6}$=S5-S6) is relatively small. As a result, when the position detection signal with the frequency f2a is used, a signal strength detection error (error in detecting the reception signal strength of the position detection signal at each terminal 3) due to the irregularity of manufacturing of the terminals 3 and the irregularity of arrangement of the terminals 3 exerts a relatively large effect on a position detection error (error in detecting the position of each terminal 3 based on the signal strength of the position detection signal received by each terminal 3).

When the signal with the frequency f2b is used as the position detection signal, the position detection signal with the frequency f2b reaches the terminals 3a, 3b and 3c but fails to reach the terminals 3d, 3e and 3f (which means that the reception signal strength is so small that the signal cannot be detected). Specifically, when the terminals 3a, 3b, 3c, 3d, 3e, and 3f are arranged in a row in the order of proximity to the base unit 2, the position detection signal with the frequency f2b reaches the terminals 3a, 3b and 3c relatively close to the base unit 2 but fails to reach the terminals 3d, 3e and 3f farther distant from the base unit 2 than the terminals 3a, 3b and 3c. This means that the positions of some terminals (terminals 3d, 3e, and 3f in this example) cannot be detected when the signal with the frequency f2b is used. However, as to the terminals 3 (terminals 3a, 3b, and 3c in this example) reached by the signal with the frequency f2b, a signal strength difference between the position detection signals with the frequency f2b received by different terminals 3 adjacent to each other is relatively large. For example, when the base unit 2 inputs a position detection signal having the signal strength S0 and the frequency f2b to the electromagnetic wave propagation medium 1 and causes the signal to propagate through the electromagnetic wave propagation medium 1, the signal strength of the position detection signal with frequency f2b at the terminal 3b, where the signal is received, is S7 and the signal strength of the position detection signal with frequency f2b at the terminal 3c, where the signal is received, is S8. In this case, a difference $\Delta S_{7-8}$ between the strength S7 and the strength S8 ($\Delta S_{7-8}$=S7-S8) is relatively large. As a result, when the position detection signal with the frequency f2ba is used, a signal strength detection error (error in detecting the reception signal strength of the position detection signal at each terminal 3) due to the irregularity of manufacturing of the terminals 3 and the irregularity of arrangement of the terminals 3 exerts a relatively small effect on a position detection error (error in detecting the position of each terminal 3 based on the signal strength of the position detection signal received by each terminal 3).

By using the signal with the frequency f2b, therefore, position information of the terminals 3 (terminals 3a, 3b, and 3c) within the reachable range of the signal with the frequency f2b (information on the distance from the base unit 2 to each terminal 3, the position of each terminal 3 disposed on the electromagnetic wave propagation medium 1, or order of arrangement of the terminals 3 on the electromagnetic wave propagation medium 1) can be obtained at high precision. By using the signal with the frequency f2a, on the other hand, position information of the terminals 3 (terminals 3d, 3e, and 3f) that are out of the reachable range of the signal with the frequency f2b can be obtained. While the case of using two frequencies (frequencies f2a and f2b) as the frequencies of the position detection signal has been described, three or more frequencies may also be used as the frequencies of the position detection signal.

In this manner, a trade-off relation exists between the position detection range (range in which the position detection signal reaches terminals 3) and position detection precision (precision with which the position of each terminal 3 is detected). It is preferable, therefore, that the frequency of the position detection signal be selected properly according to the size of the electromagnetic wave propagation medium 1 or necessary position detection precision. A different approach may be taken such that the reception signal strength at each terminal 3 (signal strength of the position detection signal received by each terminal 3) is detected as the frequency of the position detection signal is changed, and based on properly obtained reception signal strength information, the position of the each terminal 3 is determined.

Still another position detection method of this embodiment will be described, referring to FIGS. 9 and 10.

Figure 9:
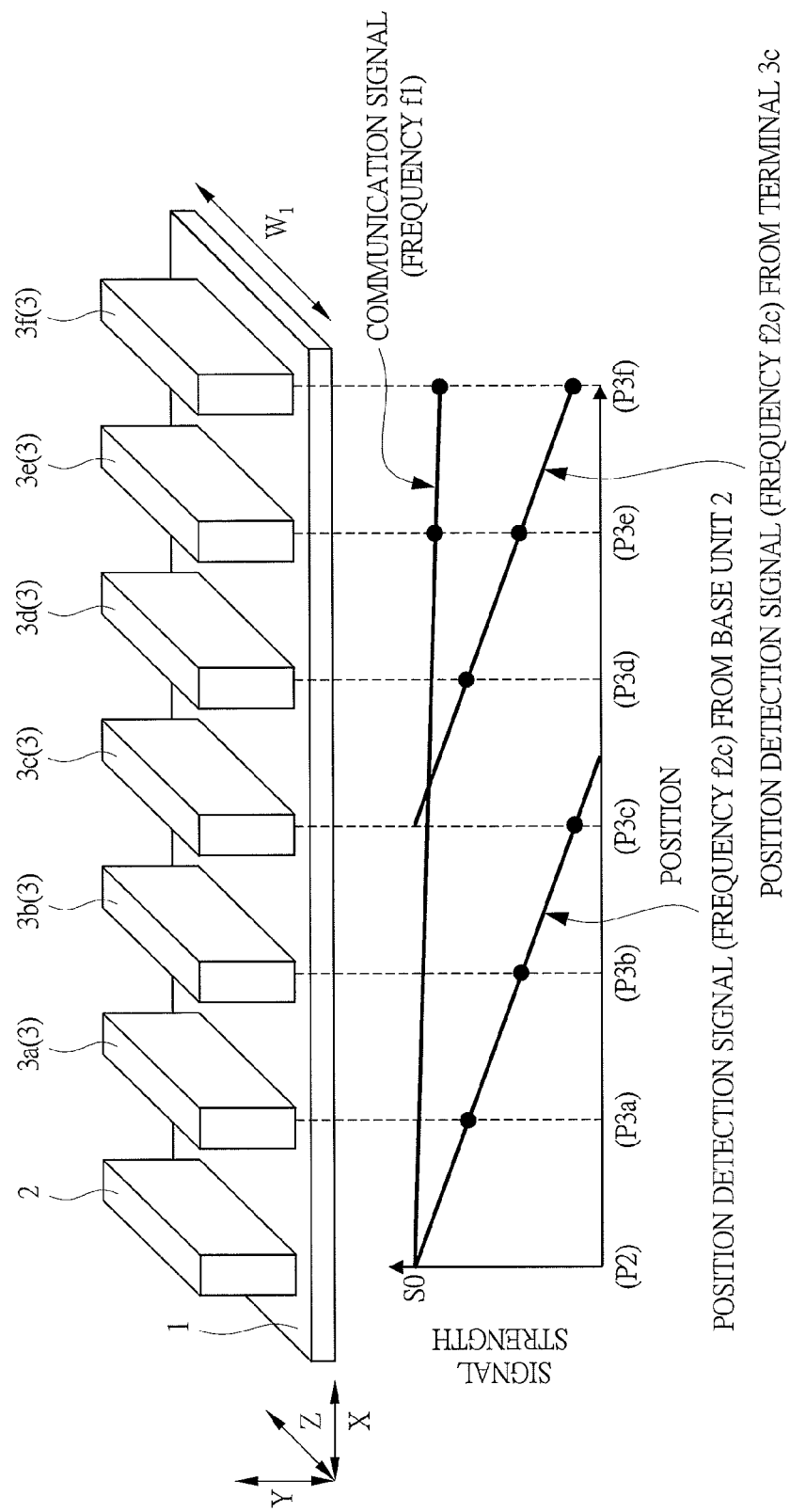
FIG. 9 is an explanatory diagram for explaining a position detection method executed by the position detection system.
Figure 10:
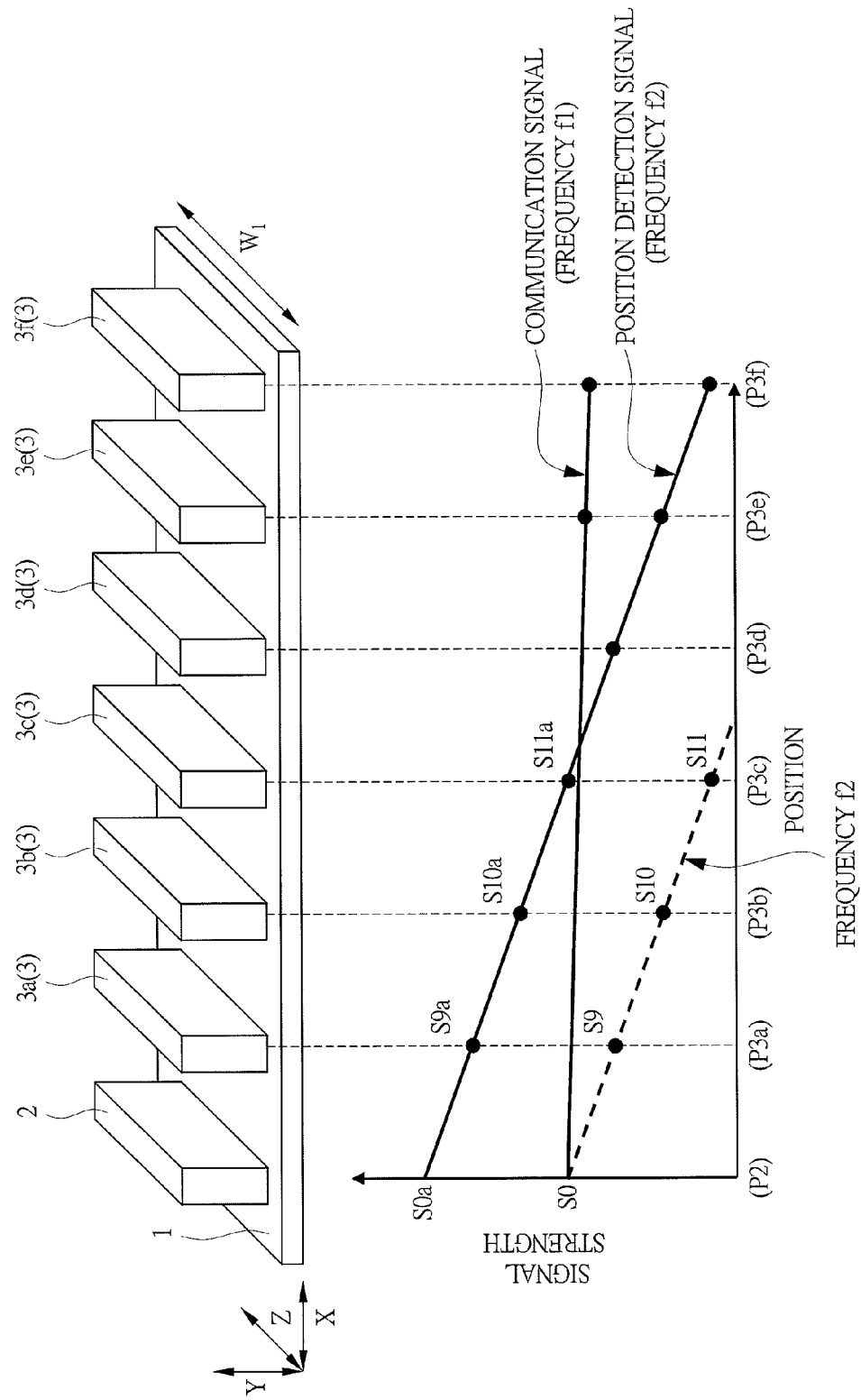
FIG. 10 is an explanatory diagram for explaining a position detection method executed by the position detection system.

FIGS. 9 and 10 are explanatory diagrams for explaining position detection methods executed by the position detection system (position detection apparatus), showing diagrams corresponding to the diagrams of FIGS. 6 and 7. FIGS. 9 and 10 show graphs different from the graphs of FIGS. 6 and 7 but depict the same system configuration as depicted in FIGS. 6 and 7 (the electromagnetic wave propagation medium 1 and the base unit 2 and terminals 3 placed thereon). The vertical axis and the horizontal axis of the graph of FIGS. 9 and 10 are the same as the vertical axis and the horizontal axis of the graph of FIG. 6.

The methods depicted in FIGS. 9 and 10 are the position detection methods for facilitating detection of the position of a terminal 3 distant from the base unit 2. The method of FIG. 9 will first be described.

According to the position detection method described referring to FIGS. 5 and 6, the position detection signal with the frequency f2 is used for detecting the position of the terminal 3. According to the position detection method that will be described referring to FIG. 9, a position detection signal with a frequency f2c is used for detecting the position of the terminal 3.

The frequency f2c is selected in the same manner as the frequency f2 is selected. When ordinary communication (communication not involving transmission/reception of the position detection signal) is carried out between the base unit 2 and each terminal 3 or between different terminals 3, the communication signal with the frequency f1 is used in the same manner as describe above. When detection of the position of the terminal 3 is carried out, however, the position detection signal with the frequency f2c is used. The frequency f2c is selected in the following manner.

The frequency f2c is selected so that the attenuation (signal strength drop) of the position detection signal with the frequency f2c that propagates through the electromagnetic wave propagation medium 1 is greater than the attenuation (signal strength drop) of the communication signal with the frequency f1 that propagates through the electromagnetic wave propagation medium 1. Specifically, in an assumed case where the communication signal with the frequency f1 and the position detection signal with the frequency f2c each having the same initial signal strength are input to the electromagnetic wave propagation medium 1, the position detection signal with the frequency f2c is lower in signal strength than the communication signal with the frequency f1 at a position at which the transmission distances of these signals are the same. The frequency f2c is lower than the frequency f1 (f2c<f1). It is preferable that the frequency f1 be equal to or higher than the frequency $f_0$ (f1≥$f_0$) and that the frequency f2c is lower than the frequency $f_0$ (f2c<$f_0$).

The communication signal with the frequency f1 that is input from the base unit 2 to the electromagnetic wave propagation medium 1 attenuates little in the electromagnetic wave propagation medium 1, so that the communication signal can surely be transmitted to the terminal 3 that is the farthest from the base unit 2 (terminal 3f in FIG. 9) among the terminals 3 placed on the electromagnetic wave propagation medium 1. Hence the strength S2 of the communication signal received by the terminal 3 that is the farthest from the base unit 2 (terminal 3f in FIG. 9) can be made relatively large. This means that the frequency f1 is selected so that the communication signal with the frequency f1 attenuates little during its propagation through the electromagnetic wave propagation medium 1 and that when the communication signal with the frequency f1 is input from the base unit 2 to the electromagnetic wave propagation medium 1 and is transmitted therethrough, the communication signal reaches the terminal 3 that is the farthest from the base unit 2 (terminal 3f in FIG. 9). However, the position detection signal with the frequency f2c attenuates heavily in the electromagnetic wave propagation medium 1. If the transmission power of the position detection signal is determined to be the same as that of the communication signal (which is the case where the signal strength of the communication signal and that of the position detection signal are determined to be the same when both signal are input to the electromagnetic wave propagation medium 1), the position detection signal with the frequency f2c input from the base unit 2 to the electromagnetic wave propagation medium 1 does not reach the terminal 3 that is the farthest from the base unit 2 (terminal 3f in FIG. 9). This means that the frequency f2c is selected so that the position detection signal with the frequency f2c attenuates during its propagation through the electromagnetic wave propagation medium 1 and that when the position detection signal with the frequency f2c is input from the base unit 2 to the electromagnetic wave propagation medium 1 and is transmitted therethrough, the position detection signal does not reach the terminal 3 that is the farthest from the base unit 2 (terminal 3f in FIG. 9).

According to the method of FIG. 9, the positions of the terminals 3a, 3b, and 3c are detected first, using the position detection signal with the frequency f2c input from the base unit 2 to the electromagnetic wave propagation medium 1. When the base unit 2 inputs a position detection signal having the signal strength S0 and the frequency f2c to the electromagnetic wave propagation medium 1 and causes the signal to propagate through electromagnetic wave propagation medium 1, this position detection signal reaches the terminals 3a, 3b, and 3c, which, therefore, are able to receive the incoming position detection signal. Hence, based on the reception signal strength of the position detection signal transmitted from the base unit 2 and received by each of the terminals 3a, 3b, and 3c (signal strength of the received position detection signal), position information of each of the terminals 3a, 3b, and 3c (information on the distance from the base unit 2 to each of the terminals 3a, 3b, and 3c, the position of each of the terminals 3a, 3b, and 3c disposed on the electromagnetic wave propagation medium 1, or order of arrangement of the terminals 3a, 3b, and 3c on the electromagnetic wave propagation medium 1) can be obtained. Each of the terminals 3a, 3b, and 3c transmits information of the reception signal strength of the position detection signal from the base unit 2, to the base unit 2 through the electromagnetic wave propagation medium 1 (at which the information should preferably be transmitted in the form of the communication signal with the frequency f1). The base unit 2 receives the information of the reception signal strength of the position detection signal at each of terminals 3a, 3b, and 3c and based on the received information, obtains (determines) the position information of each of the terminals 3a, 3b, and 3c.

Then, the terminal 3c, which is the farthest from the base unit 2 among the terminals 3a, 3b, and 3c whose positions have been detected, transmits a position detection signal through the electromagnetic wave propagation medium 1, and the terminals 3d, 3e, and 3f receive this position detection signal so that their positions are detected. Based on an instruction from the base unit 2 (which instruction is the communication signal with the frequency f1 that is transmitted from the base unit 2 through the electromagnetic wave propagation medium 1 to the terminal 3c), the terminal 3c inputs the position detection signal having the signal strength S0 and the frequency f2c to the electromagnetic wave propagation medium 1 and causes the signal to propagate through the electromagnetic wave propagation medium 1. This position detection signal from the terminal 3c reaches the terminals 3d, 3e, and 3f, which, therefore, are able to receive the incoming position detection signal. In the same manner as the position detection signal transmitted by the base unit 2, the position detection signal from the terminal 3c attenuates more heavily than the communication signal does during propagation through the electromagnetic wave propagation medium 1. Hence, based on the reception signal strength of the position detection signal transmitted from the terminal 3c and received by each of the terminals 3d, 3e, and 3f, position information of each of the terminals 3d, 3e, and 3f (information on the distance from the terminal 3c to each of the terminals 3d, 3e, and 3f, the position of each of the terminals 3d, 3e, and 3f disposed on the electromagnetic wave propagation medium 1, or order of arrangement of the terminals 3d, 3e, and 3f on the electromagnetic wave propagation medium 1) can be obtained. Each of the terminals 3d, 3e, and 3f transmits information of the reception signal strength of the position detection signal from the terminal 3c, to the base unit 2 through the electromagnetic wave propagation medium 1 (at which the information should preferably be transmitted in the form of the communication signal with the frequency f1). The base unit 2 receives the information of the reception signal strength of the position detection signal at each of terminals 3d, 3e, and 3f. Hence the base unit 2 is able to combine the information of reception signal strength of the position detection signal transmitted from the terminal 3c and received by each of the terminals 3d, 3e, and 3f, the information being transmitted from each of the terminals 3d, 3e, and 3f to the base unit 2, with the information of reception signal strength of the position detection signal transmitted from the base unit 2 and received by each of the terminals 3a, 3b, and 3c, the information having been transmitted from each of the terminals 3a, 3b, and 3c to the base unit 2 before transmission of the reception signal strength information from each of the terminals 3d, 3e, and 3f to the base unit 2. In this manner, position information of each of the terminals 3a, 3b, 3c, 3d, 3e, and 3f (information on the distance from the base unit 2 to each of the 3a, 3b, 3c, 3d, 3e, and 3f, the position of each of the terminals 3a, 3b, 3c, 3d, 3e, and 3f disposed on the electromagnetic wave propagation medium 1, or order of arrangement of the terminals 3a, 3b, 3c, 3d, 3e, and 3f on the electromagnetic wave propagation medium 1) can be obtained (determined).

In this manner, the position of a terminal 3 not reached by the position detection signal transmitted by the base unit 2 (terminals 3d, 3e, and 3f in this example) can also be detected. In other words, the position of a terminal far distant from the base unit 2 can be detected accurately. It is unnecessary for the position detection signal from the base unit 2 to reach all the terminals 3 but is enough to reach some terminals 3. For this reason, the extent of attenuation of the position detection signal transmitted through the electromagnetic wave propagation medium 1 (which extent is indicated as the gradients of the position detection signal curves in the graph of FIG. 9) can be increased, so that the precision of detection of the position of the terminal 3 can be improved. When the electromagnetic wave propagation medium 1 carrying the base unit 2 and terminals 3 placed thereon is long (which means that the transmission distance of a signal transmitted through the electromagnetic wave propagation medium 1 is long), this position detection method is applied effectively.

The terminal 3 that transmits the position detection signal is not limited to the terminal 3 that is the farthest from the base unit 2 among terminals 3 whose positions have been detected. For example, in the case of FIG. 9, after the positions of the terminals 3a, 3b, and 3c are detected using the position detection signal from the base unit 2, the terminal 3b may transmit the position detection signal through the electromagnetic wave propagation medium 1, in place of the terminal 3c. However, in the case where the terminal 3 that is the farthest from the base unit 2 among terminals 3 whose positions have been detected (terminal 3c in FIG. 9) transmits the position detection signal through the electromagnetic wave propagation medium 1, the range of detection of the position of the terminal 3 can be expanded as the number of transmissions of position detection signals is kept low.

If one terminal 3 (terminal 3c in FIG. 9) out of terminals 3 whose positions have been detected transmits a position detection signal and the other terminals 3 (terminals 3a and 3b in FIG. 9) of the terminals 3 whose positions have been detected receives the transmitted position detection signal, the result of position detection by the base unit 2 is re-confirmed, which improves position detection precision.

A method indicated in FIG. 10 will then be described.

The method of FIG. 10 is the same as the method of FIG. 9 in that the frequency f1 is used as the frequency of the communication signal and the frequency f2 is used as the frequency of the position detection signal. Description of the frequency f1 and the frequency f2, therefore, will be omitted.

The communication signal having the strength S0 and the frequency f1 that is input from the base unit 2 to the electromagnetic wave propagation medium 1 attenuates little in the electromagnetic wave propagation medium 1, so that the communication signal can surely be transmitted to the terminal 3 that is the farthest from the base unit 2 (terminal 3f in FIG. 9) among multiple terminals 3 placed on the electromagnetic wave propagation medium 1. Hence the signal strength of the communication signal received by the terminal 3 that is the farthest from the base unit 2 (terminal 3f in FIG. 9) can be made relatively large. However, the position detection signal with the frequency f2c attenuates heavily in the electromagnetic wave propagation medium 1. If the base unit 2 transmits the position detection signal using the same amount of transmission power used for transmitting the communication signal, the position detection signal with the frequency f2c input from the base unit 2 to the electromagnetic wave propagation medium 1 does not reach the terminal 3 that is the farthest from the base unit 2 (terminal 3f in FIG. 9). Specifically, as indicated by a broken line in a graph of FIG. 10, when the signal strength (input strength) of the position detection signal input from the base unit 2 to the electromagnetic wave propagation medium 1 is determined to be the strength S0 that is the same as the signal strength (input strength) of the communication signal input from the base unit 2 to the electromagnetic wave propagation medium 1, the position detection signal from the base unit 2 reaches the terminals 3a, 3b, and 3c but fails to reach the terminals 3d, 3e, and 3f because the position detection signal attenuates during its transmission through the electromagnetic wave propagation medium 1. As a result, the terminals 3a, 3b, and 3c succeed in receiving the position detection signal from the base unit 2 but the terminals 3d, 3e, and 3f fail in receiving the signal.

According to the method of FIG. 10, as indicated by a continuous line in the graph of FIG. 10, transmission power used by the base unit 2 for transmitting the position detection signal is increased so that the position detection signal reaches the terminals 3d, 3e, and 3f. In other words, the base unit 2 transmits the position detection signal using a larger amount of power than an amount of power used for transmitting the communication signal, which means that the signal strength (input strength) S0a of the position detection signal input from the base unit 2 to the electromagnetic wave propagation medium 1 is determined to be larger than the signal strength S0 of the communication signal input from the base unit 2 to the electromagnetic wave propagation medium 1, that is, S0a>S0 is satisfied. As a result, although the position detection signal attenuates in the electromagnetic wave propagation medium 1, increasing the signal strength (S0a) of the position detection signal input from the base unit 2 to the electromagnetic wave propagation medium 1 allows the position detection signal to reach all the terminals 3 including the terminals 3d, 3e, and 3f placed on the electromagnetic wave propagation medium 1, thus allowing all the terminals 3 including the terminals 3d, 3e, and 3f to receive the position detection signal. Hence the position detection signal is caused to reach a terminal 3 that cannot be reached by the position detection signal transmitted by the same amount of transmission power as used for transmission of the communication signal (terminal 3d, 3e, and 3f in FIG. 10), which enables detection of the position of the terminal 3 based on the reception signal strength of the position detection signal. As a result, the positions of all the terminals 3 placed on the electromagnetic wave propagation medium can be detected. In addition, because the extent of attenuation of the position detection signal transmitted through the electromagnetic wave propagation medium 1 (which extent is indicated as the gradient of the position detection signal curve in the graph of FIG. 10) is increased, the precision of detection of the position of the terminal 3 is improved.

According to the method of FIG. 10, the positions of the terminals 3a, 3b, and 3c may be detected based on reception signal strength S9, S10 and S1 that result when the position detection signal transmitted by the same amount of transmission power as used for transmission of the communication signal (position detection signal with the input strength S0) is used, or may be detected based on reception signal strength S9a, S10a and S11a that result when the position detection signal transmitted by a larger amount of transmission power than an amount of transmission power used for transmission of the communication signal (position detection signal with the input strength S0a) is used. When the base unit 2 inputs the position detection signal by the same amount of transmission power as used for transmission of the communication signal (position detection signal having the input strength S0 and the frequency f2c) to the electromagnetic wave propagation medium 1, the signal strength of the position detection signal received by the terminal 3a is S9, the signal strength of the position detection signal received by the terminal 3b is S10, and the signal strength of the position detection signal received by the terminal 3c is S11. When the base unit 2 inputs the position detection signal by a larger amount of transmission power (position detection signal having the input strength S0a and the frequency f2c) to the electromagnetic wave propagation medium 1, the signal strength of the position detection signal received by the terminal 3a is S9a, the signal strength of the position detection signal received by the terminal 3b is S10a, and the signal strength of the position detection signal received by the terminal 3c is S11a.

In this manner, detection of the positions of the terminals 3d, 3e, and 3f is carried out in such a way that the base unit 2 inputs the position detection signal by a larger amount of transmission power than an amount of transmission power used for transmission of the communication signal (position detection signal having the input strength S0a) to the electromagnetic wave propagation medium 1 and the positions of the terminals 3d, 3e, and 3f are detected based on the reception signal strength of the position detection signal at the terminals 3d, 3e, and 3f. In detection of the positions of the terminals 3a, 3b, and 3c, on the other hand, the position detection signal from the base unit 2 reaches the terminals 3a, 3b, and 3c without requiring increased transmission power. Therefore, detection of the positions of the terminals 3a, 3b, and 3c is carried out in such a way that the base unit 2 inputs the position detection signal by a larger amount of transmission power than an amount of transmission power used for transmission of the communication signal to the electromagnetic wave propagation medium 1 and the positions of the terminals 3a, 3b, and 3c are detected based on the reception signal strength (S9a, S10a, and S11a) of the position detection signal received by the terminals 3a, 3b, and 3c, respectively, or such a way that the base unit 2 inputs the position detection signal by the same amount of transmission power as used for transmission of the communication signal to the electromagnetic wave propagation medium 1 and the positions of the terminals 3a, 3b, and 3c are detected based on the reception signal strength (S9, S10, and S11) of the position detection signal received by the terminals 3a, 3b, and 3c, respectively.

When the base unit 2 inputs the position detection signal by a larger amount of transmission power than an amount of transmission power used for transmission of the communication signal (position detection signal having the input strength S0a) to the electromagnetic wave propagation medium 1 and the terminals 3a, 3b, and 3c receive the incoming position detection signal, the reception signal strength S9a, S10a, and S11a at the terminal 3a, 3b, and 3c becomes larger than the reception signal strength of the communication signal (i.e., the strength of the communication signal received by the terminal 3a, 3b, and 3c). For this reason, the receivable signal strength range of each terminal 3 needs to be raised to the reception signal strength S9a, S10a, and S11a.

If the method of FIG. 9 and the method of FIG. 10 are combined and executed, the transmission power of the base unit 2 for transmitting the position detection signal (input strength S0 of the position detection signal) does not always have to be increased so that the position detection signal reaches every terminal 3 whose presence is confirmed through communication. Eliminating the need of a transmission power increase in this manner suppresses an expansion of the transmission power adjustment range of the base unit 2.

Another method may also be applicable, by which the transmission power of the base unit 2 for transmitting the position detection signal is decreased (to be smaller than the transmission power for transmitting the communication signal) while the number of terminals 3 that transmit a position detection signal is increased. For example, an amount of transmission power for transmitting the position detection signal from the base unit 2 is decreased to an amount of transmission power with which the position detection signal reaches a position not farther than the terminal b. The positions of the terminals 3a and 3b are detected using the position detection signal, and then the terminal 3b transmits another position detection signal. The position detection signal from the terminal 3b reaches a position not farther than the terminal 3d, so that the positions of the terminals 3c and 3d are detected using that position detection signal. The terminal 3d then transmits another position detection signal, which is used to detect the positions of the terminals 3e and 3f. In this manner, transmission power for transmitting each position detection signal can be reduced, which may be effective for reducing power needed for detecting the positions of all the terminals 3.

Still another position detection method of this embodiment will be described, referring to FIGS. 11 and 12.

Figure 11:
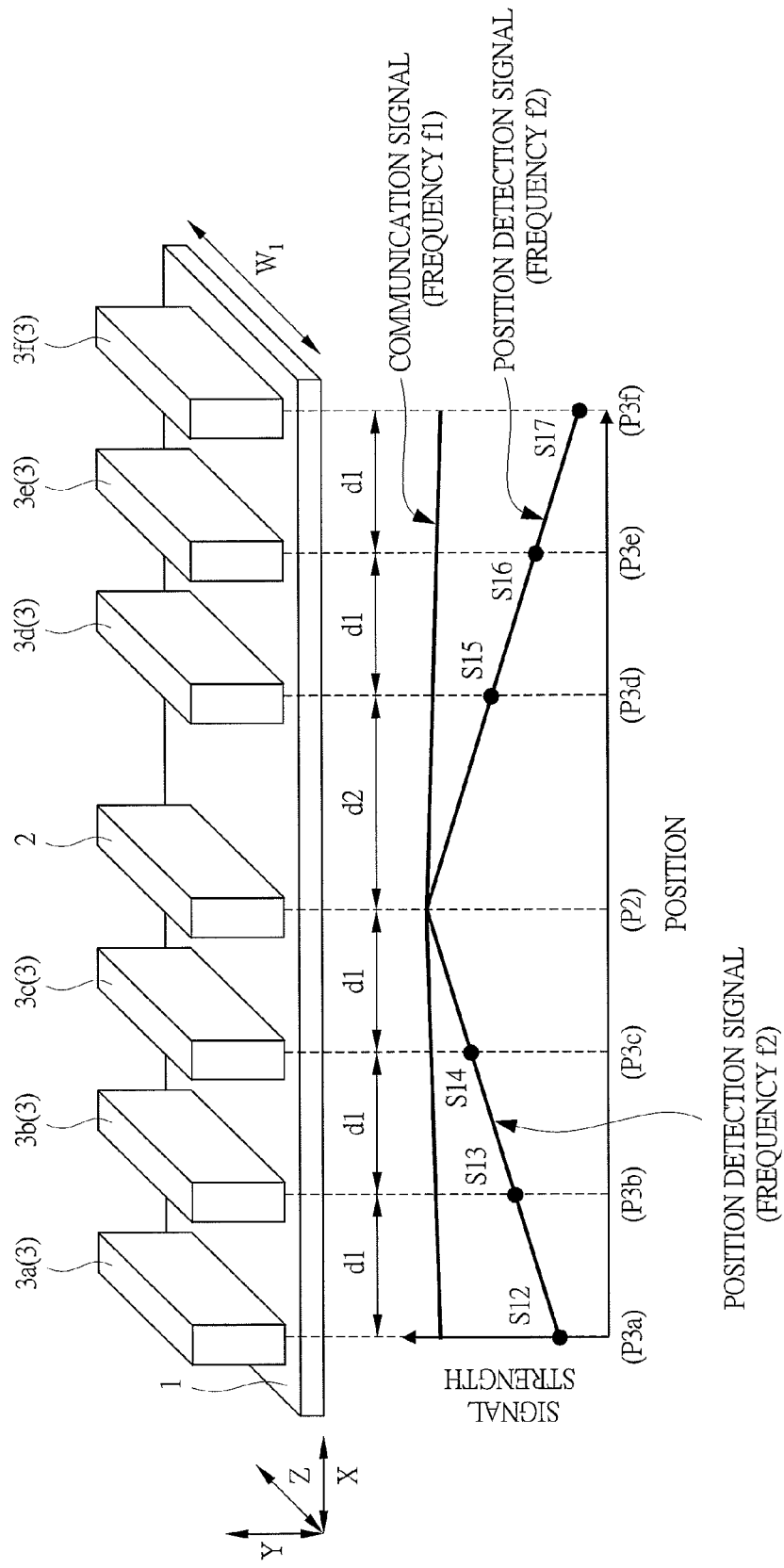
FIG. 11 is an explanatory diagram for explaining a position detection method executed by the position detection system.

FIG. 11 is an explanatory diagram for explaining a position detection method executed by the position detection system (position detection apparatus), showing a diagram corresponding to the diagram of FIG. 6. The vertical axis and the horizontal axis of the graph of FIG. 11 are the same as the vertical axis and the horizontal axis of the graph of FIG. 6. FIG. 12 is a diagram of the position detection system of FIG. 11 (including the electromagnetic wave propagation medium 1 and the base unit 2 and terminals 3 placed thereon) from which terminals 3 are removed, showing a perspective view (explanatory diagram) of the electromagnetic wave propagation medium 1 having the base unit 2 placed thereon (a state of the electromagnetic wave propagation medium 1 before placing the terminals 3 thereon).

The position detection system of FIG. 11 (including the electromagnetic wave propagation medium 1 and the base unit 2 and terminals 3 placed thereon) is different from the position detection system of FIG. 6 (including the electromagnetic wave propagation medium 1 and the base unit 2 and terminals 3 placed thereon) in the following aspects.

According to the position detection system of FIGS. 1 and 6, the base unit 2 is placed on an end (in the X direction) of the upper surface of the electromagnetic wave propagation medium 1 and all terminals 3 are arranged in one direction of moving away from the base unit 2 along the X direction. In other words, the base unit 2, the terminal 3a, the terminal 3b, the terminal 3c, the terminal 3d, the terminal 3e, and the terminal 3f are arranged in increasing order on the electromagnetic wave propagation medium 1. In contrast, according to the position detection system of FIG. 11, the base unit 2 is placed near the center in the X direction of the upper surface of the electromagnetic wave propagation medium 1 and two groups of terminals 3 are arranged in two direction of moving away from the base unit 2 along the X direction. In other words, in a view from the base unit 2, two groups of terminals 3 are arranged in the X1 direction of moving away from the base unit 2 and in the X2 direction of moving away from the base unit 2, respectively. In FIG. 11, the terminals 3d, 3e, and 3f are arranged in the X1 direction while the terminals 3a, 3b, and 3c are arranged in the X2 direction. The X1 and X2 directions are equivalent to the X direction but are defined as the directions opposite to each other. In other words, the terminal 3a, the terminal 3b, the terminal 3c, the base unit 2, the terminal 3d, the terminal 3e, and the terminal 3f are arranged in increasing order on the electromagnetic wave propagation medium 1.

According to the position detection system of FIG. 11, the base unit 2 is not present on the end (in the X direction) of the electromagnetic wave propagation medium 1 and the terminals 3 are arranged in two directions (X1 direction and X2 direction) with respect to the base unit 2. Because of this configuration, the position of each terminal 3 cannot be identified by merely detecting the distance between each terminal 3 and the base unit 2. To such a case, another method for detecting (identifying) the position of each terminal 3 applies. According to this method, the base unit 2 has (obtains) "information on the shape of the electromagnetic wave propagation medium 1" in advance and the position of each terminal 3 is detected (identified) based on combined information of each candidate position of placement of each terminal on the electromagnetic wave propagation medium 1 and the distance between the base unit 2 and each terminal 3 (which can be detected based on the reception signal strength of a position detection signal at each terminal 3).

The "information on the shape of the electromagnetic wave propagation medium 1" means information of positions at which the terminals 3 can be placed (disposed) on the electromagnetic wave propagation medium 1 (candidate positions of placement of the terminals 3), such as the positions of slots SL on the electromagnetic wave propagation medium 1, and therefore can be rephrased as "information on the placement-allowable positions (placement candidate positions) of the terminals 3 on the electromagnetic wave propagation medium 1". This information will be described specifically.

For example, when the electromagnetic wave propagation medium 1 has the configuration in which the slots SL are arranged in the same manner as shown in FIG. 2, the positions of placement (placement-allowable positions) of the terminals 3 on the electromagnetic wave propagation medium 1 are limited to the positions corresponding to the positions of the slots SL. When distances between the slots SL and the base unit 2 on the electromagnetic wave propagation medium 1 are all different for each slot SL, the correspondence between each terminal 3 and the each slot SL can be ensured by detecting the distance between each terminal 3 and the base unit 2 based on the reception signal strength of the position detection signal at each terminal 3. In other words, which terminal 3 is placed on which slot SL can be detected, which means that the position of each terminal 3 can be detected.

Figure 12:
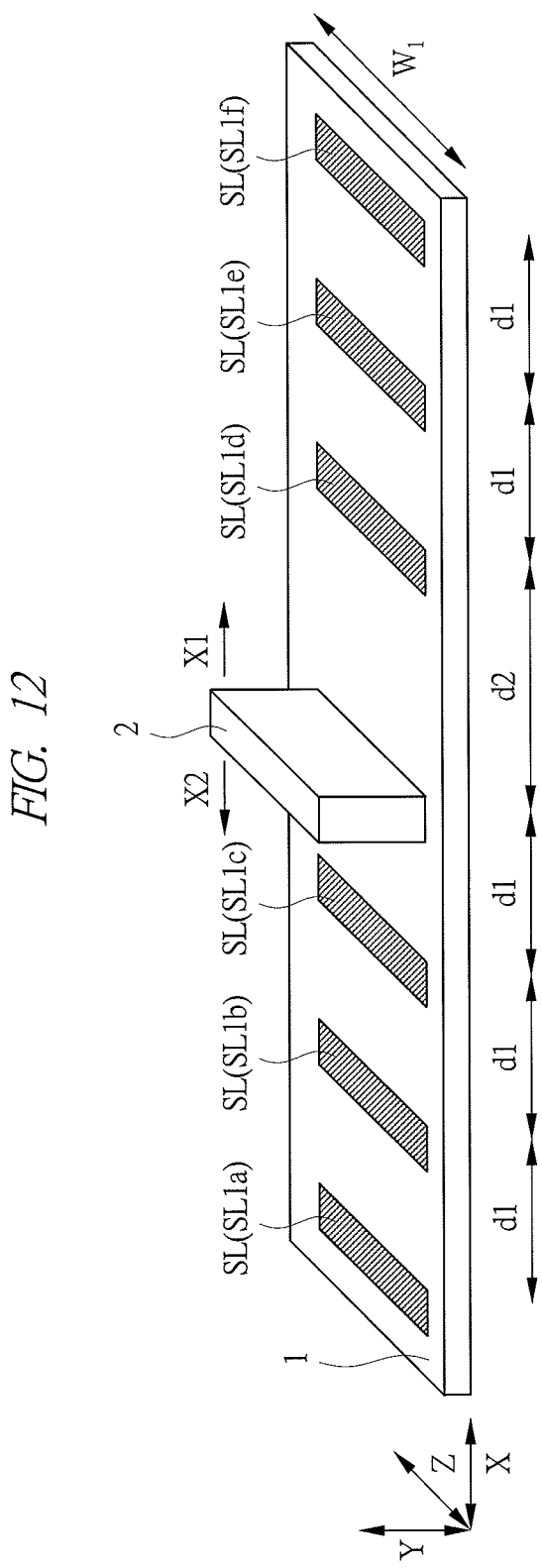
FIG. 12 is a diagram of the position detection system of FIG. 11 from which terminals are removed.

For example, as shown in FIG. 12, on the electromagnetic wave propagation medium 1, a group of slots SL are arranged in the X2 direction at respective positions separated away from the base unit 2 (specifically, the slot SL on which the base unit 2 is placed) distance d1 by distance d1 while another group of slots SL are arranged in the X1 direction at a position separated away from the base unit 2 (specifically, the slot SL on which the base unit 2 is placed) across a distance d2 and at respective positions further separated away from that position (position separated away from the base unit 2 in the X1 direction across the distance d2) distance d1 by distance d1.

In the case of FIG. 12, slots SL placed on the electromagnetic wave propagation medium 1 are slots SL1a, SL1b, SL1c, SL1d, SL1e, and SL1f, which are arranged in the increasing order of SL1a, SL1b, SL1c, base unit 2 (specifically, the slot SL on which the base unit 2 is placed), SL1d, SL1e, and SL1f. The distance between the SL1a and the SL1b, between the SL1b and the SL1c, between the SL1d and the SL1e, between the SL1e and the SL1f, and between the base unit 2 (specifically, the slot SL on which the base unit 2 is placed) and the SL1c are each equal to the distance d1. The distance between the base unit 2 (specifically, the slot SL on which the base unit 2 is placed) and the slot SL1d is equal to the distance d2. This distance d2 is determined to be a distance not the integral multiple of the distance d1 (for example, the distance d2 is determined to be 1.5 times the distance d1). Hence all the distances between the slots SL and the base unit 2 on the electromagnetic wave propagation medium 1 are determined to be different for each slot SL.

Specifically, the distance between the slot SL1a and the base unit 2 is d1×3, the distance between the slot SL1b and the base unit 2 is d1×2, the distance between the slot SL1c and the base unit 2 is d1, the distance between the slot SL1d and the base unit 2 is d1+d2, the distance between the slot SL1e and the base unit 2 is d1×2+d2, and the distance between the slot SL1f and the base unit 2 is d1×3+d2. In this configuration, if the distance d2 is not the integral multiple of the distance d1 (for example, the distance d2 is 1.5 times the distance d1), the distance between the slot SL1a and the base unit 2, the distance between the slot SL1b and the base unit 2, the distance between the slot SL1c and the base unit 2, the distance between the slot SL1d and the base unit 2, the distance between the slot SL1e and the base unit 2, and the distance between the slot SL1f and the base unit 2 are different from each other.

In this manner, all the distances between the slots SL and the base unit 2 are determined to be different from each other (no match to each other) for each slot SL. When the terminals 3 are placed in the slots SL, therefore, all the distances between the terminals 3 and the base unit 2 are determined to be different from each other (no match to each other) for each terminal 3.

As described above referring to FIG. 6, the distance between the base unit 2 and each terminal 3 is detected such that the base unit 2 transmits a position detection signal (with the frequency f2) through the electromagnetic wave propagation medium 1 and based on the reception signal strength of the position detection signal at each terminal 3, the distance between the base unit 2 and each terminal 3 is detected. In the case of FIG. 11, the base unit 2 inputs the position detection signal (with the frequency f2) to the electromagnetic wave propagation medium 1 and causes the position detection signal to propagate through the electromagnetic wave propagation medium 1 in the X1 direction so that the terminals 3a, 3b, and 3c receive the incoming position detection signal. The base unit 2 also inputs the position detection signal (with the frequency f2) to the electromagnetic wave propagation medium 1 and causes the position detection signal to propagate through the electromagnetic wave propagation medium 1 in the X2 direction so that the terminals 3d, 3e, and 3f receive the incoming position detection signal. Based on the reception signal strength S12, S13, S14, S15, S16, and S17 at the terminals 3a, 3b, 3c, 3d, 3e, and 3f, the distance between the base unit 2 and each of the terminals 3a, 3b, 3c, 3d, 3e, and 3f can be detected. Because the distances between the base unit 2 and the terminals 3a, 3b, 3c, 3d, 3e, and 3f are different from each other, the values of the reception signal strength S12 at the terminal 3a, reception signal strength S13 at the terminal 3b, reception signal strength S14 at the terminal 3c, reception signal strength S15 at the terminal 3d, reception signal strength S16 at the terminal 3e, and reception signal strength S17 at the terminal 3f are different from each other. By identifying the distance between the base unit 2 and each of the terminals 3a, 3b, 3c, 3d, 3e, and 3f, which of the terminals 3a, 3b, 3c, 3d, 3e, and 3f is placed in which of the slots SL1a, SL1b, SL1c, SL1d, SL1e, and SL1f can be determined. As described above, the distances between the slots SL and the base unit 2 are determined to be different from each other (no match to each other) for each slot SL and the information on the positions of the slots SL on the electromagnetic wave propagation medium 1 is obtained in advance. As a result, by identifying the distance between the base unit 2 and each terminal 3 based on the strength of the position detection signal, which terminal 3 is placed in which slot can be determined.

Specifically, the position detection signal transmitted from the base unit 2 through the electromagnetic wave propagation medium 1 is received by each terminal 3 (3a, 3b, 3c, 3d, 3e, and 3f), information on the reception signal strength (S12, S13, S14, S15, S16, and S17) of the position detection signal at each terminal 3 is transmitted from each terminal 3 through the electromagnetic wave propagation medium 1 to the base unit 2 (at which the information should preferably be transmitted as the communication signal with the frequency f1), and the base unit 2 receives the incoming information. Based on the received information on the reception signal strength (S12, S13, S14, S15, S16, and S17) at each terminal 3, the base unit 2 can identify (detect) the position of placement of each terminal 3. The information on the shape of the electromagnetic wave propagation medium 1 (information on the placement-allowable positions of the terminals 3 on the electromagnetic wave propagation medium 1) and the data of the correlation between the signal strength of the signal with the frequency f2 and its transmission distance (which is equivalent to the data shown in the graph of FIG. 6) are saved by the base unit 2 in advance but may be saved by the terminal 3. These pieces of information may be saved by a device provided as a separate device to the base unit 2 and the terminal 3 and may be sent from the device to the base unit 2 through communication between them when necessary. Based on the information on the reception signal strength (S12, S13, S14, S15, S16, and S17) of the position detection signal at each terminal 3, the information on the shape of the electromagnetic wave propagation medium 1 (information on the placement-allowable positions of the terminals 3 on the electromagnetic wave propagation medium 1), and the data of the correlation between the signal strength of the signal with the frequency f2 and its transmission distance (which is equivalent to the data shown in the graph of FIG. 6), the base unit 2 can identify (detect) the position of placement of each terminal 3. The position of each terminal 3 is detected in this manner.

Even in the case where the electromagnetic wave propagation medium 1 is configured to allow the terminals 3 to be placed anywhere on the electromagnetic wave propagation medium 1, as shown in FIG. 3, for applications in which the positions of placement of terminals 3 are determined (e.g., a rack, encased server, storage, uninterruptible power supply, secondary battery, such as lithium battery, power converter, photovoltaic power generation system, etc.), the terminals 3 can be so arranged that terminals 3 equal to each other in their distance to the base unit 2 do not exist. In such applications in which the positions of placement of terminals 3 are determined, because multiple terminals having the same function are arranged, the relation between the IDs and positions of placement of the terminals 3 is information that does not become known until position detection is carried out.

As described above referring to FIG. 9, the distance between different terminals 3 can be detected by allowing not only the base unit 2 but also a terminal 3 (e.g., terminal 3c, 3d, etc.) to transmit the position detection signal. By using information of the distance between different terminals 3 based on reception signal strength detected when the position detection signal from one terminal (e.g., terminal 3c, 3d, etc.) is received by a different terminal 3 (e.g., terminal 3a, 3b, 3c, 3e, 3f, etc.), in addition to information of the distance between the base unit 2 and each terminal 3 based on reception signal strength detected when the position detection signal from the base unit 2 is received by each terminal 3, the position of each terminal 3 can be detected even if terminals 3 equal to each other in their distance to the base unit 2 exist.

For example, if the distance d2 between the terminal 3d and the base unit 2 is different from the distance between each of other terminals 3 (terminals 3 other than the terminal 3d) and the base unit 2, the position of the terminal 3d can be detected using the position detection signal from the base unit 2 (which means that the terminal 3 whose distance to the base unit 2 is determined to be d2 based on the reception signal strength of the position detection signal transmitted from the base unit 2 and received by each terminal 3 can be identified as the terminal 3d). However, in an assumed case where the distance between the terminal 3a and the terminal 3b is not d1 but is d2, the terminal 3a and the terminal 3f are located at positions separated from the base unit 2 across the same distance (d1×2+d2), in which case the terminal 3a cannot be distinguished from the terminal 3f based on the information of their distances to the base unit 2 only (which information is obtained based on the reception signal strength of the position detection signal from the base unit 2). However, by adding information of the distance from the terminal 3d to the terminals 3a and 3f (which information is obtained based on the reception signal strength of a position detection signal transmitted from the terminal 3d) to the information of the distances to the base unit 2, the terminal 3a can be distinguished from the terminal 3f.

Based on the reception signal strength of the position detection signal transmitted from the base unit 2 through the electromagnetic wave propagation medium 1 and received by each terminal 3, the distance between the base unit 2 and each terminal 3 is detected, by which the terminal 3d whose distance to the base unit 2 is d2 is identified first (because only one terminal 3 has the distance d2 to the base unit 2).

Subsequently, based on the reception signal strength of the position detection signal transmitted from the terminal 3d through the electromagnetic wave propagation medium 1 and received by each terminal 3 (other than the terminal 3d), the distance between the terminal 3d and the each terminal 3 (other than the terminal 3d) is detected. Hence, based on both of information of the reception signal strength of the position detection signal transmitted from the base unit 2 (i.e., information of the distance to the base unit 2) and information of the reception signal strength of the position detection signal transmitted from the terminal 3d (i.e., information of the distance to the terminal 3d), the position of each terminal 3 (3a, 3b, 3c, 3e, 3f) other than the terminal 3d can be identified. In this manner, the position of every terminal 3 can be identified.

When the terminals 3 are place (arranged) in two directions (e.g., X1 direction and X2 direction) with respect to the position of the base unit 2 as the reference position, if at least the distance between one terminal 3 and the base unit 2 and the distance between another terminal 3 and the base unit 2 do not match, the positions of all terminal 3 can be detected by using information given by combining distance information with information on the shape of the electromagnetic wave propagation medium 1 (information of the placement-allowable positions of the terminals on the electromagnetic wave propagation medium 1).

Figure 13:
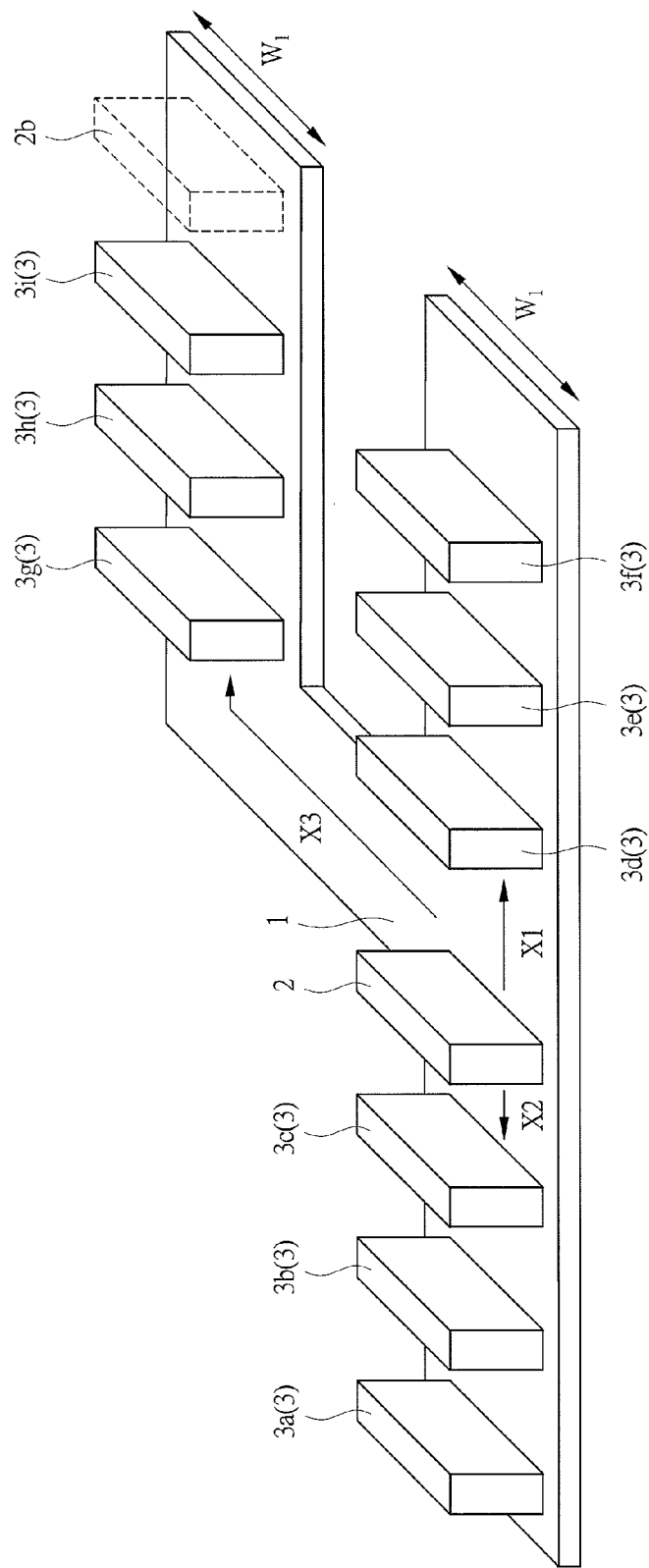
FIG. 13 is an explanatory diagram of a modification of the position detection system of FIG. 11.

This conclusion holds true even if the shape of the electromagnetic wave propagation medium 1 is as complicated as a shape shown in FIG. 13. FIG. 13 is an explanatory diagram (perspective view) of a modification of the position detection system (position detection apparatus) of FIG. 11.

FIG. 13 depicts an example in which the electromagnetic wave propagation medium 1 of FIG. 11 branches from an area between the base unit 2 and the terminal 3d and terminals 3 (terminals 3g, 3h, and 3i) are placed on a branched part of the electromagnetic wave propagation medium 1. In the case of FIG. 13, therefore, the terminals 3 are placed (arranged) in three directions with respect to the position of the base unit 2 as the reference position. Specifically, the terminals 3 are arranged in three directions of moving away from the base unit 2 along the electromagnetic wave propagation medium 1. The three directions consists of the X2 direction in which the terminal 3c, 3b, and 3a are arranged in order in the direction of moving away from the base unit 2, the X1 direction in which the terminal 3d, 3e, and 3f are arranged in order in the direction of moving away from the base unit 2, and an X3 direction in which the terminal 3g, 3h, and 3i are arranged in order in the direction of moving away from the base unit 2.

In the case of FIG. 13, in the same manner as in the above cases, when the distances between the terminals 3 and the base unit 2 are all different from each other for each terminal 3, the distance between the base unit 2 and each terminal 3 is detected based on the reception signal strength of the position detection signal transmitted from the base unit 2 through the electromagnetic wave propagation medium 1 and received by each terminal 3, and distance information is combined with information on the shape of the electromagnetic wave propagation medium 1 (information of the placement-allowable positions of the terminals on the electromagnetic wave propagation medium 1). Hence the position of each terminal 3 can be identified.

In the case of FIG. 13, for example, if the distance between the terminal 3c and the base unit 2 and between the terminal 3d and the base unit 2 do not match the distances between other terminals 3 and the base unit 2 and detection of the positions of the terminals 3a and 3d is possible, the positions of other terminals 3 can be detected based on their positional relations with the terminals 3a and 3d. For example, if the distance between the terminal 3c and the base unit 2 is different from the distance between other terminals 3 (terminals 3 other than the terminal 3c) and the base unit 2 and the distance between the terminal 3d and the base unit 2 is different from the distance between other terminals 3 (terminals 3 other than the terminal 3d) and the base unit 2, the distance between the base unit 2 and each terminal 3 is detected based on the reception signal strength of the position detection signal transmitted from the base unit 2 through the electromagnetic wave propagation medium 1 and received by each terminal 3, and therefore the positions of the terminals 3c and 3d can be detected. Then, based on the reception signal strength of a position detection signal transmitted from the terminal 3c through the electromagnetic wave propagation medium 1 and received by each terminal 3 (other than the terminal 3c), the distance between the terminal 3c and each terminal 3 (other than the terminal 3c) is detected. Likewise, based on the reception signal strength of a position detection signal transmitted from the terminal 3d through the electromagnetic wave propagation medium 1 and received by each terminal 3 (other than the terminal 3d), the distance between the terminal 3d and each terminal 3 (other than the terminal 3d) is detected. Hence, based on information of the reception signal strength of the position detection signal transmitted from the base unit 2 (i.e., information of the distance to the base unit 2), information of the reception signal strength of the position detection signal transmitted from the terminal 3c (i.e., information of the distance to the terminal 3c), and information of the reception signal strength of the position detection signal transmitted from the terminal 3d (i.e., information of the distance to the terminal 3d), the positions of the terminals 3 (3a, 3b, 3e, 3f, 3g, 3h, 3i) other than the terminals 3c and 3d can be identified. In this manner, the position of every terminal 3 can be identified.

Through an expanded application of such a method, the positions of the terminals 3 arranged two-dimensionally or three-dimensionally can also be detected.

When one or more cases of match of the distance between one terminal and the base unit 2 to the distance between another terminal and the base unit 2 exist among the distances between all terminals 3 and the base unit 2 and therefore the position of the terminal 3 cannot be identified, a base unit (base unit 2b indicated by a broken line in FIG. 13) different from the existing base unit 2 is added to the system to make detection of the positions of all terminals 3 possible. When the distance between one terminal 3 and the base unit 2 matches the distance between any one of the terminals 3 other than the one terminal 3 and the base unit 2 and such a case applies to any one of all terminals 3, the position of each terminal 3 cannot be identified by detecting the distance between the base unit 2 and each terminal 3 based on the reception signal strength of a position detection signal transmitted from one base unit 2 and received by each terminal 3. To deal with this problem, an additional base unit different from the existing base unit 2 is also placed on the electromagnetic wave propagation medium 1. The positions of placement of the base unit 2 and additional base unit are known in advance. The distance between the base unit 2 and each terminal 3 is detected based on the reception signal strength of the position detection signal transmitted from the base unit 2 and received by each terminal 3, and the distance between the additional base unit and each terminal 3 is also detected based on the reception signal strength of a position detection signal transmitted from the additional base unit and received by each terminal 3. By combining information of the distance to the base unit 2 with information of the distance to the additional base unit, therefore, the position of each terminal 3 can be identified.

For example, as shown in FIG. 13, the additional base unit 2b (which is indicated by a broken line because the additional base unit is placed or not placed on a case by case basis) is placed on the right to the terminal 3i (on an end of the branched part of electromagnetic wave propagation medium 1 extending in the X3 direction). This additional base unit 2b may be incorporated in the communication system only when the position of the terminal 3 is detected so that following the end of the position detection, the communication system is operated without the additional base unit that is removed from the system. The method of using the additional base unit effectively applies to an application in which once the position of each terminal 3 is detected at the start of the system, the terminals 3 are kept stationary during the operation of the system.

Figure 14:
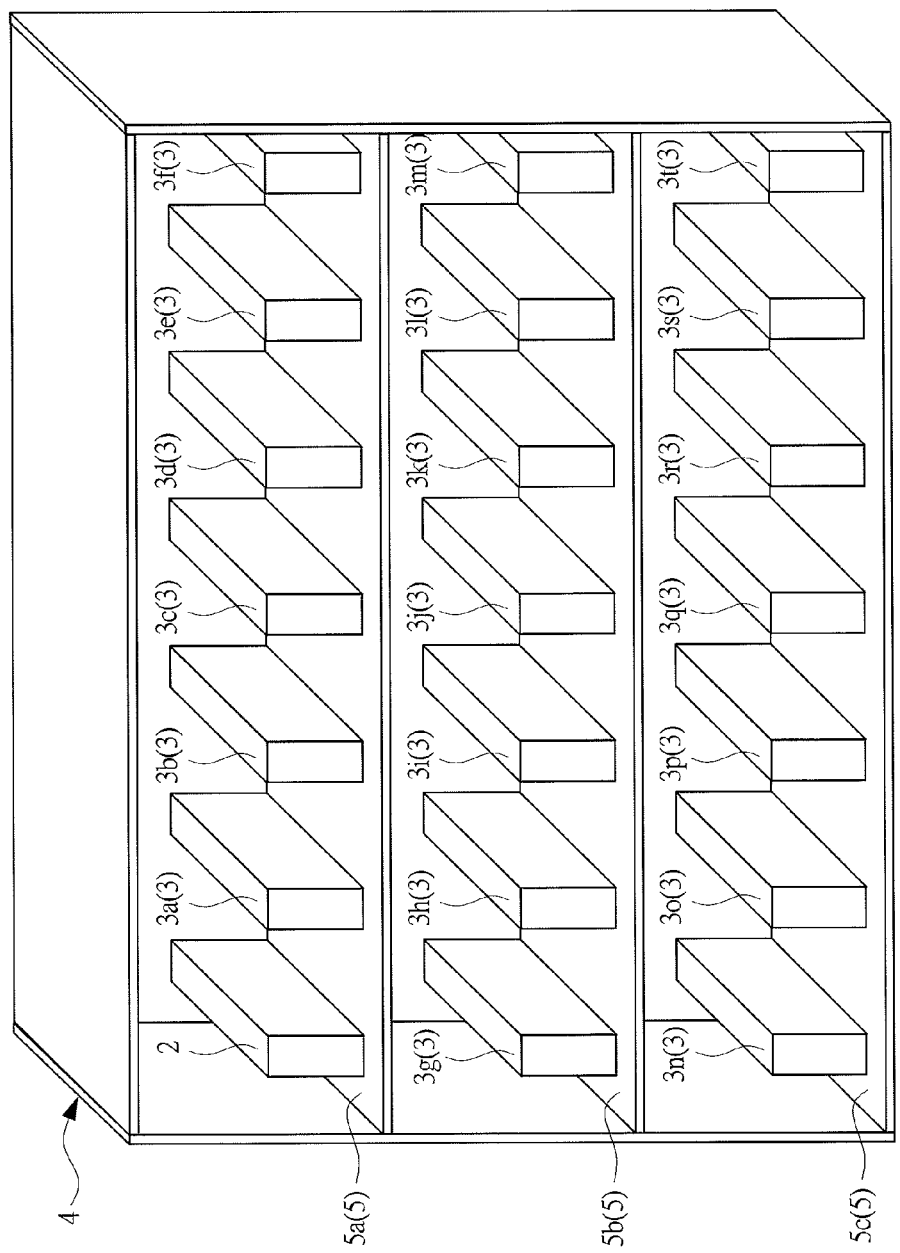
FIG. 14 is an explanatory diagram (perspective view) of a configuration example of a communication system in which a base unit and terminals are housed in a housing.

FIG. 14 is an explanatory diagram (perspective view) of a configuration example (of the position detection system or communication system) in which the base unit 2 and the terminals 3 are housed in a housing.

According to the position detection system (communication system) of FIG. 14, the base unit 2 and multiple terminals 3 (20 terminals 3a to 3t in FIG. 14) are placed on shelf boards 5 (three shelf boards 5a, 5b, and 5c in FIG. 14) in the housing 4. The housing 4 is, for example, a server, storage, secondary battery, such as lithium battery, power converter rack, battery module housing case, or photovoltaic power generator's frame. In FIGS. 15 to 17 and 32, for more understandable explanation, the housing 4 is omitted from the drawings that depict only the shelf boards 5 to show examples of the position detection system (position detection apparatus) using the electromagnetic wave propagation medium 1.

Figure 15:
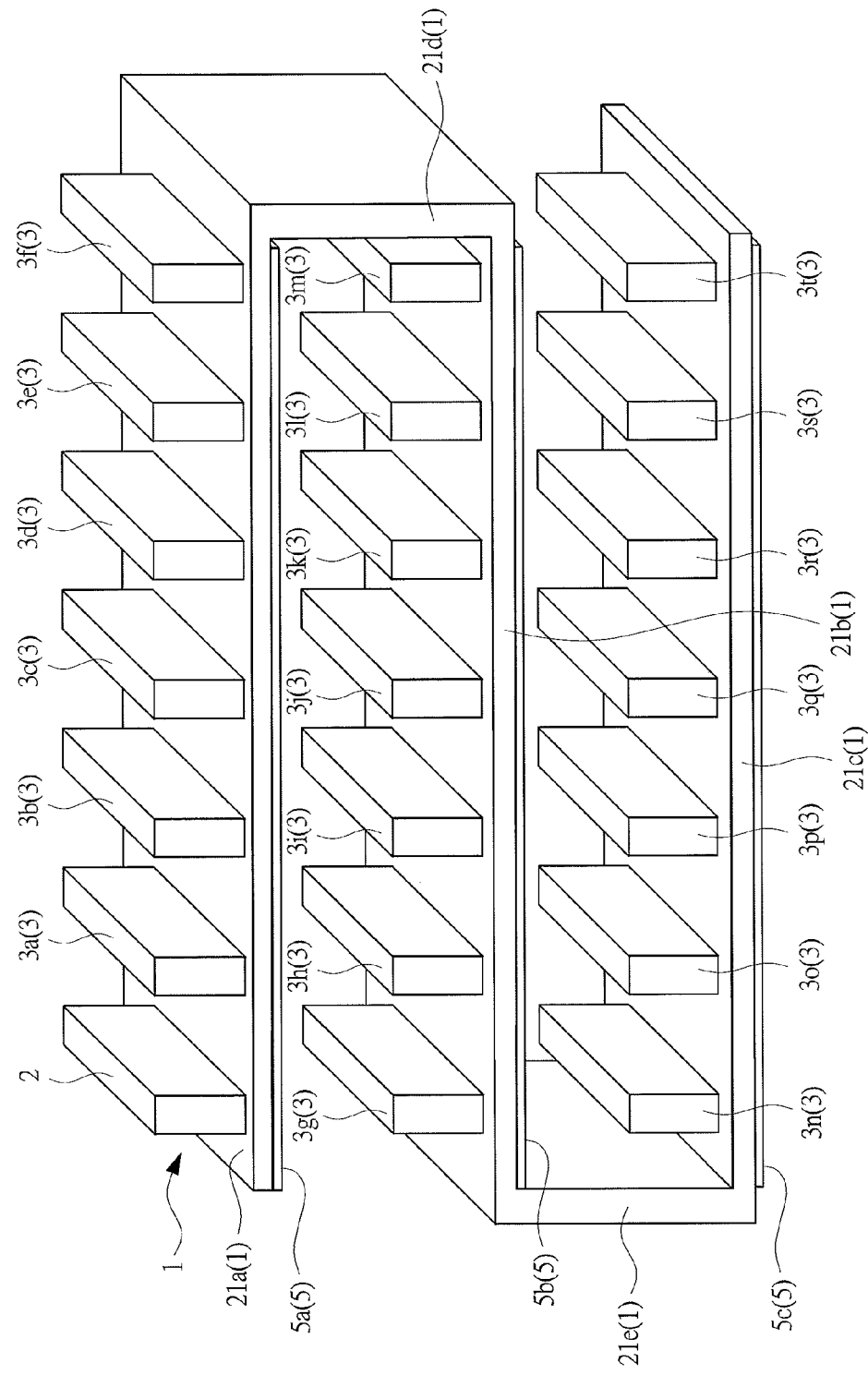
FIG. 15 is an explanatory diagram (perspective view) of a configuration example of the position detection system in which the base unit and terminals are housed in the housing and the electromagnetic wave propagation medium is placed in the housing.

FIG. 15 is an explanatory diagram (perspective view) of a configuration example of the position detection system (position detection apparatus) in which the base unit 2 and terminals 3 are housed in the housing and the electromagnetic wave propagation medium 1 is placed (disposed) under the base unit 2 and terminals 3.

In FIG. 15, the electromagnetic wave propagation medium 1 is placed on the shelf boards 5a, 5b, and 5c and extends continuously by meandering along upper and lower rows of the shelf boards.

In the case of FIG. 15, the electromagnetic wave propagation medium 1 has an electromagnetic wave propagation medium portion 21a placed on the shelf board 5a, an electromagnetic wave propagation medium portion 21b placed on the shelf board 5b, and an electromagnetic wave propagation medium portion 21c placed on the shelf board 5c. The electromagnetic wave propagation medium 1 also has an electromagnetic wave propagation medium portion 21d continuously and integrally connecting the electromagnetic wave propagation medium portion 21a to the electromagnetic wave propagation medium portion 21b, and an electromagnetic wave propagation medium portion 21e continuously and integrally connecting the electromagnetic wave propagation medium portion 21b to the electromagnetic wave propagation medium portion 21c.

The shelf boards 5a, 5b, and 5c are arranged vertically such that they are almost parallel with each other across gaps and that the shelf board 5b is above the shelf board 5c while the shelf board 5a is above the shelf board 5b. As a result, the electromagnetic wave propagation medium portion 21b placed on the shelf board 5b is located above the electromagnetic wave propagation medium portion 21c placed on the shelf board 5c, and the electromagnetic wave propagation medium portion 21a placed on the shelf board 5a is located above the electromagnetic wave propagation medium portion 21b placed on the shelf board 5b. In other words, the electromagnetic wave propagation medium portions 21a, 21b, and 21c are arranged vertically such that they are almost parallel with each other across gaps and that the electromagnetic wave propagation medium portion 21b is located above the electromagnetic wave propagation medium portion 21c while the electromagnetic wave propagation medium portion 21a is located above the electromagnetic wave propagation medium portion 21b.

Because each of the shelf boards 5a, 5b, and 5c is of a horizontal tabular shape, for example, out of the electromagnetic wave propagation portions making up the electromagnetic wave propagation medium 1, the electromagnetic wave propagation medium portion 21a placed on the board 5a, the electromagnetic wave propagation medium portion 21b placed on the board 5b, and the electromagnetic wave propagation medium portion 21c placed on the board 5c are each made into a horizontal tabular shape. Out of the electromagnetic wave propagation portions making up the electromagnetic wave propagation medium 1, the electromagnetic wave propagation medium portion 21d continuously connecting the electromagnetic wave propagation medium portion 21a placed on the shelf board 5a to the electromagnetic wave propagation medium portion 21b placed on the shelf board 5b and the electromagnetic wave propagation medium portion 21e continuously connecting the electromagnetic wave propagation medium portion 21b placed on the shelf board 5b to the electromagnetic wave propagation medium portion 21c placed on the shelf board 5c are each made into a tabular shape extending vertically (in the direction almost perpendicular to the horizontal direction). The electromagnetic wave propagation medium portion 21b placed on the shelf board 5b has one side connected to the electromagnetic wave propagation medium portion 21d and the other side connected to the electromagnetic wave propagation medium portion 21e, and both sides are opposite to each other.

This means that the electromagnetic wave propagation medium portion 21a is connected to the electromagnetic wave propagation medium portion 21d, whose one end opposite to the other end connected to the electromagnetic wave propagation medium portion 21a is connected to the electromagnetic wave propagation medium portion 21b, whose one end opposite to the other end connected to the electromagnetic wave propagation medium portion 21d is connected to the electromagnetic wave propagation medium portion 21e, whose one end opposite to the other end connected to the electromagnetic wave propagation medium portion 21b is then connected to the electromagnetic wave propagation medium portion 21c. Hence the electromagnetic wave propagation medium portion 21a, the electromagnetic wave propagation medium portion 21d, the electromagnetic wave propagation medium portion 21b, the electromagnetic wave propagation medium portion 21e, and the electromagnetic wave propagation medium portion 21c are arranged in increasing order (corresponding to the electromagnetic wave propagation direction) as a continuously extending integral structure, thus forming the whole structure of the electromagnetic wave propagation medium 1. In this structure, therefore, although the electromagnetic wave propagation medium portion 21a, the electromagnetic wave propagation medium portion 21b, and the electromagnetic wave propagation medium portion 21c are arranged as vertically separated portions, the electromagnetic wave propagation direction is observed as one direction in an overall view of the electromagnetic wave propagation medium 1 (direction in which an electromagnetic wave travels through the electromagnetic wave propagation medium portions 21a, 21d, 21b, 21e, and 21c in order). This means that the electromagnetic wave propagation medium 1 extends continuously along the electromagnetic wave propagation direction (one direction).

The base unit 2 and multiple terminals 3 are placed (disposed) on the horizontal electromagnetic wave propagation medium portions 21a, 21b, and 21c of the electromagnetic wave propagation medium 1. In FIG. 15, the base unit 2 and the terminals 3a to 3f are placed (disposed) on the electromagnetic wave propagation medium portion 21a, the terminals 3g to 3m are placed (disposed) on the electromagnetic wave propagation medium portion 21b, and the terminals 3n to 3t are placed (disposed) on the electromagnetic wave propagation medium portion 21c.

In this configuration, a communication signal or position detection signal input from the base unit 2 to the electromagnetic wave propagation medium 1 (electromagnetic wave propagation medium portion 21a) travels through the electromagnetic wave propagation medium portion 21a, the electromagnetic wave propagation medium portion 21d, the electromagnetic wave propagation medium portion 21b, the electromagnetic wave propagation medium portion 21e, and the electromagnetic wave propagation medium portion 21c in order, that is, propagates through the electromagnetic wave propagation medium 1, and is received by each terminal 3. Hence communication between the base unit 2 and the terminals 3 and detection of the position of each terminal 3 are carried out.

To put it another way, the position detection signal input from the base unit 2 to the electromagnetic wave propagation medium 1 propagates to the position of placement of the terminal 3a, to the position of placement of the terminal 3b, . . . , to the position of placement of the terminal 3f in order, and propagates to the position of placement of the terminal 3m, to the position of placement of the terminal 3l, . . . , to the position of placement of the terminal 3g in order, and then propagates to the position of placement of the terminal 3n, to the position of placement of the terminal 3o, . . . , to the position of placement of the terminal 3t in order.

By laying the electromagnetic wave propagation medium 1 as a continuous structure, even if the terminals 3 are arranged in separate rows (three rows in the case of FIG. 15), all of the terminals 3 arranged in separate rows (three rows in the case of FIG. 15) can be placed on a single structure of the electromagnetic wave propagation medium 1, which means all terminals 3 (terminals 3a to 3t) can be lined up one-dimensionally on the electromagnetic wave propagation medium 1. By applying the above described method for detecting the position of the terminal 3 to the configuration of FIG. 15, therefore, the distance between the base unit 2 and each terminal 3 can be detected based on the reception signal strength of the position detection signal at each terminal 3. By grasping the distance between the base unit 2 and each terminal 3, at which position on which row (on which of the electromagnetic wave propagation medium portions 21a, 21b, and 21c, that is, on which of the shelf boards 5a, 5b, and 5c) each terminal 3 is placed can be determined.

In FIG. 15, the electromagnetic wave propagation medium 1 is laid under the base unit 2 and the terminals 3 (which means that the base unit 2 and the terminals 3 are placed on the upper surface of the electromagnetic wave propagation medium 1). However, the electromagnetic wave propagation medium 1 may be so disposed as to hang over the base unit 2 and the terminals 3 (which means that the base unit 2 and the terminals 3 are placed on the lower surface of the electromagnetic wave propagation medium 1).

Figure 16:
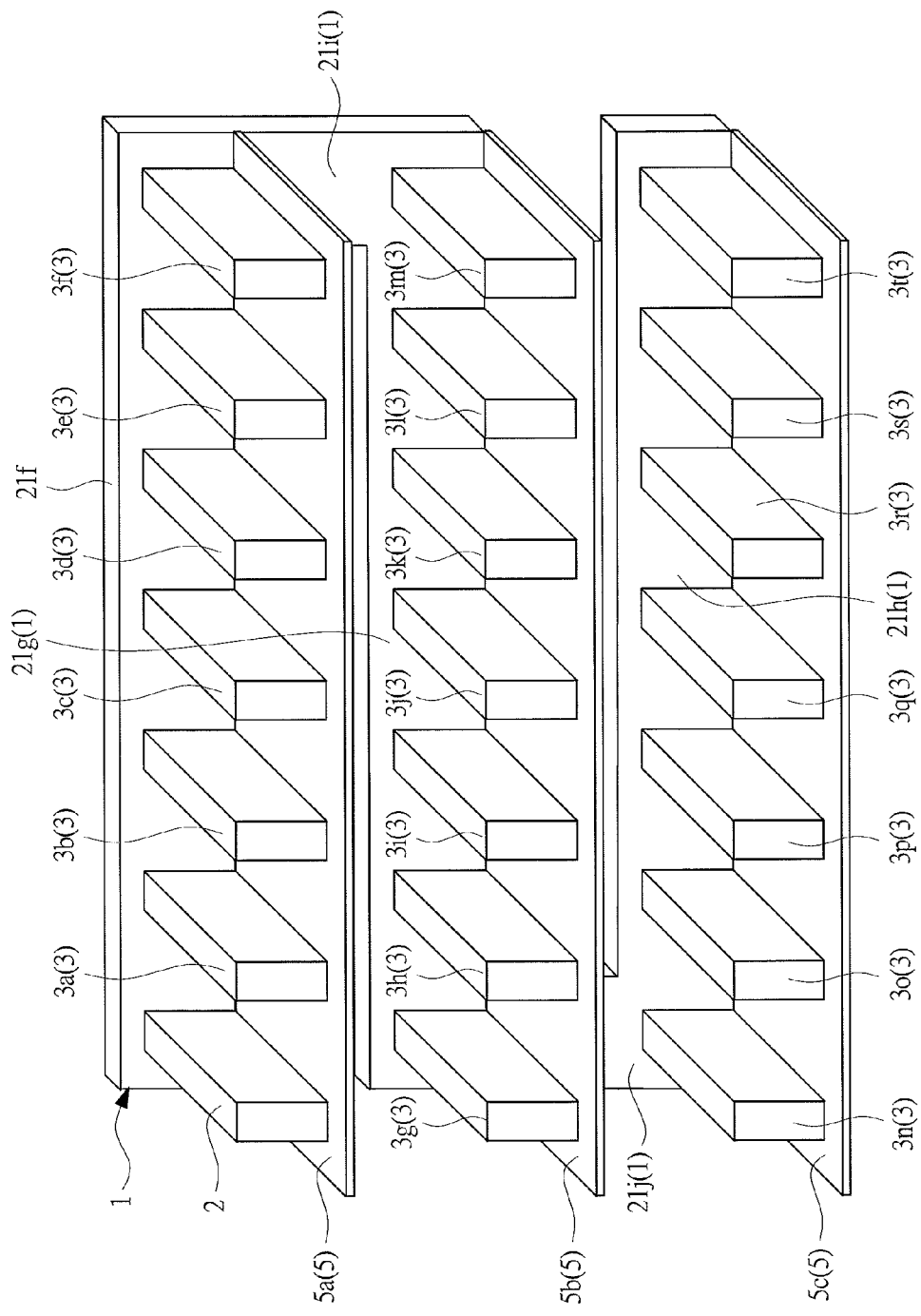
FIG. 16 is an explanatory diagram (perspective view) of another configuration example of the position detection system in which the base unit and terminals are housed in the housing and the electromagnetic wave propagation medium is placed in the housing.

FIG. 16 depicts a modification of the configuration of FIG. 15, showing an explanatory diagram (perspective view) of a configuration example of the position detection system (position detection apparatus) in which the base unit 2 and the terminals 3 are housed in the housing and the electromagnetic wave propagation medium 1 is placed (disposed) on the back of the base unit 2 and the terminals 3.

In FIG. 16, the electromagnetic wave propagation medium 1 is placed on the back of the shelf boards 5a, 5b, and 5c and extends continuously by meandering along upper and lower rows of the shelf boards.

In the case of FIG. 16, the electromagnetic wave propagation medium 1 has an electromagnetic wave propagation medium portion 21f placed on the back of the shelf board 5a, an electromagnetic wave propagation medium portion 21g placed on the back of the shelf board 5b, and an electromagnetic wave propagation medium portion 21h placed on the back of the shelf board 5c. The electromagnetic wave propagation medium 1 also has an electromagnetic wave propagation medium portion 21i continuously and integrally connecting the electromagnetic wave propagation medium portion 21f to the electromagnetic wave propagation medium portion 21g, and an electromagnetic wave propagation medium portion 21j continuously and integrally connecting the electromagnetic wave propagation medium portion 21g to the electromagnetic wave propagation medium portion 21h.

The shelf boards 5a, 5b, and 5c are arranged vertically such that they are almost parallel with each other across gaps and that the shelf board 5b is above the shelf board 5c while the shelf board 5a is above the shelf board 5b, and each of the shelf boards 5a, 5b, and 5c is of a horizontal tabular shape. Because of arrangement of the electromagnetic wave propagation medium portions 21f, 21g, and 21h on the back of the shelf boards 5a, 5b, and 5c, each of the electromagnetic wave propagation medium portions 21f, 21g, and 21h is made into a tabular shape almost perpendicular to each of the shelf boards 5a, 5b, and 5c.

Hence the electromagnetic wave propagation medium portion 21f, the electromagnetic wave propagation medium portion 21i, the electromagnetic wave propagation medium portion 21g, the electromagnetic wave propagation medium portion 21j, and the electromagnetic wave propagation medium portion 21h are arranged in increasing order (corresponding to the electromagnetic wave propagation direction) as a continuously extending integral structure, thus forming the whole structure of the electromagnetic wave propagation medium 1. In this structure, the electromagnetic wave propagation direction is observed as one direction in an overall view of the electromagnetic wave propagation medium 1 (direction in which an electromagnetic wave travels through the electromagnetic wave propagation medium portions 21f, 21i, 21g, 21j, and 21h in order). This means that the electromagnetic wave propagation medium 1 extends continuously along the electromagnetic wave propagation direction (one direction). The base unit 2 and multiple terminals 3 are placed on the shelf boards 5 and are so attached to the electromagnetic wave propagation medium portions 21f, 21g, and 21h of the electromagnetic wave propagation medium 1 that an electromagnetic wave (communication signal and position detection signal) can be input/output to/from the electromagnetic wave propagation medium portions 21f, 21g, and 21h. In FIG. 16, the base unit 2 and the terminals 3a to 3f are placed on the shelf board 5a and are attached to the electromagnetic wave propagation medium portions 21f of the electromagnetic wave propagation medium 1 (so that an electromagnetic wave can be input/output to/from the electromagnetic wave propagation medium portions 21f), the terminals 3g to 3m are placed on the shelf board 5b and are attached to the electromagnetic wave propagation medium portions 21g of the electromagnetic wave propagation medium 1 (so that an electromagnetic wave can be input/output to/from the electromagnetic wave propagation medium portions 21g), and the terminals 3n to 3t are placed on the shelf board 5c and are attached to the electromagnetic wave propagation medium portions 21h of the electromagnetic wave propagation medium 1 (so that an electromagnetic wave can be input/output to/from the electromagnetic wave propagation medium portions 21h).

In this configuration, a communication signal or position detection signal input from the base unit 2 to the electromagnetic wave propagation medium 1 (electromagnetic wave propagation medium portion 21f) travels through the electromagnetic wave propagation medium portion 21f, the electromagnetic wave propagation medium portion 21i, the electromagnetic wave propagation medium portion 21g, the electromagnetic wave propagation medium portion 21j, and the electromagnetic wave propagation medium portion 21h in order, that is, propagates through the electromagnetic wave propagation medium 1, and is received by each terminal 3. Hence communications between the base unit 2 and the terminals 3 and detection of the position of each terminal 3 are carried out.

According to this configuration of FIG. 16, by laying the electromagnetic wave propagation medium 1 as a continuous structure in the same manner as in the configuration of FIG. 15, even if the terminals 3 are arranged in separate rows (three rows in the case of FIG. 16), all of the terminals 3 arranged in separate rows (three rows in the case of FIG. 16) can be placed on a single structure of the electromagnetic wave propagation medium 1, which means all terminals 3 (terminals 3a to 3t) can be lined up one-dimensionally on the single structure of the electromagnetic wave propagation medium 1. By applying the above described method for detecting the position of the terminal 3 to the configuration of FIG. 16, therefore, the distance between the base unit 2 and each terminal 3 can be detected based on the reception signal strength of the position detection signal at each terminal 3. By grasping the distance between the base unit 2 and each terminal 3, at which position on which row (on which of the electromagnetic wave propagation medium portions 21f, 21g, and 21h, that is, on which of the shelf boards 5a, 5b, and 5c) each terminal 3 is placed can be determined.

In FIG. 16, the electromagnetic wave propagation medium 1 is laid (placed) on the back of the base unit 2 and the terminals 3. However, the electromagnetic wave propagation medium 1 may be placed in front of the base unit 2 and the terminals 3. For example, the electromagnetic wave propagation medium 1 may be placed on the door of the housing so that closing the door allows the base unit 2 and the terminals 3 to communicate with each other, thereby enables detection of the position of each terminal 3. In this case, when the door is closed, the base unit 2 and the terminals 3 are so connected to the electromagnetic wave propagation medium 1 placed on the door that an electromagnetic wave can be input/output to/from the electromagnetic wave propagation medium 1. Hence the base unit 2 and the terminals 3 become capable of communicating with each other via the electromagnetic wave propagation medium 1, which enables detection of the position of each terminal 3.

The configuration of FIG. 15 and the configuration of FIG. 16 may be combined together. In such a case, for example, the electromagnetic wave propagation medium 1 is laid (placed) under the terminals 3 on the shelf board 5a while the electromagnetic wave propagation medium 1 is laid (placed) over the terminals 3 on the shelf board 5b. If the configuration of FIG. 16 is combined with the configuration of FIG. 13, even if two or more rows of the terminals 3 are arranged on the shelf boards, the position detection apparatus can be composed of a single structure of the electromagnetic wave propagation medium 1. In other words, even in the case of the terminals 3 that are arranged two-dimensionally or three-dimensionally, the position detection system (position detection apparatus) can be composed of a single structure of the electromagnetic wave propagation medium 1.

Figure 17:
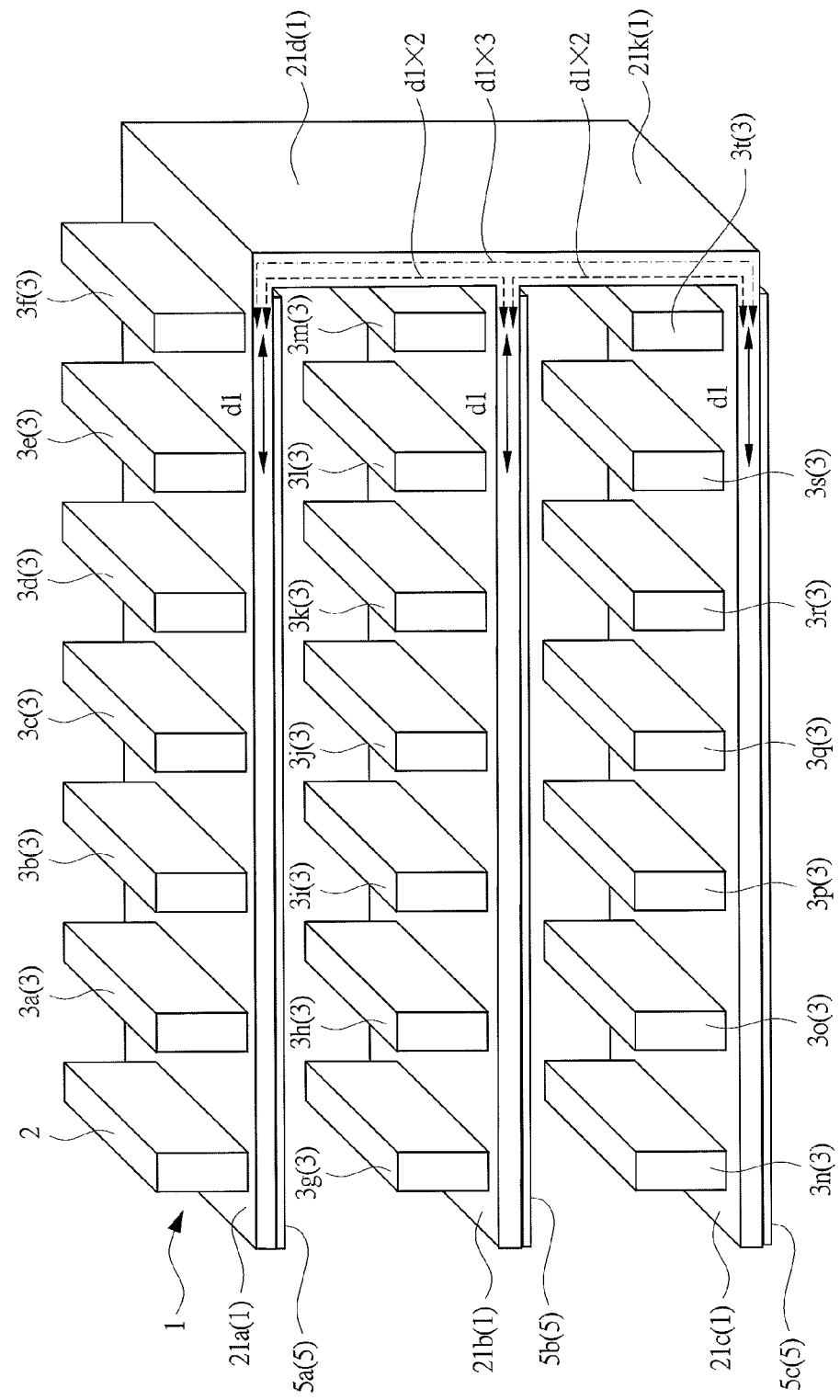
FIG. 17 is an explanatory diagram (perspective view) of still another configuration example of the position detection system in which the base unit and terminals are housed in the housing and the electromagnetic wave propagation medium is placed in the housing.

FIG. 17 depicts another modification of the configuration of FIG. 15, showing an explanatory diagram (perspective view) of still another configuration example of the position detection system (position detection apparatus) in which the base unit 2 and terminals 3 are housed in the housing and the electromagnetic wave propagation medium 1 having a branched part is placed (disposed) under the base unit 2 and terminals 3.

In FIG. 17, the electromagnetic wave propagation medium 1f is placed on the shelf boards 5a, 5b, and 5c, and upper, middle, and lower tiers of the electromagnetic wave propagation medium 1f are connected on their one end sides (near the terminals 3f, 3m, and 3t).

In the case of FIG. 17, the electromagnetic wave propagation medium 1 has the electromagnetic wave propagation medium portion 21a placed on the shelf board 5a, the electromagnetic wave propagation medium portion 21b placed on the shelf board 5b, and the electromagnetic wave propagation medium portion 21c placed on the shelf board 5c. The electromagnetic wave propagation medium 1 also has an electromagnetic wave propagation medium portion 21k continuously and integrally connecting the electromagnetic wave propagation medium portion 21a to the electromagnetic wave propagation medium portion 21b, and an electromagnetic wave propagation medium portion 21m continuously and integrally connecting the electromagnetic wave propagation medium portion 21b to the electromagnetic wave propagation medium portion 21c. The shelf boards 5a, 5b, and 5c and the electromagnetic wave propagation medium portion 21a, 21b, and 21c depicted in FIG. 17 are the same as those depicted in FIG. 15, and are therefore not described repeatedly.

Because each of the shelf boards 5a, 5b, and 5c is of a horizontal tabular shape, for example, out of the electromagnetic wave propagation portions making up the electromagnetic wave propagation medium 1, the electromagnetic wave propagation medium portion 21a placed on the board 5a, the electromagnetic wave propagation medium portion 21b placed on the board 5b, and the electromagnetic wave propagation medium portion 21c placed on the board 5c are each made into a horizontal tabular shape. Out of the electromagnetic wave propagation portions making up the electromagnetic wave propagation medium 1, the electromagnetic wave propagation medium portion 21d continuously connecting the electromagnetic wave propagation medium portion 21a placed on the shelf board 5a to the electromagnetic wave propagation medium portion 21b placed on the shelf board 5b and the electromagnetic wave propagation medium portion 21k continuously connecting the electromagnetic wave propagation medium portion 21*b* placed on the shelf board 5*b* to the electromagnetic wave propagation medium portion 21*c* placed on the shelf board 5*c* are each made into a tabular shape extending vertically (in the direction almost perpendicular to the horizontal direction). The base unit 2 and multiple terminals 3 are placed (disposed) on the horizontal electromagnetic wave propagation medium portions 21*a*, 21*b*, and 21*c* of the electromagnetic wave propagation medium 1. In FIG. 17, the base unit 2 and the terminals 3*a* to 3*f* are placed (disposed) on the electromagnetic wave propagation medium portion 21*a*, the terminals 3*g* to 3*m* are placed (disposed) on the electromagnetic wave propagation medium portion 21*b*, and the terminals 3*n* to 3*t* are placed (disposed) on the electromagnetic wave propagation medium portion 21*c*.

In the case of FIG. 15, the electromagnetic wave propagation medium portion 21*b* placed on the shelf board 5*b* has a side connected to the electromagnetic wave propagation medium portion 21*d* and the other side connected to the electromagnetic wave propagation medium portion 21*e* and both sides are opposite to each other. In the case of FIG. 17, however, the electromagnetic wave propagation medium portion 21*b* placed on the shelf board 5*b* has the side connected to the electromagnetic wave propagation medium portion 21*d* and the side connected to the electromagnetic wave propagation medium portion 21*e* and both sides are on the same side. In the case of FIG. 15, the electromagnetic wave propagation medium portion 21*a*, the electromagnetic wave propagation medium portion 21*d*, the electromagnetic wave propagation medium portion 21*b*, the electromagnetic wave propagation medium portion 21*e*, and the electromagnetic wave propagation medium portion 21*c* are connected consecutively in increasing order, so that the electromagnetic wave propagation medium 1 extends continuously along the electromagnetic wave propagation direction (one direction). In the case of FIG. 17, however, the electromagnetic wave propagation medium portion 21*a* is connected to the electromagnetic wave propagation medium portion 21*d*, whose one end opposite to the other end connected to the electromagnetic wave propagation medium portion 21*a* is connected to the electromagnetic wave propagation medium portion 21*b* and to the electromagnetic wave propagation medium portion 21*k*, whose one end opposite to the other end connected to the electromagnetic wave propagation medium portions 21*b* and 21*d* is then connected to the electromagnetic wave propagation medium portion 21*c*.

The electromagnetic wave propagation medium 1 of FIG. 17 has a structure in which the electromagnetic wave propagation medium portion 21*b* making up the electromagnetic wave propagation medium 1 branches out in the middle (a point at which the electromagnetic wave propagation medium portions 21*d*, 21*b*, and 21*k* join together) of an electromagnetic wave propagation medium portion made up of the electromagnetic wave propagation medium portions 21*a*, 21*d*, 21*k*, and 21*c*. As a result, en electromagnetic wave is transmitted in two directions (one direction in which the electromagnetic wave travels through the electromagnetic wave propagation medium portions 21*a*, 21*d*, 21*k*, and 21*c* in order and another direction in which the electromagnetic wave travels through the electromagnetic wave propagation medium portions 21*a*, 21*d*, and 21*b* in order).

In this configuration, a communication signal or position detection signal input from the base unit 2 to the electromagnetic wave propagation medium 1 (electromagnetic wave propagation medium portion 21*a*) is transmitted through the electromagnetic wave propagation medium portion 21*a* and is received by the terminals 3*a* to 3*f*. The communication signal or position detection signal then travels through the electromagnetic wave propagation medium portion 21*d* and is branched into a signal heading toward the electromagnetic wave propagation medium portion 21*b* and a signal heading toward the electromagnetic wave propagation medium portion 21*k* The signal transmitted through the electromagnetic wave propagation medium portion 21*b* is received by the terminals 3*g* to 3*m*, while the signal transmitted through the electromagnetic wave propagation medium portion 21*k* and further propagating through the electromagnetic wave propagation medium portion 21*c* is received by the terminals 3*n* to 3*t* Hence communication between the base unit 2 and the terminals 3 and detection of the position of each terminal 3 are carried out.

According to the configuration of FIG. 17, in the same manner as in the above cases, when the distances between the terminals 3 and the base unit 2 are all different from each other for each terminal 3, the distance between the base unit 2 and each terminal 3 is detected based on the reception signal strength of the position detection signal transmitted from the base unit 2 through the electromagnetic wave propagation medium 1 and received by each terminal 3, and distance information is combined with information on the shape of the electromagnetic wave propagation medium 1 (information of the placement-allowable positions of the terminals on the electromagnetic wave propagation medium 1). Hence the position of each terminal 3 can be identified.

In the configuration of FIG. 17, the position detection signal transmitted by the base unit 2 travels through the position of placement of the terminal 3*f* and then branches into a signal heading toward the terminal 3*m* (toward the electromagnetic wave propagation medium portion 21*b*) and a signal heading toward the terminal 3*t* (toward the electromagnetic wave propagation medium portions 21*k* and 21*c*). In this case, it is not always possible to identify the positions of all terminals 3 relaying entirely on information of the distance between the base unit 2 and each terminal 3 that is detected based on the reception signal strength of the position detection signal transmitted from the base unit 2 through the electromagnetic wave propagation medium 1 and received by each terminal 3. For example, the distance between the terminal 3*f* and the terminal 3*l* may be equal to the distance between the terminal 3*f* and the terminal 3*t*, in which case the distance between the base unit 2 and the terminal 3*l* is equal to the distance between the base unit 2 and the terminal 3*t* and therefore the terminal 3*l* cannot be distinguished from the terminal 3*t* based only on the reception signal strength of the position detection signal transmitted from the base unit 2 through the electromagnetic wave propagation medium 1 and received by each terminal 3. In such a case, however, as described above referring to FIGS. 11 to 13, by using additional information on the shape of the electromagnetic wave propagation medium 1 (information of the placement-allowable positions of the terminals on the electromagnetic wave propagation medium 1) and information of the distance between different terminals based on the reception signal strength of a position detection signal transmitted from one terminal and received by another terminal 3, the positions of all terminals 3 can be identified. FIG. 18 is an explanatory diagram (table) for explaining an example of such a position detection method. In FIG. 18, examples of the distances from each of the terminals 3*m*, 31, and 3*t* to the terminals 3*f*, 31, and 3*t* in the configuration of FIG. 17 are indicated in the table.

In the configuration of FIG. 17, as shown in the table of FIG. 18, when the distance between the terminal 3*f* and the terminal 3m is d1×2 (two times the distance d1), the distance between the terminal 3f and the terminal 3t is d1×3 (three times the distance d1), and the distance between the terminal 3m and the terminal 3l is d1 (distance d1), the distance between the terminal 3f and the terminal 3t and the distance between the terminal 3f and the terminal 3l are the equal distance of d1×3 (three times the distance d1), which means that the distance between the base unit 2 and the terminal 3t and the distance between the base unit 2 and the terminal 3l is equal. However, the distance between the base unit 2 and each terminal 3 is detected based on the reception signal strength of the position detection signal transmitted from the base unit 2 through the electromagnetic wave propagation medium 1 and received by each terminal 3 and the terminal 3m is identified based on its detected distance to the base unit 2, and then the terminal 3m transmits a position detection signal to detect the distance between the terminal 3m and a different terminal 3 (terminal 3 other than the terminal 3) based on the reception signal strength of the position detection signal at the different terminal 3 (terminal 3 other than the terminal 3). Through this process, the distance between the terminal 3m and the terminal 3l and the distance between the terminal 3m and the terminal 3t are found. Because the distance between the terminal 3m and the terminal 3l is found to be d1 (distance d1) and the distance between the terminal 3m and the terminal 3t is found to be d1×2 (two times the distance d1), it is concluded that the terminal 3l is present on the shelf board 5b (the electromagnetic wave propagation medium portion 21b) on which the terminal 3m is also present while the terminal 3t is present on the shelf board 5c (the electromagnetic wave propagation medium portion 21c) different from the shelf board 5b on which the terminal 3m is placed. In this manner, even if the electromagnetic wave propagation medium 1 has a branch structure, the position of each terminal 3 can be detected.

The structure of FIG. 17 is applicable to an extensive range of applications, in which even if two or more rows of the terminals 3 are arranged on the shelf boards, the position detection system (position detection apparatus) can be composed of a single structure of the electromagnetic wave propagation medium 1. In other words, even in the case of the terminals 3 that are arranged two-dimensionally or three-dimensionally, the position detection system (position detection apparatus) can be composed of a single structure of the electromagnetic wave propagation medium 1.

As describe above, according to the configuration of the position detection system (position detection apparatus) of the first embodiment, the position of the terminal 3 placed near the electromagnetic wave propagation medium can be detected. Particularly, changing (varying) the frequency of the communication signal and the frequency of the position detection signal achieves both highly reliable communication using a frequency (communication signal with a frequency) that attenuates little in the electromagnetic wave propagation medium and highly precise position detection using a frequency (position detection signal with a frequency) that attenuates heavily in the electromagnetic wave propagation medium.

The frequency of the position detection signal is selected properly based on the size of the electromagnetic wave propagation medium and the attenuation rate of the signal in the electromagnetic wave propagation medium. Through this frequency selection, the range and precision of terminal position detection can be adjusted.

Because the attenuation rate of the position detection signal in the electromagnetic wave propagation medium is large, the end surface of the electromagnetic wave propagation medium does not have to be terminated with given impedance or be provided with an electromagnetic wave absorber. As a result, the electromagnetic wave propagation medium can be realized at low cost.

Some terminals also transmit the position detection signal and the positional relation between a terminal having transmitted the position detection signal and a different terminal is detected. Through this process, the position of a terminal located far distant from the base unit can be detected, and not only the distance between the base unit and each terminal but also the distance between different terminals can be identified. Hence the precision of position detection is improved.

By adjusting transmission power for transmitting the position detection signal from the base unit, the position of a terminal located far distant from the base unit can be detected.

Using information on the shape of the electromagnetic wave propagation medium (information of the placement-allowable positions of the terminals on the electromagnetic wave propagation medium) for detection of the position of the terminal enables highly precise position detection and also allows detection of the positions of terminals arranged two-dimensionally or three-dimensionally.

It is clear that if a terminal has information for use in position detection, such a terminal becomes capable of position detection as the base unit is.

The terminals and the base unit may be incorporated in the system such that the base unit for position detection is installed temporarily and following completion of detection of the position of each terminal, the base unit for position detection is removed, and then the system including the terminals but not including the base unit is operated.

In the system including the terminals housed in the housing, the electromagnetic wave propagation medium is laid in the housing. This configuration allows detection of each terminal.

(Second Configuration)

A second embodiment will be described by explaining examples of a position detection system (position detection apparatus) that detects the position of a communication device placed (disposed) near an electromagnetic wave propagation medium or of a position detection method, referring to drawings.

In the second embodiment, examples of a position detection system that detects the position of a communication device placed (disposed) near an electromagnetic wave propagation medium, in which system the width of the electromagnetic wave propagation medium varies depending on positions thereon, will be described referring to FIGS. 19 to 22.

Figure 19:
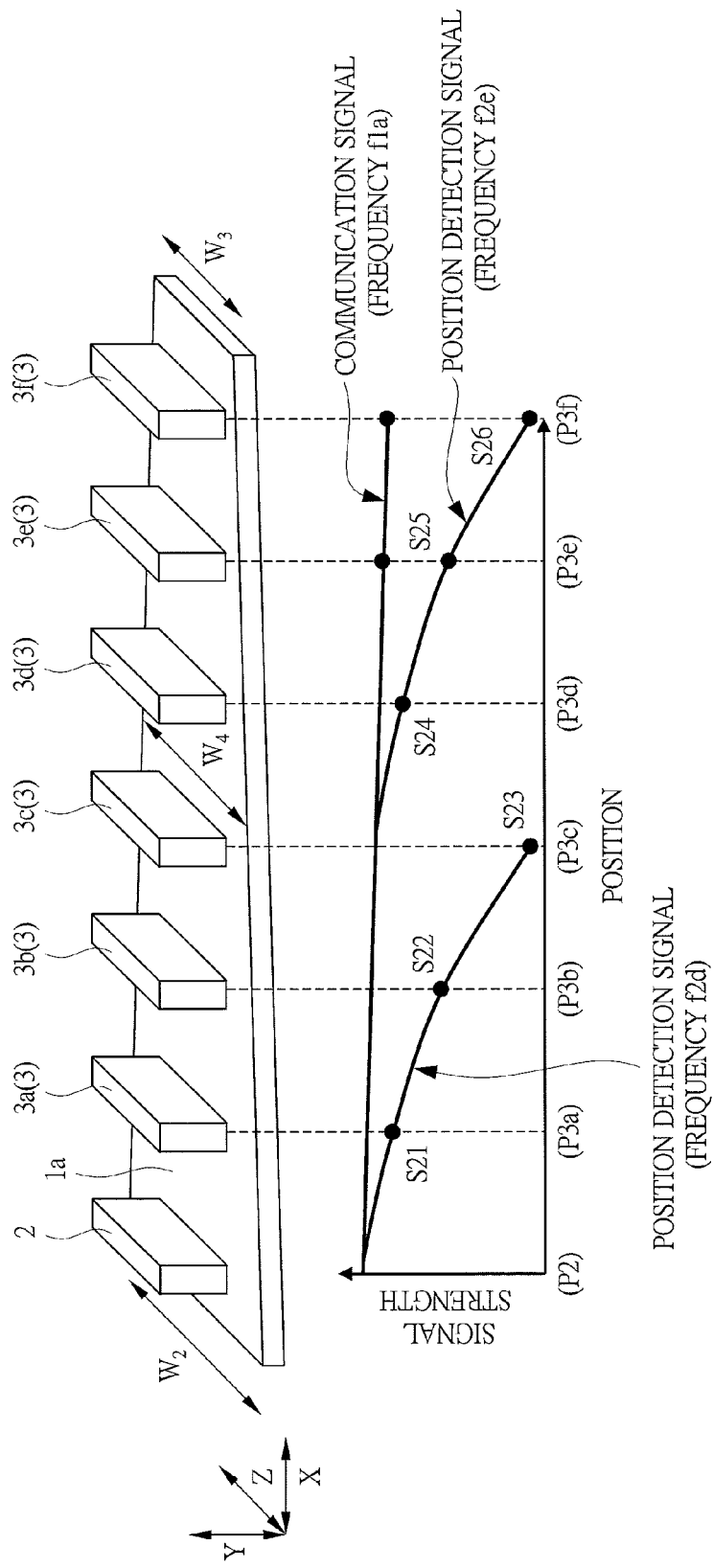
FIG. 19 is an explanatory diagram of a configuration example of a position detection system (position detection apparatus) according to a second embodiment of the present invention.
Figure 20:
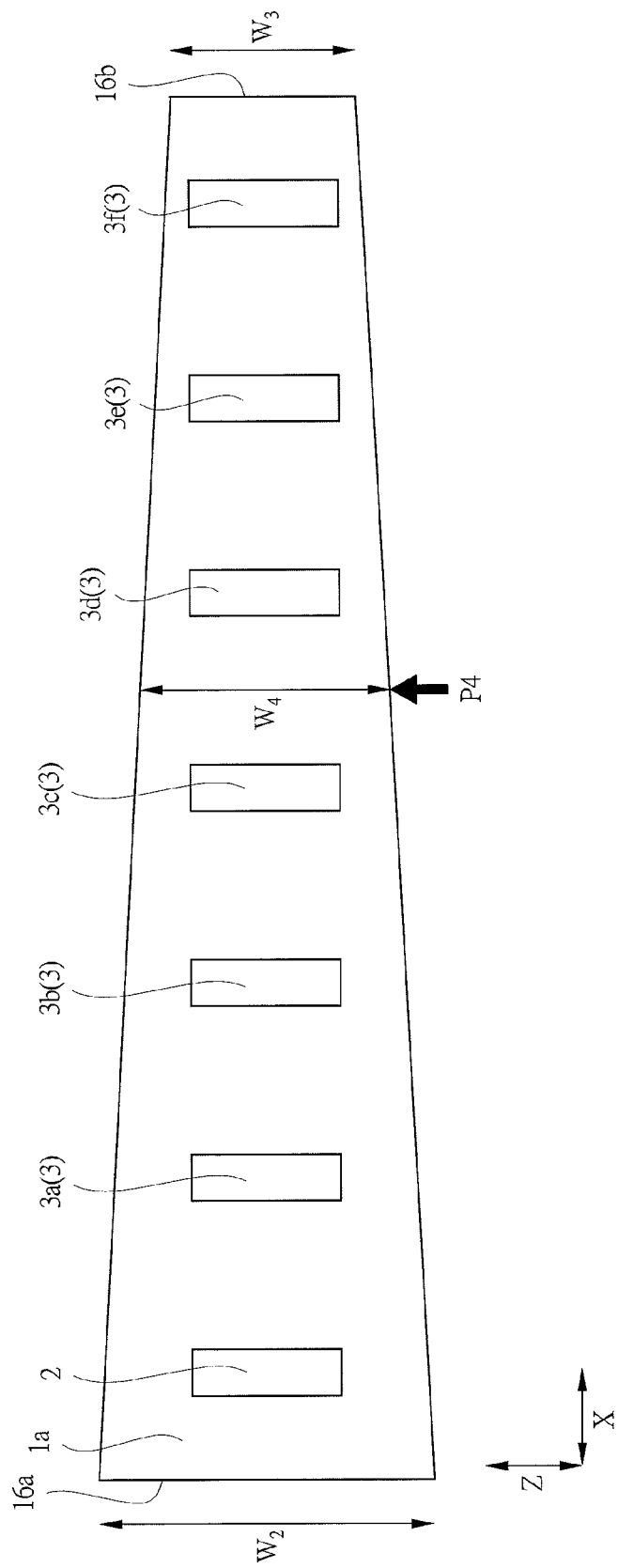
FIG. 20 is a plan view (top view) of the position detection system of FIG. 19.

FIG. 19 is an explanatory diagram (including a perspective view and a graph) of a configuration example of the position detection system (position detection apparatus) according to the second embodiment, and FIG. 20 is a plan view (top view) of the same. FIG. 19 corresponds to FIG. 6, etc. of the first embodiment, and the vertical axis and horizontal axis of the graph of FIG. 19 are the same as the vertical axis and horizontal axis of the graph of FIG. 6.

In the position detection system (position detection apparatus) of FIGS. 19 and 20, an electromagnetic wave propagation medium 1a is used in place of the electromagnetic wave propagation medium 1. The electromagnetic wave propagation medium 1a is basically identical in configuration with the electromagnetic wave propagation medium 1 of FIG. 1 except differences that will be explained in the following description. The differences between the electromagnetic wave propagation medium 1a and the electromagnetic wave propagation medium 1 of FIG. 1 will be described.

According to the electromagnetic wave propagation medium 1a of FIGS. 19 and 20, the width of the electromagnetic wave propagation medium 1a becomes smaller as a position of measurement of the width becomes farther distant from the position (location) of placement of the base unit 2 on the electromagnetic wave propagation medium 1a. The base unit 2 and multiple terminal 3 are placed (disposed) on the electromagnetic wave propagation medium 1a, and the width of the electromagnetic wave propagation medium 1a changes gradually from a width $W_2$ (at the end surface 16a) to a width $W_3$ (at the end surface 16b) as the electromagnetic wave propagation medium 1a extends from the end surface (side surface, end) 16a to the end surface (side surface, end) 16b. The width $W_2$ is larger than the width $W_3$ ($W_2>W_3$). In other words, the width $W_3$ is smaller than $W_2$. A width $W_4$ represents the width of the electromagnetic wave propagation medium 1a at a position P4 between the end surface 16a and the end surface 16b, and is smaller than the width $W_2$ and is larger than the width $W_3$ (which means $W_2>W_4>W_3$).

The end surfaces 16a and 16b of the electromagnetic wave propagation medium 1a are the end surfaces (side surfaces, ends) opposite to each other in the electromagnetic wave propagation direction (X direction in FIGS. 19 and 20) across the electromagnetic wave propagation space (15), that is, the end surface 16a and the end surface 16b are located opposite to each other across the electromagnetic wave propagation space (15). Each of the widths $W_2$, $W_3$, and $W_4$ is equivalent to the width $W_1$ in FIG. 1, represents a dimension in the direction perpendicular to the electromagnetic wave propagation (traveling) direction, the distance (gap) between the conductor 13 and the conductor 14 in the Z direction, and the dimension (width) of the electromagnetic wave propagation space 15 in the Z direction, and almost matches the dimension (width) of the electromagnetic wave propagation medium 1 in the Z direction. The width $W_2$ is considered to be the width $W_1$ at the end surface 16a, the width $W_3$ is considered to be the width $W_1$ at the end surface 16b, and the $W_4$ is considered to be the width $W_1$ at the position P4 between the end surface 16a and the end surface 16b. Each of the widths $W_2$ and $W_3$ of the electromagnetic wave propagation medium 1a is larger than the thickness of the electromagnetic wave propagation medium 1a (which is equivalent to the thickness $T_1$).

The base unit 2 and multiple terminals 3 are placed (disposed) on the electromagnetic wave propagation medium 1a such that the base unit 2 is placed (disposed) at the position closest to the end surface 16a while the terminals 3 are arranged (disposed) in a row in a direction of heading from that position (where the base unit 2 is placed) toward the end surface 16b.

The electromagnetic wave propagation medium 1 of FIG. 1 has the uniform width $W_1$ that does not change as the electromagnetic wave propagation medium 1 extends in the electromagnetic wave propagation (traveling) direction. As a result, the conductor 13 and the conductor 14 are opposite and almost parallel to each other across the electromagnetic wave propagation space (15). In contrast, the electromagnetic wave propagation medium 1a has the width which is not uniform and gradually decreases as the electromagnetic wave propagation medium 1 extends in the electromagnetic wave propagation (traveling) direction (which means that the width $W_2$ at the end surface 16a gradually decreases to the width $W_3$ at the end surface 16b). As a result, the conductor 13 and the conductor 14 are opposite to each other across the electromagnetic wave propagation space (15) but are not parallel to each other, and approach each other as the electromagnetic wave propagation medium 1 extends in the electromagnetic wave propagation (traveling) direction.

The configuration of the electromagnetic wave propagation medium 1a in other aspects is basically the same as the configuration of the electromagnetic wave propagation medium 1 of FIG. 1, and therefore will not be described repeatedly.

Similar to the case of the electromagnetic wave propagation medium 1, the electromagnetic wave propagation characteristics of the electromagnetic wave propagation medium 1a is determined by its width, as indicated in FIG. 5. When the wavelength of an electromagnetic wave propagating through the electromagnetic wave propagation medium 1a is equal to or shorter than two times the width of the electromagnetic wave propagation medium 1a, the electromagnetic wave can be propagated with its attenuation suppressed. However, if the wavelength is longer than two times the width of the electromagnetic wave propagation medium 1a, the electromagnetic wave attenuates heavily during its propagation.

In the same manner as in the first embodiment, a frequency f1a that makes the attenuation (loss) of an electromagnetic wave propagating through the electromagnetic wave propagation medium 1a less is used as the frequency of the communication signal in the second embodiment. This frequency f1a is equivalent to the frequency f1. Similar to the frequency f1, the frequency f1 a is set so that an electromagnetic wave with the frequency f1 a attenuates less as it propagates through any area of the electromagnetic wave propagation medium 1a. While the frequency f1 is determined to be the frequency that gives an electromagnetic wave a wavelength equal to or shorter than two times the width $W_1$, that is, satisfies $\lambda \geq W_1 \times 2$, the frequency f1a should preferably be determined in the following manner because the width of the electromagnetic wave propagation medium 1a is not uniform.

When the frequency of an electromagnetic wave having a wavelength equal to two times the minimum width ($W_3$) of the electromagnetic wave propagation medium 1a (wavelength $\lambda_0 a = W_3 \times 2$) is $f_0 a$, the frequency f1a of the communication signal should preferably be determined to be equal to or higher than $f_0 a$ (f1 a$\geq f_0 a$). This means that it is preferable to select the frequency f1 a of the communication signal so that the wavelength of the communication signal with the frequency f1 a in the electromagnetic wave propagation medium 1a is equal to or shorter than two times the minimum width ($W_3$) of the electromagnetic wave propagation medium 1a (wavelength $\lambda \leq W_3 \times 2$). In other words, it is preferable to determine the frequency f1a to be the frequency that gives an electromagnetic wave a wavelength equal to or shorter than two times the width $W_3$, that is, satisfies $\lambda \leq W_3 \times 2$. As a result, when the communication signal with the frequency f1 a determined to be such a frequency travels through the electromagnetic wave propagation medium 1a, the wavelength of the communication signal remains equal to or shorter than two times the width of the electromagnetic wave propagation medium 1a (which is the width $W_1$) at any location in the electromagnetic wave propagation medium 1a. Hence the attenuation of the communication signal traveling through the electromagnetic wave propagation medium 1a is suppressed. As a result, accurate communication can be carried out between the base unit 2 and each terminal 3 or between different terminals 3. By using an electromagnetic wave with a wavelength equal to or shorter than two times the width $W_3$, which is the minimum width of the electromagnetic wave propagation medium $1a$, as the communication signal, the communication signal can be propagated through the electromagnetic wave propagation medium $1a$ as the attenuation of the signal is kept little. Hence highly reliable communication is realized.

A signal with a frequency f2$d$ and a signal with a frequency f2$e$ are used as the position detection signal. These frequencies f2$d$ and f2$e$ are equivalent to the frequency f2. The frequency f2$d$ is lower than the frequency f2$e$, which is lower than the frequency f1 a (f2$d$<f2$e$<f1 a). While the frequency f2 is determined to be the frequency that gives an electromagnetic wave a wavelength equal to or longer than two times the width $W_1$, that is, satisfies $\lambda_1 > W_1 \times 2$, the frequencies f2$d$ and f2$e$ should preferably be determined in the following manner because the width of the electromagnetic wave propagation medium $1a$ is not uniform.

When the frequency of an electromagnetic wave having a wavelength equal to two times the maximum width ($W_2$) of the electromagnetic wave propagation medium $1a$ (wavelength $\lambda_0 b = W_2 \times 2$) is $f_0 b$, the frequency f2$d$ of the position detection signal should preferably be determined to be equal to or lower than $f_0 b$ (f2$b \geq f_0 b$). This means that it is preferable to select the frequency f2$d$ of the position detection signal so that the wavelength of the position detection signal with the frequency f2$d$ in the electromagnetic wave propagation medium $1a$ is equal to or longer than two times the maximum width ($W_2$) of the electromagnetic wave propagation medium $1a$ (wavelength $\lambda \geq W_2 \times 2$). In other words, it is preferable to determine the frequency f2$b$ to be the frequency that gives an electromagnetic wave a wavelength equal to or longer than two times the width $W_2$, that is, satisfies $\lambda \geq W_2 \times 2$. As a result, when the position detection signal with the frequency f2$b$ determined to be such a frequency travels through the electromagnetic wave propagation medium $1a$, the wavelength of the position detection signal remains equal to or longer than two times the width of the electromagnetic wave propagation medium $1a$ (which is the width $W_1$) at any location in the electromagnetic wave propagation medium $1a$. Hence the position detection signal attenuates heavily during its traveling through the electromagnetic wave propagation medium $1a$.

The frequency f2$e$ is selected so that the position detection signal with the frequency f2$e$ has a wavelength longer than two times the minimum width ($W_3$) of the electromagnetic wave propagation medium $1a$ and shorter than two times the maximum width ($W_2$) of the electromagnetic wave propagation medium $1a$ ($W_2 \times 2 > \lambda > W_3 \times 2$). At this time, it is preferable to determine the frequency f2$e$ to be the frequency that gives an electromagnetic wave a wavelength equal to two times the width $W_4$. In other words, it is preferable to select the frequency f2$e$ of the position detection signal so that the wavelength of the position detection signal with the frequency f2$e$ in the electromagnetic wave propagation medium $1a$ is equal to two times the width ($W_4$) of the electromagnetic wave propagation medium $1a$ (wavelength $\lambda = W_4 \times 2$), which means that the frequency f2$e$ should preferably be selected as the frequency that gives the position detection signal with the wavelength two times the width ($W_4$) (wavelength $\lambda = W_4 \times 2$). As a result, when the position detection signal with the frequency f2$e$ travels through the electromagnetic wave propagation medium $1a$, the wavelength of the position detection signal is equal to or shorter than two times the width of the electromagnetic wave propagation medium $1a$ (which is the width $W_1$) in an area where the width of the electromagnetic wave propagation medium $1a$ is equal to or larger than the $W_4$ (i.e., area extending from the end surface $16a$ to the position P4), so that the attenuation of the position detection signal is suppressed in this area. However, when the position detection signal with the frequency f2$e$ travels through the electromagnetic wave propagation medium $1a$, the wavelength of the position detection signal is longer than two times the width of the electromagnetic wave propagation medium $1a$ (which corresponds to the above mentioned width $W_1$) in an area where the width of the electromagnetic wave propagation medium $1a$ is smaller than the $W_4$ (i.e., area extending from the position P4 to the end surface $16b$), so that the position detection signal attenuates heavily during its traveling through this area of the electromagnetic wave propagation medium $1a$.

Since each of the widths $W_2$ and $W_4$ is larger than the minimum width of the electromagnetic wave propagation medium $1a$ ($W_3$), the wavelength of the position detection signal with the frequency f2$d$ and the wavelength of the position detection signal with the frequency f2$e$ are clearly longer than two times the minimum width ($W_3$) of the electromagnetic wave propagation medium $1a$ ($\lambda > W_1 \times 2$).

The base unit 2 and multiple terminals 3 are placed on the electromagnetic wave propagation medium $1a$ such that the base unit 2 and at least one terminal 3 (terminals 3$a$, 3$b$, and 3$c$ in FIG. 20) are placed in the area where the width of the electromagnetic wave propagation medium $1a$ is equal to or smaller than the width $W_2$ and equal to or larger than the width $W_4$ (i.e., the area extending from the end surface $16a$ to the position P4), and that at least one terminal 3 (terminals 3$d$, 3$e$, and 3$f$ in FIG. 20) is placed in the area where the width of the electromagnetic wave propagation medium $1a$ is smaller than the width $W_4$ and equal to or larger than the width $W_3$ (i.e., the area extending from the position P4 to the end surface $16b$).

Because of the change in the width of electromagnetic wave propagation medium $1a$, when the base unit 2 inputs the position detection signal with the frequency f2$e$ to the electromagnetic wave propagation medium $1a$ and causes the signal to propagate therethrough, the position detection signal with the frequency f2$e$ shows a small attenuation rate in the area of the electromagnetic wave propagation medium $1a$ where its width is equal to or smaller than the width $W_2$ and equal to or larger than the width $W_4$ (i.e., the area extending from the end surface $16a$ to the position P4). For this reason, when the position detection signal with the frequency f2$e$ transmitted from the base unit 2 is received by the terminals 3$a$, 3$b$, and 3$c$, the reception signal strength at those terminals is roughly equal to the input strength of the position detection signal at the base unit 2. However, when the position detection signal with the frequency f2$e$ transmitted from the base unit 2 passes the point P4 and enters the area where the width of the electromagnetic wave propagation medium $1a$ is smaller than the width $W_4$ (i.e., the area extending from the position P4 to the end surface $16b$), the wavelength of the position detection signal becomes larger than two times the width of the electromagnetic wave propagation medium $1a$, which results in an increase in the attenuation rate of the position detection signal. As a result, when the position detection signal with the frequency f2$e$ transmitted from the base unit 2 is received by the terminals 3$d$, 3$e$, and 3$f$, the reception signal strength at those terminals turns out to be the signal strength that has decreased (dropped) widely from the input strength at the base unit 2. Hence differences between reception signal strength S24 at the terminal 3$d$, reception signal strength S25 at the terminal 3e, and reception signal strength S26 at the terminal 3f becomes larger. Based on the reception signal strength S24, S25, and S26 (differences between the reception signal strength S24, S25, and S26) of the position detection signal with the frequency f2e transmitted from the base unit 2, therefore, the positions of the terminals 3d, 3e, and 3f can be detected at high precision.

When the base unit 2 inputs the position detection signal with the frequency f2d to the electromagnetic wave propagation medium 1a and causes the signal to propagate therethrough, the position detection signal starts attenuating right after leaving its input position, and therefore the terminals 3a, 3b, and 3c receive the position detection signal with the frequency f2d in its attenuated state. At this time, the reception signal strength at the terminals 3a, 3b, and 3c turns out to be the signal strength that has decreased (dropped) widely from the input strength at the base unit 2. Hence differences between reception signal strength S21 at the terminal 3a, reception signal strength S22 at the terminal 3b, and reception signal strength S23 at the terminal 3c becomes larger. Based on the reception signal strength S21, S22, and S23 (differences between the reception signal strength S21, S22, and S23) of the position detection signal with the frequency f2d transmitted from the base unit 2, therefore, the positions of the terminals 3a, 3b, and 3c can be detected at high precision.

For terminals 3 (terminals 3a, 3b, and 3c in FIG. 20) placed in the area where the width of the electromagnetic wave propagation medium 1a is equal to or smaller than the width $W_2$ and equal to larger than $W_4$ (i.e., the area extending from the end surface 16a to the position P4), therefore, the position of each terminal 3 (each of the terminals 3a, 3b, and 3c in FIG. 20) can be detected based on the reception signal strength of the position detection signal with the frequency f2d transmitted from the base unit 2. For terminals 3 (terminals 3d, 3e, and 3f in FIG. 20) placed in the area where the width of the electromagnetic wave propagation medium 1a is smaller than the width $W_4$ and equal to larger than $W_3$ (i.e., the area extending from the position P4 to the end surface 16b), therefore, the position of each terminal 3 (each of the terminals 3d, 3e, and 3f in FIG. 20) can be detected based on the reception signal strength of the position detection signal with the frequency f2e transmitted from the base unit 2.

In this embodiment, the position of each terminal 3 is detected using the position detection signal with the frequency f2d and the position detection signal with the frequency f2e such that the position detection signal with the frequency f2d is used to detect a terminal 3 located close to the base unit 2 (terminals 3a, 3b, and 3c in FIG. 20) while the position detection signal with the frequency f2e is used to detect a terminal 3 located distant from the base unit 2 (terminals 3d, 3e, and 3f in FIG. 20). The method of communication and position detection according to this embodiment is different in this respect from the method of communication and position detection according to the first embodiment but is the same in other respects. While the case of using two frequencies (f2d and f2e) as the frequencies of the position detection signal is described, three or more frequencies may also be used as the frequencies of the position detection signal.

In this embodiment, by using the position detection signal with the frequency f2d, position information of a terminal 3 (terminals 3a, 3b, and 3c) located close to the base unit 2 (the distance from the base unit 2 to each terminal 3, the position of each terminal 3 disposed on the electromagnetic wave propagation medium 1, or order of arrangement of the terminals 3 on the electromagnetic wave propagation medium 1) can be obtained as highly precise information. By using the position detection signal with the frequency f2e, position information of a terminal 3 (terminals 3d, 3e, and 3f) located distant from the base unit 2 (the distance from the base unit 2 to each terminal 3, the position of each terminal 3 disposed on the electromagnetic wave propagation medium 1, or order of arrangement of the terminals 3 on the electromagnetic wave propagation medium 1) can also be obtained as highly precise information. Because the position detection signal with the frequency f2e can be transmitted to the position P4 as the attenuation of the signal is suppressed, the position detection signal surely reaches a terminal 3 (terminals 3d, 3e, and 3f) located distant from the base unit 2 to allow highly precise position detection. Hence the position of a terminal 3 that is out of the range of reach of the position detection signal with the frequency f2d can be detected at high precision. An improvement in position detection precision and an expansion in the position detection allowable range, therefore, are achieved simultaneously.

In this manner, changing the width of the electromagnetic wave propagation medium 1a limits terminals 3 of which the positions can be detected using the position detection signal with a specific frequency, to a certain group of terminals 3, and allows the position detection signal to be transmitted to a terminal distant from the base unit 2 without increasing the signal transmission power of the base unit 2. Using a combination of information of the signal strength (reception signal strength) of the position detection signal received by each terminal and information of the frequency of the position detection signal enables further precise position detection.

In selecting signal frequencies, for example, from the 2.4 GHz band belong to the ISM band, about 2.48 GHz is selected as the frequency of the communication signal and about 2.40 GHz is selected as the frequency of the position detection signal. In another case, different frequency bands may be used in such a way that the 2.4 GHz band belonging to the ISM band is used as the frequency band for the frequency of the position detection signal while the 5.8 band belonging to the ISM band may be used as the frequency band for the frequency of the communication signal. Not only the ISM band but also other frequency bands for RFID, cellular phones, etc., may be used for the signal frequencies in the above manner.

In the same manner as in the first embodiment (case of FIG. 9, etc.), according to this embodiment, some terminals may transmit the position detection signal to detect the positional relation between different terminals 3. By using information of the positional relation between different terminals 3 (distance between different terminals 3) and the distance between the base unit 2 and a terminal having transmitted the position detection signal, the position of every terminal 3 can be detected.

It is preferable that each of the end surfaces 16a and 16b of the electromagnetic wave propagation medium 1 does not reflect an electromagnetic wave. However, even if the end surface does reflects the electromagnetic wave, it has less negative effect on the position detection signal because the signal attenuates during its propagation through the electromagnetic wave propagation medium 1 (attenuates heavily before reaching the end surface 16b). Because the position detection signal shows a large attenuation rate in the electromagnetic wave propagation medium 1, each of the end surfaces 16a and 16b of the electromagnetic wave propagation medium 1 may have an electromagnetic wave reflection property, instead of terminating with given impedance or having an electromagnetic wave absorber. This allows the electromagnetic wave propagation medium to be realized a low cost.

In the same manner as in the configuration example of FIG. 1, according to this embodiment, using information on the shape of the electromagnetic wave propagation medium (information of the placement-allowable positions of the terminals 3 on the electromagnetic wave propagation medium 1) for detection of the position of each terminal 3 enables highly precise position detection and also allows detection of the positions of terminals arranged on the electromagnetic wave propagation medium of a more complicated shape or arranged three-dimensionally.

Figure 21:
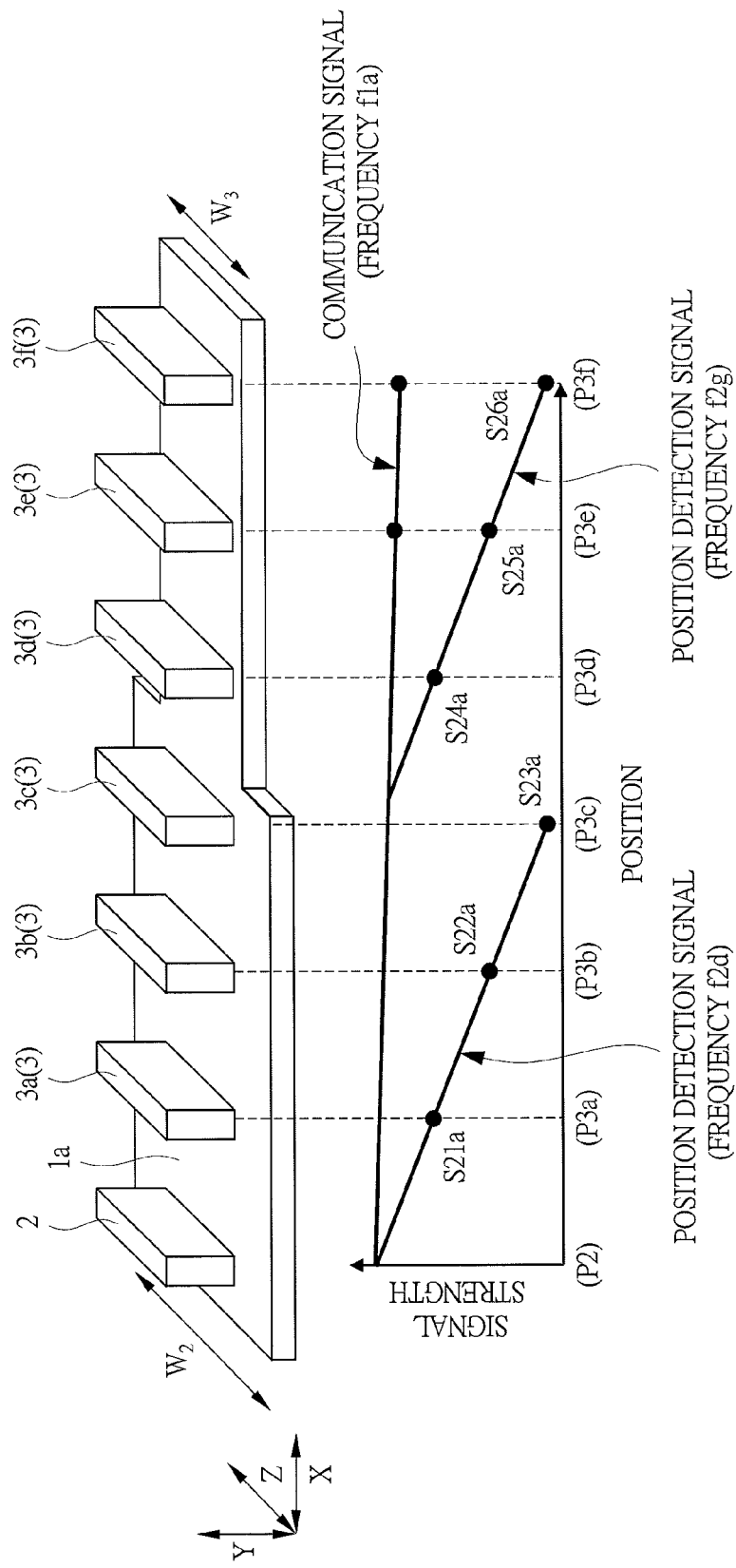
FIG. 21 is an explanatory diagram of another configuration example of the position detection system according to the second embodiment of the present invention.
Figure 22:
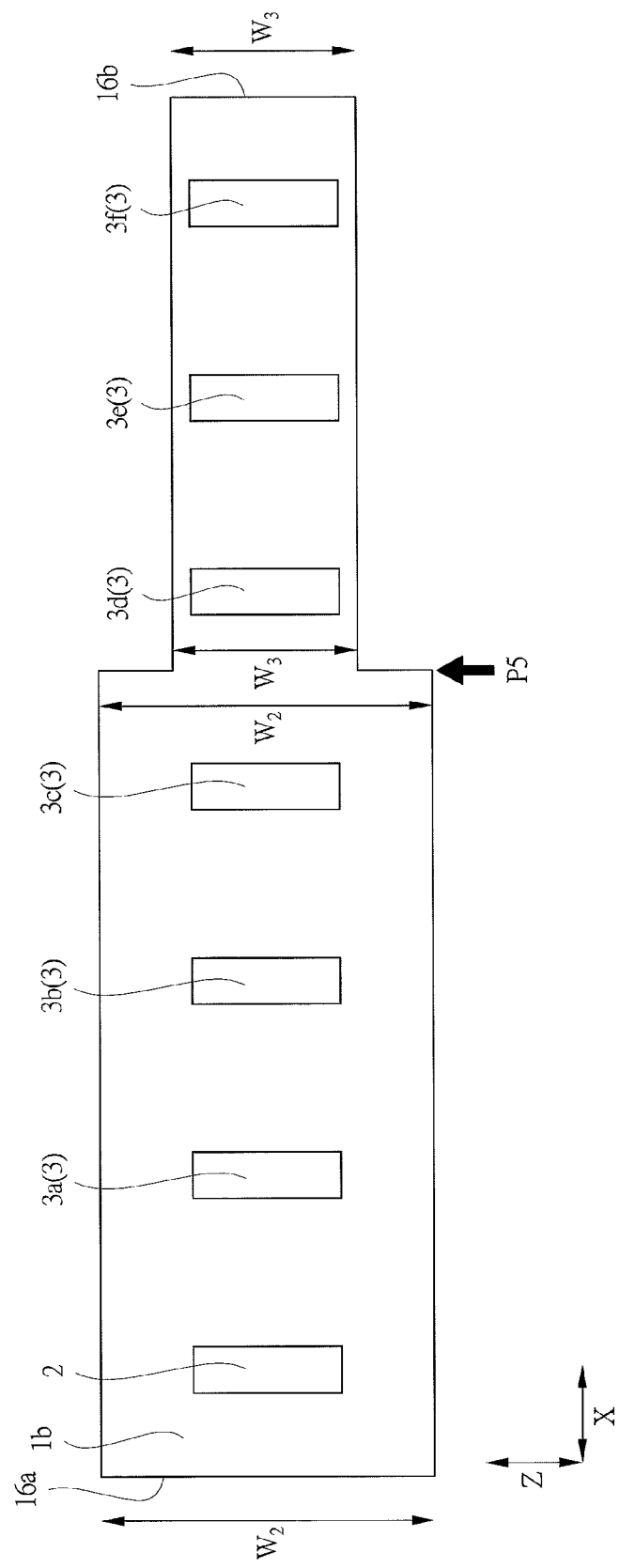
FIG. 22 is a plan view (top view) of the position detection system of FIG. 21.

FIG. 21 is a perspective view of another configuration example of the position detection system (position detection apparatus) according to the second embodiment, and FIG. 22 is a plan view (top view) of the same. In the position detection system (position detection apparatus) of FIGS. 21 and 22, an electromagnetic wave propagation medium 1b is used in place of the electromagnetic wave propagation medium 1a.

The electromagnetic wave propagation medium 1b is basically identical in configuration with the electromagnetic wave propagation medium 1a of FIGS. 19 and 20 except differences that will be explained in the following description. The differences between the electromagnetic wave propagation medium 1b and the electromagnetic wave propagation medium 1a of FIGS. 19 and 20 will be described.

According to the electromagnetic wave propagation medium 1a of FIGS. 19 and 20, the width of the electromagnetic wave propagation medium 1a decreases gradually (smoothly) from the end surface 16a toward the end surface 16b. According to the electromagnetic wave propagation medium 1b of FIGS. 20 and 21, however, the width of the electromagnetic wave propagation medium 1b remains the width $W_2$ from the end surface 16a to the position P5, remains the width $W_3$ from the end surface 16b to the position P5, and is changed from the larger width $W_2$ to the smaller width $W_3$ ($W_2 > W_3$) at the position P5. Specifically, the width $W_2$ of the electromagnetic wave propagation medium 1b remains uniform from the end surface 16a to the position P5, is reduced to $W_3$ smaller than the width $W_2$ at the position P5, and remains uniform from the position P5 to the end surface 16b. In other words, the width of the electromagnetic wave propagation medium 1b has a shape such that the uniform width $W_2$ in the area extending from the end surface 16a to the position P5 is larger than the uniform width $W_3$ in the area extending from the position P5 to the end surface 16b. The position P5 is the position between the end surface 16a and end surface 16b of the electromagnetic wave propagation medium 1b.

The conductor 13 and the conductor 14 are opposite and almost parallel to each other across the electromagnetic wave propagation space (15) in the area extending from the end surface 16a to the position P5 and in the area extending from the end surface 16b to the position P5. However, at the position P5, level differences are formed on the conductors 14 and 15 and the electromagnetic wave propagation space (15).

The base unit 2 and multiple terminals 3 are placed (disposed) on the electromagnetic wave propagation medium 1a such that the base unit 2 is placed at a position close to the end surface 16a while the terminals 3 are arranged in a row in the direction of heading from the position of placement of the base unit 2 toward the end surface 16b. The base unit 2 and at least one terminal 3 (terminals 3a, 3b, and 3c in FIG. 22) are placed in the area where the width of the electromagnetic wave propagation medium 1a is the uniform width $W_2$ (i.e., the area extending from the end surface 16a to the position P5), and at least one terminal 3 (terminals 3d, 3e, and 3f in FIG. 22) is placed in the area where the width of the electromagnetic wave propagation medium 1a is the uniform width $W_3$ (i.e., the area extending from the position P5 to the end surface 16b).

In the same manner as in the configuration of FIGS. 19 and 20, according to the configuration of FIGS. 21 and 22, the frequency f1 a that makes the attenuation (loss) of an electromagnetic wave propagating through the electromagnetic wave propagation medium 1a less is used as the frequency of the communication signal. As described above, this frequency f1 a of the communication signal should preferably be selected so that the wavelength of the communication signal in the electromagnetic wave propagation medium 1a is equal to or shorter than two times the minimum width ($W_3$) of the electromagnetic wave propagation medium 1a, that is, satisfies $\lambda \leq W_3 \times 2$. As a result of such frequency selection, when the communication signal with the frequency f1 a travels through the electromagnetic wave propagation medium 1b, the wavelength of the communication signal remains equal to or shorter than two times the width of the electromagnetic wave propagation medium 1b (which corresponds to the above mentioned width $W_1$) at any location in the electromagnetic wave propagation medium 1b. This suppresses the attenuation of the communication signal traveling through the electromagnetic wave propagation medium 1b. Hence accurate communication can be carried out between the base unit 2 and each terminal 3 or between different terminals 3, using the communication signal.

A signal with the frequency f2d and a signal with a frequency f2g are used as the position detection signal. The frequency f2d is lower than the frequency f2g, which is lower than the frequency f1 a (f2d<f2g<f1a). In the case of FIGS. 21 and 20, therefore, the position detection signal with the frequency f2g is used in place of the position detection signal with the frequency f2e used in the case of FIGS. 19 and 20.

In the case of FIGS. 20 and 21, it is preferable to select the frequency f2d so that the wavelength of the position detection signal with the frequency f2d in the electromagnetic wave propagation medium 1b is longer than two times the maximum width ($W_2$) of the electromagnetic wave propagation medium 1b ($\lambda > W_2 \times 2$). As a result of such frequency selection, when the position detection signal with the frequency f2b travels through the electromagnetic wave propagation medium 1a, the wavelength of the position detection signal remains equal to or longer than two times the width of the electromagnetic wave propagation medium 1a (which corresponds to the above mentioned width $W_1$) at any location in the electromagnetic wave propagation medium 1a. Hence the position detection signal attenuates heavily during its traveling through the electromagnetic wave propagation medium 1a.

The frequency f2g is equivalent to the above frequency f2e but is selected in a manner different from the manner in which the frequency f2e is selected.

The frequency f2g should preferably be selected so that wavelength of the position detection signal with the frequency f2g in the electromagnetic wave propagation medium 1b is equal to or shorter than two times the width $W_2$ of the electromagnetic wave propagation medium 1b and longer than two times the width $W_3$ of the electromagnetic wave propagation medium 1b ($W_2 \times 2 \geq \lambda > W_3 \times 2$). In other words, it is preferable to determine the frequency f2g to be the frequency that gives the position detection signal a wavelength equal to or shorter than two times the width $W_2$ and longer than two times the width $W_3$ ($W_2 \times 2 \geq \lambda W_3 \times 2$). As a result, when the position detection signal with the frequency f2g travels through the electromagnetic wave propagation medium 1b, the wavelength of the position detection signal is equal to or shorter than two times the width of the electromagnetic wave propagation medium 1b (which corresponds to the above mentioned width $W_1$) in an area where the width of the electromagnetic wave propagation medium 1b is the width $W_2$ (i.e., area extending from the end surface 16a to the position P5), so that the attenuation of the position detection signal is suppressed in this area. However, when the position detection signal with the frequency f2g traveling through the electromagnetic wave propagation medium 1b passes the position P5 and enters the area where the width of the electromagnetic wave propagation medium 1b is the width $W_3$ (i.e., area extending from the position P5 to the end surface 16b), the wavelength of the position detection signal becomes longer than two times the width of the electromagnetic wave propagation medium 1b (which corresponds to the above mentioned width $W_1$), so that the position detection signal attenuates heavily during its traveling through this area of the electromagnetic wave propagation medium 1b.

In the same manner as in the case of FIGS. 19 and 20, according to the case of FIGS. 21 and 22, when the base unit 2 inputs the position detection signal with the frequency f2g to the electromagnetic wave propagation medium 1b and causes the signal to propagate therethrough, the position detection signal with the frequency f2g shows a small attenuation rate in the area of the electromagnetic wave propagation medium 1b where its width is the width $W_2$ (i.e., area extending from the end surface 16a to the position P5). However, when the position detection signal with the frequency f2g transmitted from the base unit 2 passes the point P5 and enters the area where the width of the electromagnetic wave propagation medium 1b is the width $W_3$ (i.e., area extending from the position P5 to the end surface 16b), the wavelength of the position detection signal becomes larger than two times the width $W_3$ of the electromagnetic wave propagation medium 1b, which results in an increase in the attenuation rate of the position detection signal. As a result, when the position detection signal with the frequency f2g transmitted from the base unit 2 is received by the terminals 3d, 3e, and 3f, the reception signal strength at those terminals turns out to be the signal strength that has decreased (dropped) widely from the input strength at the base unit 2. Hence differences between reception signal strength S24a at the terminal 3d, reception signal strength S25a at the terminal 3e, and reception signal strength S26a at the terminal 3f becomes larger. Based on the reception signal strength S24a, S25a, and S26a (differences between the reception signal strength S24a, S25a, and S26a) of the position detection signal with the frequency f2ge transmitted from the base unit 2, therefore, the positions of the terminals 3d, 3e, and 3f can be detected at high precision.

When the base unit 2 inputs the position detection signal with the frequency f2d to the electromagnetic wave propagation medium 1b and causes the signal to propagate therethrough, the position detection signal starts attenuating right after leaving its input position, and therefore the terminals 3a, 3b, and 3c receive the position detection signal with the frequency f2d in its attenuated state. At this time, the reception signal strength at the terminals 3a, 3b, and 3c turns out to be the signal strength that has decreased (dropped) widely from the input strength at the base unit 2. Hence differences between reception signal strength S21a at the terminal 3a, reception signal strength S22a at the terminal 3b, and reception signal strength S23a at the terminal 3c becomes larger. Based on the reception signal strength S21a, S22a, and S23a (differences between the reception signal strength S21a, S22a, and S23) of the position detection signal with the frequency f2d transmitted from the base unit 2, therefore, the positions of the terminals 3a, 3b, and 3c can be detected at high precision.

For terminals 3 (terminals 3a, 3b, and 3c in FIG. 22) placed in the area where the width of the electromagnetic wave propagation medium 1b is the width $W_2$ (i.e., area extending from the end surface 16a to the position P5), therefore, the position of each terminal 3 (each of the terminals 3a, 3b, and 3c) can be detected based on the reception signal strength of the position detection signal with the frequency f2d transmitted from the base unit 2. For terminals 3 (terminals 3d, 3e, and 3f in FIG. 22) placed in the area where the width of the electromagnetic wave propagation medium 1b is the width $W_3$ (i.e., area extending from the position P5 to the end surface 16b), therefore, the position of each terminal 3 (each of the terminals 3d, 3e, and 3f) can be detected based on the reception signal strength of the position detection signal with the frequency f2g transmitted from the base unit 2.

In this embodiment, the position (position information) of each terminal 3 is detected using the position detection signal with the frequency f2d and the position detection signal with the frequency f2g such that the position detection signal with the frequency f2d is used to detect a terminal 3 located close to the base unit 2 (terminals 3a, 3b, and 3c in FIG. 22) while the position detection signal with the frequency f2g is used to detect a terminal 3 located distant from the base unit 2 (terminals 3d, 3e, and 3f in FIG. 22). The method of communication and position detection according to this configuration is different in this aspect from the method of communication and position detection according to the first embodiment and the configuration of FIGS. 19 and 20 of this embodiment but is the same in other aspects. While the case of using two frequencies (f2d and f2g) as the frequencies of the position detection signal is described, three or more frequencies may also be used as the frequencies of the position detection signal. In the case of FIGS. 21 and 22, the electromagnetic wave propagation medium 1b includes two areas, i.e., the area having the uniform width $W_2$ and the area having the uniform width $W_3$ smaller than the width $W_2$. However, the electromagnetic wave propagation medium 1b may include three or more areas each having a uniform width, in which case the uniform width of each area is reduced as each area becomes further distant from the base unit 2. In such a case, the width of the electromagnetic wave propagation medium 1b decreases step by step in the direction of moving away from the base unit 2 (direction of heading from the end surface 16a toward the end surface 16b). In the case of FIGS. 19 and 20, the width of the electromagnetic wave propagation medium 1a decreases gradually (linearly) in the direction of moving away from the base unit 2 (direction of heading from the end surface 16a toward the end surface 16b).

In this manner, by changing the width of the electromagnetic wave propagation medium 1b, the configuration of FIGS. 21 and 22 offers an effect roughly the same as the effect achieved by the configuration of FIGS. 19 and 20. Changing the width of the electromagnetic wave propagation medium 1b, therefore, limits terminals 3 of which the positions can be detected using the position detection signal with a specific frequency, to a certain group of terminals 3, and allows the position detection signal to be transmitted to a terminal distant from the base unit 2 without increasing the signal transmission power of the base unit 2. Using a combination of information of the signal strength (reception signal strength) of the position detection signal received by each terminal and information of the frequency of the position detection signal enables further precise position detection.

As describe above, according to the configuration of the position detection system (position detection apparatus) of the second embodiment, the position of each terminal 3 placed near the electromagnetic wave propagation medium can be detected. Particularly, using multiple frequencies as the frequencies of the position detection signal realizes highly precise position detection using a frequency that attenuates heavily in the electromagnetic wave propagation medium. By adjusting the frequency of the position detection signal transmitted by the base unit, the position of a terminal located distant from the base unit can be detected.

The frequency of the position detection signal is selected properly based on the size of the electromagnetic wave propagation medium and the attenuation rate of the signal in the electromagnetic wave propagation medium. Through this frequency selection, the range and precision of position detection can be adjusted.

Some terminals also transmit the position detection signal and the positional relation between a terminal having transmitted the position detection signal and a different terminal is detected. Through this process, the position of a terminal located far distant from the base unit can be detected, and not only the distance between the base unit and each terminal but also the distance between different terminals can be identified. Hence the precision of position detection is improved.

It is clear that if a terminal has information for use in position detection, such a terminal becomes capable of position detection as the base unit is.

Using information on the shape of the electromagnetic wave propagation medium (information of the placement-allowable positions of the terminals on the electromagnetic wave propagation medium) for detection of the position enables highly precise position detection and also allows detection of the positions of terminals arranged two-dimensionally or three-dimensionally.

The terminals and the base unit may be incorporated in the system such that the base unit for position detection is installed temporarily and following completion of detection of the position of each terminal, the base unit for position detection is removed, and then the system including the terminals but not including the base unit is operated.

In the system including the terminals housed in the housing, the electromagnetic wave propagation medium is laid in the housing. This configuration allows detection of each terminal.

Executing an embodiment given by combining the first and second embodiment together enables more precise position detection.

(Third Embodiment)

A third embodiment will be described by explaining examples of a position detection system (position detection apparatus) that detects the position of a communication device placed (disposed) near an electromagnetic wave propagation medium or of a position detection method, referring to drawings.

In the third embodiment, examples of a position detection system (position detection apparatus) that detects the position of each communication device placed (disposed) near an electromagnetic wave propagation medium, which system carries out position detection while switching the reception state of each communication device, will be described, referring to FIGS. 23 to 26.

Figure 23:
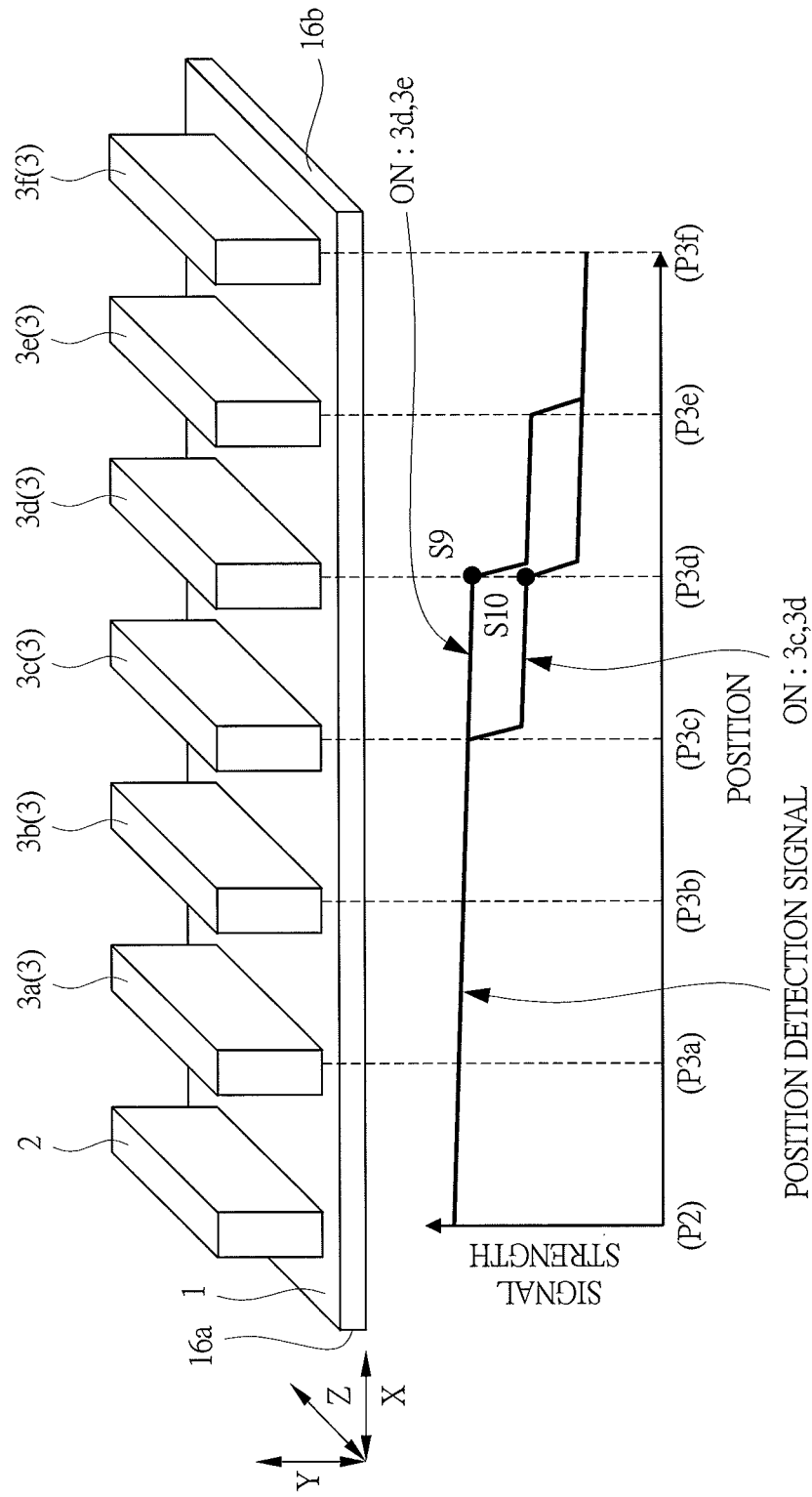
FIG. 23 is an explanatory diagram of a configuration example of a position detection system (position detection apparatus) according to a third embodiment of the present invention.

FIG. 23 is an explanatory diagram of a configuration example of a position detection system (position detection apparatus) according to a third embodiment of the present invention, showing a configuration example of a position detection apparatus that detects the position of each terminal while switching the reception state of each terminal. FIG. 23 corresponds to FIG. 6, etc.

The electromagnetic wave propagation medium 1 and the base unit 2 and multiple terminals 3 placed (disposed) on the electromagnetic wave propagation medium 1 of FIG. 23 are the same as the electromagnetic wave propagation medium 1, base unit 2, and multiple terminals 3 of FIGS. 1 and 6, and therefore will not be described repeatedly. A position detection method of the third embodiment will be described referring to FIG. 23.

When carrying out detection of the position of each terminal 3, the base unit 2 sends an instruction on whether or not to receive a position detection signal, to each terminal 3 through the electromagnetic wave propagation medium 1 and then transmits the position detection signal.

Specifically, the base unit 2 whose position is known in advance sends an signal (communication signal) giving an instruction on whether or not to receive the incoming position detection signal, to each terminal 3 through the electromagnetic wave propagation medium 1, and each terminal 3 receives that instruction signal, thus deciding on whether not to receive the incoming position detection signal. Based on the instruction from the base unit 2, each terminal 3 switches the state of a communication device, thereby sets the reception state of each terminal 3 to "state of receiving the position detection signal" or to "state of not receiving the position detection signal". The base unit 2 then inputs the position detection signal to the electromagnetic wave propagation medium 1 to transmit the signal therethrough.

Based on the instruction from the base unit 2, when each terminal 3 is set to "state of receiving the position detection signal", the terminal 3 receives the position detection signal propagating through the electromagnetic wave propagation medium 1 and absorbs part of the power of the position detection signal. Based on the instruction from the base unit 2, when each terminal 3 is set to "state of not receiving the position detection signal", the terminal 3 does not receive the position detection signal propagating through the electromagnetic wave propagation medium 1 and therefore does not absorb part of the power of the position detection signal.

Each terminal 3 transmits information of the reception signal strength of the position detection signal transmitted from the base unit 2 and received by the terminal 3, to the electromagnetic wave propagation medium 1 (as a communication signal), and the base unit 2 receives the information of the reception signal strength at each terminal 3.

This process is repeated as the reception state of each terminal 3 is switched between "state of receiving the position detection signal" and "state of not receiving the position detection signal".

The base unit 2 is thus able to detect the positional relation between terminals 3, based on the reception state condition of each terminal 3 (whether each terminal 3 is set to "state of receiving the position detection signal" or "state of not receiving the position detection signal") and on the signal strength (reception signal strength) of the position detection signal at each terminal 3. This process will be described in detail.

FIG. 24 is a table indicating the signal strength of the position detection signal received by the terminal 3d in the configuration of FIG. 23. The table of FIG. 24 shows relative values for the reception signal strength of the position detection signal input from the base unit 2 to the electromagnetic wave propagation medium 1 and received by the terminal 3d (signal strength of the position detection signal received by the terminal 3d). In FIG. 24, for a case where only the terminal 3d out of all terminals 3a, 3b, 3c, 3d, 3e, and 3f is set to "state of receiving the position detection signal" while the other terminals 3a, 3b, 3c, 3e, and 3f are set to "state of not receiving the position detection signal" (in the case of "ALL OFF" indicated on the table of FIG. 24), the reception signal strength of the position detection signal transmitted from the base unit 2 and received by the terminal 3d is determined to be the reference strength, and relative values for the reception signal strength to the reference strength are indicated in the table of FIG. 24 in decibel.

"ALL OFF" indicated on the table of FIG. 24 corresponds to the case where only the terminal 3d out of all terminals 3a, 3b, 3c, 3d, 3e, and 3f is set to "state of receiving the position detection signal" while the other terminals 3a, 3b, 3c, 3e, and 3f are set to "state of not receiving the position detection signal". "3a ON" indicated on the table of FIG. 24 corresponds to a case where the terminals 3a and 3d are set to "state of receiving the position detection signal" while the other terminals 3b, 3c, 3e, and 3f are set to "state of not receiving the position detection signal", "3b ON" indicated on the table of FIG. 24 corresponds to a case where the terminals 3b and 3d are set to "state of receiving the position detection signal" while the other terminals 3a, 3c, 3e, and 3f are set to "state of not receiving the position detection signal", "3c ON" indicated on the table of FIG. 24 corresponds to a case where the terminals 3c and 3d are set to "state of receiving the position detection signal" while the other terminals 3a, 3b, 3e, and 3f are set to "state of not receiving the position detection signal", "3e ON" indicated on the table of FIG. 24 corresponds to a case where the terminals 3d and 3e are set to "state of receiving the position detection signal" while the other terminals 3a, 3b, 3c, and 3f are set to "state of not receiving the position detection signal", and "3f ON" indicated on the table of FIG. 24 corresponds to a case where the terminals 3d and 3f are set to "state of receiving the position detection signal" while the other terminals 3a, 3b, 3c, and 3e are set to "state of not receiving the position detection signal".

It is understood from the table of FIG. 24 that in the cases of "3a ON", "3b ON", and "3c ON" the reception signal strength of the position detection signal transmitted from the base unit 2 and received by the terminal 3d is smaller than the same in the case of "ALL OFF". The table of FIG. 24 shows −3 dB as the reception signal strength in the cases of "3a ON", "3b ON", and "3c ON" which means that the reception signal strength of the position detection signal at the terminal 3d in the cases of "3a ON", "3b ON", and "3c ON" is approximately the half of the reception signal strength of the position detection signal at the terminal 3d in the case of "ALL OFF". Specifically, in the case where in addition to the terminal 3d, any one of the terminals 3a, 3b, and 3c is also set to "state of receiving the position detection signal", the reception signal strength of the position detection signal transmitted from the base unit 2 and received by the terminal 3d is smaller than the same in the case where only the terminal 3d is set to "state of receiving the position detection signal" while the terminals other than terminal 3d are set to "state of not receiving the position detection signal" (e.g., the reception signal strength in the former case is −3 dB, that is, half of the same in the latter case). This is because that any one of the terminals 3a, 3b, and 3c located between the base unit 2 and the terminal 3d absorbs the power of the position detection signal upon receiving it. This means that the rate of absorption of the power of the position detection signal propagating through the electromagnetic wave propagation medium 1 changes through switching of the reception state of each terminal 3 (between "state of receiving" and "state of not receiving").

It is understood from the table of FIG. 24 that in the cases of "3e ON" and "3f ON" the reception signal strength of the position detection signal transmitted from the base unit 2 and received by the terminal 3d is almost the same as the reception signal strength in the case of "ALL OFF". Specifically, in the case where in addition to the terminal 3d, any one of the terminals 3e and 3f is also set to "state of receiving the position detection signal", the reception signal strength of the position detection signal transmitted from the base unit 2 and received by the terminal 3d is almost the same as the reception signal strength in the case where only the terminal 3d is set to "state of receiving the position detection signal" while the terminals other than terminal 3d are set to "state of not receiving the position detection signal". This is because that even if any one of the terminals 3e and 3f not located between the base unit 2 and the terminal 3d but located ahead of the terminal 3d (distant from the terminal 3d with respect to the base unit 2 as the reference point) absorbs the power of the position detection signal upon receiving it, that power absorption does not affect the reception signal strength of the position detection signal at the terminal 3d.

"ON: 3d, 3e" indicated in the graph of FIG. 23 corresponds to the case of "3e ON" of FIG. 24 where the terminals 3d and 3e are set to "state of receiving the position detection signal" while the other terminals 3a, 3b, 3c, and 3f are set to "state of not receiving the position detection signal". In such a case, as indicated by the position detection signal curve of "ON: 3d, 3e" on the graph of FIG. 23, the position detection signal transmitted from the base unit 2 attenuates little until it reaches the terminal 3d and therefore shows high reception signal strength at the terminal 3d. When the position detection signal is received by the terminal 3d, however, the power of the position detection signal is absorbed, which significantly drops its signal strength. Then, when the position detection signal is received by the terminal 3e, the power of the position detection signal is absorbed again, which further drops its signal strength. "ON: 3c, 3d" indicated in the graph of FIG. 23 corresponds to the case of "3c ON" of FIG. 24 where the terminals 3c and 3d are set to "state of receiving the position detection signal" while the other terminals 3a, 3b, 3e, and 3f are set to "state of not receiving the position detection signal". In such a case, as indicated by the position detection signal curve of "ON: 3c, 3d" on the graph of FIG. 23, when the position detection signal transmitted from the base unit 2 is received by the terminal 3e, the power of the position detection signal is absorbed, which significantly drops its signal strength. As a result, the position detection signal reduced in its strength shows lower reception signal strength upon arrival at the terminal 3d, at which the power of the position detection signal is absorbed again. Hence the position detection signal with further reduced signal strength is transited to the terminal 3e and 3f.

When the reception signal strength of the position detection signal transmitted from the base unit 2 and received by the terminal 3*d* in the case of "3*a* ON" is lower than the reception signal strength of the position detection signal transmitted from the base unit 2 and received by the terminal 3*d* in the case of "ALL OFF" (when the extent of a drop in the reception signal strength is equal to or larger than a given extent), therefore, it is concluded that the terminal 3*a* is located between the terminal 3*d* and the base unit 2. Similarly, when the reception signal strength of the position detection signal transmitted from the base unit 2 and received by the terminal 3*d* in the case of "3*b* ON" is lower than the reception signal strength of the position detection signal transmitted from the base unit 2 and received by the terminal 3*d* in the case of "ALL OFF" (when the extent of a drop in the reception signal strength is equal to or larger than the given extent), it is concluded that the terminal 3*b* is located between the terminal 3*d* and the base unit 2. Further, when the reception signal strength of the position detection signal transmitted from the base unit 2 and received by the terminal 3*d* in the case of "3*c* ON" is lower than the reception signal strength of the position detection signal transmitted from the base unit 2 and received by the terminal 3*d* in the case of "ALL OFF" (when the extent of a drop in the reception signal strength is equal to or larger than the given extent), it is concluded that the terminal 3*c* is located between the terminal 3*d* and the base unit 2. When the reception signal strength of the position detection signal transmitted from the base unit 2 and received by the terminal 3*d* in the case of "ALL OFF" is almost the same as the reception signal strength of the position detection signal transmitted from the base unit 2 and received by the terminal 3*d* in the case of "3*e* ON" (when the extent of a drop in the reception signal strength is smaller than the given extent), it is concluded that the terminal 3*e* is not located between the terminal 3*d* and the base unit 2. Similarly, when the reception signal strength of the position detection signal transmitted from the base unit 2 and received by the terminal 3*d* in the case of "ALL OFF" is almost the same as the reception signal strength of the position detection signal transmitted from the base unit 2 and received by the terminal 3*d* in the case of "3*f* ON" (when the extent of a drop in the reception signal strength is smaller than the given extent), it is concluded that the terminal 3*f* is not located between the terminal 3*d* and the base unit 2. "Located between the terminal 3*d* and the base unit 2" means "located between the terminal 3*d* and the base unit 2" on the propagation path for the position detection signal traveling through the electromagnetic wave propagation medium 1.

In this manner, in determining the positional relation between the terminal 3*d* and the other terminals 3 (3*a*, 3*b*, 3*c*, 3*e*, 3*f*), whether each of the terminals 3 (3*a*, 3*b*, 3*c*, 3*e*, 3*f*) other than the terminal 3*d* is located between the base unit 2 and the terminal 3*d* can be determined. This process is carried out on multiple terminals 3 (which means determining the positional relation not only between the terminal 3*d* and the other terminals 3 but also between each terminal other than the terminal 3*d* (each of the terminals 3*a*, 3*b*, 3*c*, 3*e*, and 3*f*) and the other terminals 3). By integrating positional relation information obtained by such a process, therefore, the positional relation (order of arrangement) of all terminals 3 can be identified.

According to this embodiment, to detect the position of each terminal 3, the following process is carried out for detection of the position of the terminal 3*d* among the terminals 3*a*, 3*b*, 3*c*, 3*d*, 3*e*, and 3*f*. As the reception state of each of the terminals 3*a*, 3*b*, 3*c*, 3*e*, and 3*f* other than the terminal 3*d* is switched (between "state of receiving the position detection signal" and "state of not receiving the position detection signal", e.g., between six states indicated in FIG. 24), the base unit 2 transmits the position detection signal through the electromagnetic wave propagation medium 1 to the terminal 3*d* several times (e.g., transmits the position detection signal six times for the six states, respectively, in the case of FIG. 24). The position of the terminal 3*d* is then detected based on the signal strength (reception signal strength) of the position detection signal transmitted and received by the terminal 3*d* several times, which means that the positional relation between the terminal 3*d* and the other terminals 3*a*, 3*b*, 3*c*, 3*d*, 3*e*, and 3*f* is determined with respect to the base unit 2 serving as the reference point. The same process as this process of detecting the position of the terminal 3*d* is also carried out on the other terminals 3*a*, 3*b*, 3*c*, 3*d*, 3*e*, and 3*f* in sequence. Hence the positions of all terminals 3 are detected and the order of arrangement of all terminals 3 is identified.

A terminal 3 set to "state of receiving the position detection signal" receives the position detection signal transmitted through the electromagnetic wave propagation medium 1 and absorbs some of the power of the position detection signal. For example, the case of the reception signal strength being "−3 dB" indicated in the table of FIG. 24 represents the case where the terminal 3 set to "state of receiving the position detection signal" receives the position detection signal transmitted through the electromagnetic wave propagation medium 1 and absorbs approximately half of the power of the position detection signal. In contrast, a terminal 3 set to "state of not receiving the position detection signal" does not receive the position detection signal transmitted through the electromagnetic wave propagation medium 1, thus avoiding absorbing the power of the position detection signal as much as possible. Therefore, when the reception state of a certain terminal 3 is switched between "state of receiving the position detection signal" and "state of not receiving the position detection signal", if whether the reception signal strength of the position detection signal at the terminal 3*d* drops or not is known, whether the certain terminal 3 is located between the terminal 3*d* and the base unit 2 or not can be determined.

It is preferable that a receiver of the terminal 3 (receiver incorporated in the terminal 3) be electrically coupled strongly to the electromagnetic wave propagation medium 1 and absorb signal power (power of the position detection signal). Larger signal power absorption rates (rates of absorbing the power of the position detection signal) lead to a larger difference in signal strength (signal strength of the position detection signal) resulting from the reception state conditions of terminals 3, which improves position detection precision. Specifically, when the rate of absorbing the power of the position detection signal upon reception of the position detection signal becomes larger, a variation of the reception signal strength of a certain terminal 3 that results when the reception state of a different terminal 3 is changed becomes larger. Hence position detection precision is improved.

According to this embodiment, both position detection signal and communication signal may have the same frequency. In other words, in this embodiment, the frequency of the position detection signal may not be a frequency that causes the position detection signal to attenuate heavily in the electromagnetic wave propagation medium 1.

According to this embodiment, the end surfaces 16*a* and 16*b* of the electromagnetic wave propagation medium 1 should preferably be terminated with given impedance or have an electromagnetic wave absorber so as not to reflect an electromagnetic wave. If a large reflected wave is created at the end surfaces 16a and 16b, for example, the signal strength at the terminal 3d changes due to the effect of the reception state of the terminal 3e, in which case determining whether the terminal 3e is between the terminal 3d and the base unit 2 may become difficult.

In this embodiment, in the same manner as in the first embodiment (the case of FIG. 9, etc.), some terminals 3 may transmit the position detection signal, with which the positional relation between different terminal 3 is detected. By using information of the positional relation between different terminal 3 and between the base unit 2 and a terminal having transmitted the position detection signal, the positions of all terminals 3 can be detected.

In the same manner as in the configuration example of the first embodiment, using information on the shape of the electromagnetic wave propagation medium (information of the placement-allowable positions of the terminals 3 on the electromagnetic wave propagation medium 1) for detection of the position of each terminal 3 enables highly precise position detection and also allows detection of the positions of terminals 3 arranged three-dimensionally or on the electromagnetic wave propagation medium of a more complicated shape.

FIG. 25 is an explanatory diagram of a configuration example of a communication device incorporated in the terminal 3 used in the third embodiment, and FIG. 26 is an explanatory diagram of another configuration example of the communication device incorporated in the terminal 3 used in the third embodiment.

According to this embodiment, as described above, each terminal 3 is so configured that its reception state can be switched (between "state of receiving the position detection signal" and "state of not receiving the position detection signal"). This reception state switching can be carried out by the communication device of each terminal 3 (communication device incorporated in each terminal 3, e.g., a communication device 31 or 31b, which will be described later). Configuration examples of the communication device enabling reception state switching are depicted in FIGS. 25 and 26.

FIG. 25 depicts the communication device 31a having a coupler (antenna) 32, a switch 33a, a receiver 34, and a transmitter 35. The coupler 32 functions as an antenna that is coupled to the electromagnetic wave propagation medium 1 to allow input/output of an electromagnetic wave to/from the electromagnetic wave propagation medium 1. The switch 33a is configured to be capable of switching for connecting the coupler 32 to the transmitter 35, for connecting the coupler 32 to the receiver 34, or for connecting the coupler 32 to a high-impedance element. The coupler 32 is placed, for example, at the position counter to the slot SL so that an electromagnetic wave is transmitted from the coupler 32 into the electromagnetic wave propagation medium 1 through the slot SL or from the electromagnetic wave propagation medium Ito the coupler 32 through the slot SL.

When the communication device 31a of FIG. 25 receives the position detection signal (in the case of setting to "state of receiving the position detection signal"), the communication device 31a connects the coupler 32 to the receiver 34, using the switch 33a. As a result, the position detection signal traveling through the electromagnetic wave propagation medium 1 is received by the receiver 34 via the coupler 32 (which means that the position detection signal is received by the terminal 3).

When the communication device 31a does not receive the position detection signal (in the case of setting to "state of not receiving the position detection signal"), the communication device 31a connects the coupler 32 to the high-impedance element (which is diagrammatically indicated as "High Z" in FIG. 25), using the switch 33a, that is, disconnects (cuts off) the coupler 32 from the receiver 34 to render the coupler 32 electrically open, thereby reflects the position detection signal. As a result, the position detection signal traveling through the electromagnetic wave propagation medium 1 passes the position of placement of the coupler 32 without reducing the signal power, which means that the terminal 3 does not receive the position detection signal. In this manner, reception state switching can be carried out by electrically connecting the receiver 34 to the coupler (antenna) 32 (in the case of setting to "state of receiving the position detection signal") or cutting off the receiver 34 from the coupler 32 (in the case of setting to "state of not receiving the position detection signal").

Connecting the coupler 32 to a high-impedance element means that an element to which the coupler 32 is connected has high impedance. Such a state is realized by, for example, rendering the coupler 32 electrically open or connecting the coupler 32 to a high-resistance element via the switch 33a.

The communication device 31a can switch the reception state in this manner. The terminal 3 having such a communication device 31a can be switched in its reception state (between "state of receiving the position detection signal" and "state of not receiving the position detection signal"). When the terminal 3 transmits a signal, it connects the coupler 32 to the transmitter 35, using the switch 33a. The signal (communication signal) transmitted from the transmitter 35 is input to the electromagnetic wave propagation medium 1 via the coupler 32 and travels through the electromagnetic wave propagation medium 1.

FIG. 26 depicts the communication device 31b having the coupler (antenna) 32, a switch 33b, the receiver 34, the transmitter 35, and an impedance adjuster 36. The switch 33b is configured to be capable of switching for connecting the coupler 32 to the transmitter 35 or for connecting the coupler 32 to the receiver 34 via the impedance regulator 32. The impedance adjuster 32 changes impedance through a capacitor, etc. When the communication device 31b of FIG. 26 receives the position detection signal (in the case of setting to "state of receiving the position detection signal"), the communication device 31b connects the coupler 32 to the impedance adjuster 32 using the switch 33b, thereby adjusts the impedance of the communication device to impedance adequate for signal reception. Specifically, to allow the position detection signal to be input to the coupler 32 and received by the receiver 34, the impedance adjuster 32 carries out impedance matching. As a result, the position detection signal traveling through the electromagnetic wave propagation medium 1 is received by the receiver 34 via the coupler 32 and impedance adjuster 32 (which means that the position detection signal is received by the terminal 3).

When the communication device 31b does not receive the position detection signal (in the case of setting to "state of not receiving the position detection signal"), the communication device 31b connects the coupler 32 to the impedance adjuster 36, using the switch 33b, and sets the impedance of the communication device to impedance with which the communication device reflects the position detection signal, using the impedance adjuster 36. For example, the impedance adjuster 36 is adjusted to generate high impedance. In other words, at the frequency of the position detection signal, the coupler 32 is disconnected from the receiver 34 to render the coupler 32 electrically open, so that the position detection signal is reflected. As a result, the position detection signal traveling through the electromagnetic wave propagation medium 1 passes the position of placement of the coupler 32 without reducing the signal power, which means that the terminal 3 does not receive the position detection signal. In this manner, reception state switching can be carried out by regulating impedance matching between the receiver 34 and the coupler (antenna) 32.

The communication device 31b can switch the reception state in this manner. The terminal 3 having such a communication device 31b can be switched in its reception state (between "state of receiving the position detection signal" and "state of not receiving the position detection signal"). When the terminal 3 transmits a signal, it connects the coupler 32 to the transmitter 35, using the switch 33b. The signal (communication signal) transmitted from the transmitter 35 is input to the electromagnetic wave propagation medium 1 via the coupler 32 and travels through the electromagnetic wave propagation medium 1.

Each of the communication devices 31a and 31b has a circuit for detecting (measuring) the strength of a signal received by the receiver 34.

In the third embodiment, the antenna (coupler 32) incorporated in the terminal 3 should preferably be the antenna that is strongly coupled to the electromagnetic wave propagation medium and that absorbs an electromagnetic wave (position detection signal) as much as possible upon reception of the position detection signal. In contrast, an antenna (coupler 32) incorporated in the terminal 3 in the first and second embodiment and a fourth embodiment to be described later should preferably be an antenna that is weakly coupled to the electromagnetic wave propagation medium and that absorbs an electromagnetic wave (position detection signal) in less volume to reflect some portion thereof upon reception of the position detection signal. Such a difference in the antenna's behavior can be adjusted by adjusting the characteristics of the antenna (coupler 32).

The communication device incorporated in the terminal 3 used in the first and second embodiment and the fourth embodiment to be described later may have the same configuration as that of the communicator 31a or 31b. In such a case, the antenna (coupler 32) weakly connected to the electromagnetic wave propagation medium is used as the antenna (coupler 32) of the communication device, and the impedance adjuster 36 may be omitted from the communication device.

As describe above, according to the configuration of the position detection system (position detection apparatus) of the third embodiment, the position of each terminal (communication device) placed near the electromagnetic wave propagation medium can be detected. The signal strength (reception signal strength) of the position detection signal at each terminal is detected as the reception state of each terminal is switched. Through this process, the positional relation between each terminal and the base unit can be detected.

The receiver of the terminal 3 is capable of strongly coupling electrically to the electromagnetic wave propagation medium 1 and absorbing the signal power. This allows an increase in a signal strength difference resulting from reception state conditions of terminals 3, thus improving position detection precision.

The same frequency can be adopted as the frequency of the communication signal and that of the position detection signal. As a result, highly reliable communication and highly precise position detection using a frequency that makes signal attenuation in the electromagnetic wave propagation medium less can be achieved simultaneously.

The end surfaces of the electromagnetic wave propagation medium 1 are each terminated with given impedance or have an electromagnetic absorber so as not to reflect an electromagnetic wave. By reducing the effect of a reflected electromagnetic wave in this manner, the positional relation between the base unit and each terminal can be detected more precisely.

The frequency of the position detection signal is selected properly based on the size of the electromagnetic wave propagation medium and the attenuation rate of the signal in the electromagnetic wave propagation medium. Through this frequency selection, the range and precision of position detection can be adjusted.

Some terminals also transmit the position detection signal and the positional relation between the some terminals and a different terminal is detected. Through this process, the position of a terminal located far distant from the base unit can be detected, and not only the positional relation between the base unit and each terminal but also the positional relation between different terminals can be identified. Hence the precision of position detection is improved.

By adjusting transmission power for transmitting the position detection signal from the base unit, the position of a terminal located far distant from the base unit can be detected.

It is clear that if a terminal has information for use in position detection, such a terminal becomes capable of position detection as the base unit is.

Using information on the shape of the electromagnetic wave propagation medium (information of the placement-allowable positions of the terminals on the electromagnetic wave propagation medium) for detection of the position enables highly precise position detection and also allows detection of the positions of terminals arranged two-dimensionally or three-dimensionally.

The terminals and the base unit may be incorporated in the system such that the base unit for position detection is installed temporarily and following completion of detection of the position of each terminal, the base unit for position detection is removed, and then the system including the terminals but not including the base unit is operated.

In the system including the terminals housed in the housing, the electromagnetic wave propagation medium is laid in the housing. This configuration allows detection of each terminal.

If position detection of the third embodiment is carried out on a result of position detection of the first and second embodiments, the position detection result can be corrected to enable more precise and accurate position detection. For example, position detection of the first or second embodiment is carried out and then position detection of the third embodiment is carried out on terminals 3 determined to be adjacent to each other by the position detection of the first or second embodiment. In this manner, the result of position detection of the first or second embodiment is corrected by the third embodiment.

For example, a case is assumed where position detection of the first embodiment derives a correct conclusion that the terminal 3d and the terminal 3e are adjacent to each other and that the terminal 3d is closer to the base unit 2 than the terminal 3e. Position detection of the third embodiment is then carried out on this position detection result by comparing a reception signal strength value at the terminal 3d in the case of "ALL OFF" indicated in FIG. 24 with a reception signal strength value at the terminal 3d in the case of "3e ON". If both reception signal strength values are found to be almost the same (if the extent of drop of the reception signal strength is found to be smaller than a given extent), the conclusion that the terminal $3d$ is closer to the base unit $2$ than the terminal $3e$ is confirmed as a correct conclusion.

Another case is assumed where position detection of the first embodiment derives a wrong conclusion that the terminal $3c$ and the terminal $3d$ are adjacent to each other and that the terminal $3d$ is closer to the base unit $2$ than the terminal $3c$. Position detection of the third embodiment is then carried out on this position detection result by comparing a reception signal strength value at the terminal $3d$ in the case of "ALL OFF" indicated in FIG. 24 with a reception signal strength value at the terminal $3d$ in the case of "$3c$ ON". If a drop in the reception signal strength is found (if the extent of drop of the reception signal strength is found to be equal to or larger than the given extent), it is determined that the terminal $3c$ is present between the terminal $3d$ and the base unit $2$. Hence the conclusion derived by the position detection of the first embodiment that the terminal $3d$ is closer to the base unit $2$ than the terminal $3c$ is determined to be wrong. Accordingly, the result of position detection of the first embodiment is corrected. Correction is made by, for example, replacing the detected position of the terminal $3c$ and the same of the terminal $3d$ with each other according to the result of position detection of the third embodiment (according to the corrected conclusion that the terminal $3c$ is closer to the base unit $2$ than the terminal $3d$). When the result of position detection of the first embodiment is different from the result of position detection of the first embodiment carried out on the result of position detection of the first embodiment, position detection may be carried out again.

(Fourth Embodiment)

A fourth embodiment will be described by explaining examples of a position detection system (position detection apparatus) that detects the position of a communication device placed (disposed) near an electromagnetic wave propagation medium or of a position detection method, referring to drawings.

In the fourth embodiment, examples of a position detection system that detects the position of each communication device placed (disposed) near an electromagnetic wave propagation medium, which system carries out position detection by generating a standing wave as an interference wave made up of two or more electromagnetic waves in the electromagnetic wave propagation medium, will be described, referring to FIGS. 27 to 32.

Figure 27:
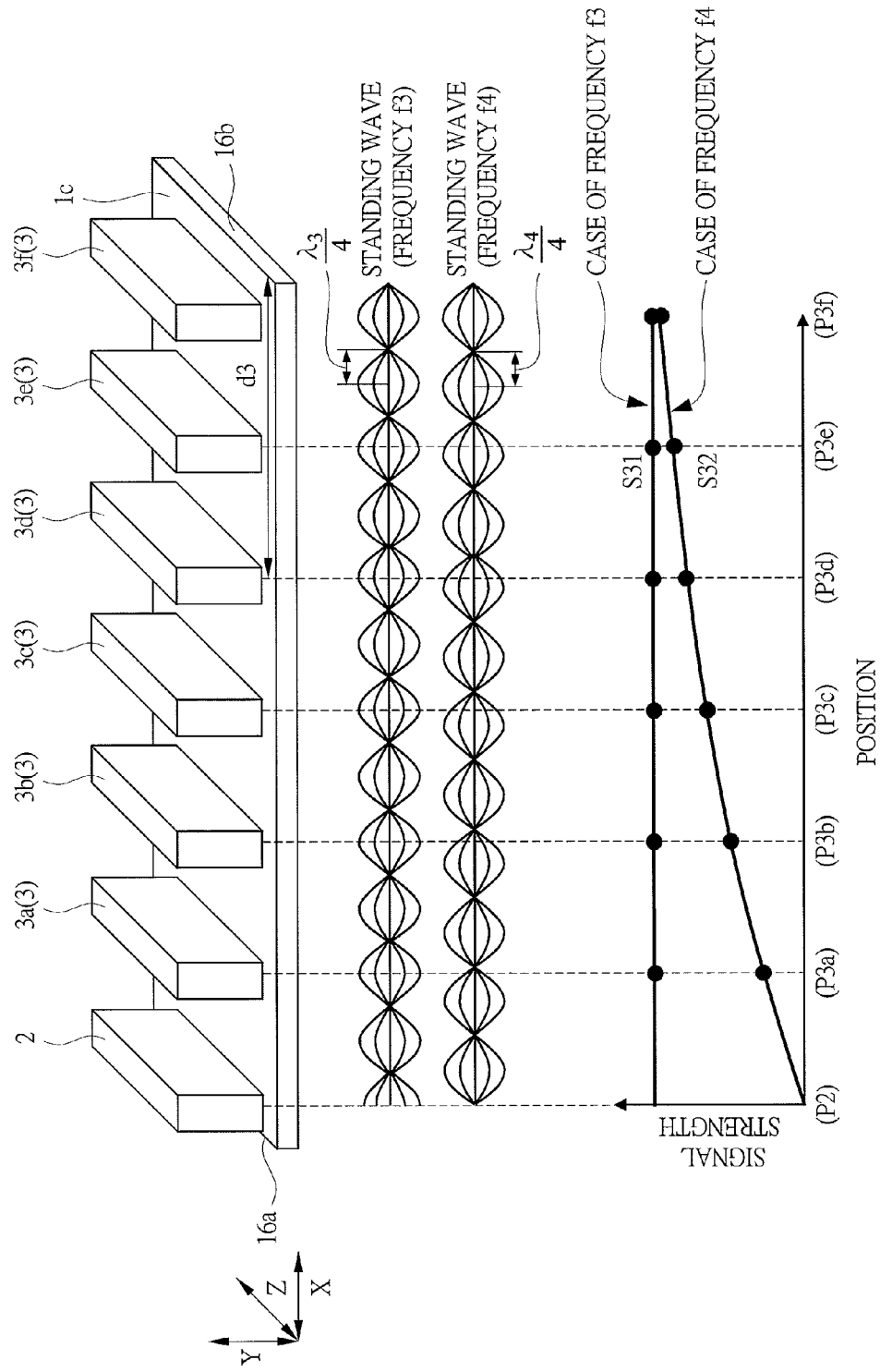
FIG. 27 is an explanatory diagram of a configuration example of a position detection system (position detection apparatus) according to a fourth embodiment of the present invention.

FIG. 27 is an explanatory diagram (perspective view and a graph) of a configuration example of the position detection system (position detection apparatus) according to the fourth embodiment, showing a configuration example corresponding to FIG. 6, etc.

An electromagnetic wave propagation medium $1c$ of FIG. 27 is basically identical in configuration with the electromagnetic wave propagation medium 1 of FIG. 1 except a difference in the end surfaces 16a and 16b. The configuration of the electromagnetic wave propagation medium $1c$, therefore, will not be described repeatedly.

The electromagnetic wave propagation medium $1c$ of FIG. 27 is so configured that an electromagnetic wave in the electromagnetic wave propagation medium $1c$ is reflected by the end surface 16b, which means that the end surface 16b of the electromagnetic wave propagation medium $1c$ is so configured as to reflect electromagnetic wave.

As shown in FIG. 27, the base unit 2 and multiple terminal 3 are placed (disposed) on the electromagnetic wave propagation medium $1c$ such that the base unit 2 is placed (disposed) at a position close to the end surface 16a while the terminals 3 are arranged in a row in the direction of heading from the position of placement of the base unit 2 toward the end surface 16b.

The position detection signal transmitted from the base unit 2 propagates through the electromagnetic wave propagation medium $1c$ and reaches the end surface 16b. Because the end surface 16b is not terminated with given impedance of, for example, 50Ω and has no electromagnetic wave absorber, the end surface 16b reflects the incoming position detection signal. The position detection signal reflected by the end surface 16b (i.e., reflected wave) travels toward the base unit 2 (end surface 16a). Hence the signal (position detection signal) traveling from the base unit 2 toward the end surface 16b and the signal (reflected wave) traveling from end surface 16b toward the base unit 2 are superposed on each other to create a standing wave.

In this manner, when the position detection signal, i.e., the electromagnetic wave for position detection is input from the base unit 2 to the electromagnetic wave propagation medium $1c$ and is transmitted through the electromagnetic wave propagation medium $1c$ to reach the end surface 16b and then is reflected thereon, the position detection signal traveling from the base unit 2 toward the end surface 16b and the reflected wave (of the position detection signal) traveling from end surface 16b toward the base unit 2 (end surface 16a) are present together in the electromagnetic wave propagation medium $1c$. These two electromagnetic waves are superposed on each other (synthesized together or interfere with each other) to create a standing wave as an interference wave in the electromagnetic wave propagation medium $1c$.

The reflected wave (position detection signal reflected by the end surface 16b) propagates through the electromagnetic wave propagation medium $1c$ toward the base unit 2 and is absorbed by the base unit 2 having given impedance. If the base unit 2 is weakly coupled to the electromagnetic wave propagation medium $1c$, the reflected wave is not absorbed sufficiently by the base unit 2 and reaches the end surface 16a, in which case the reflected wave reflected again by the end surface 16a may damage the waveform of the standing wave in the electromagnetic wave propagation medium $1c$. For this reason, the end surface 16a may be terminated with given impedance or have an electromagnetic wave absorber so as not to reflect the electromagnetic wave. This prevents the re-reflection of the electromagnetic wave at the end surface 16a, thus preventing damage to the waveform of the standing wave in the electromagnetic wave propagation medium $1c$.

In this manner, the position detection signal transmitted from the base unit 2 and the reflected wave resulting from the reflection of the position detection signal by the end surface 16b join to generate the standing wave as the interference wave in the electromagnetic wave propagation medium $1c$. The constructive parts (antinodes) and deconstructive parts (nodes) of the generated standing wave are determined by their distances to the end surface 16b and the wavelengths of the signals (position detection signal and its reflected wave). The constructive parts (antinodes) of the standing wave correspond to the parts of standing wave where its amplitude (amplitude of an electric field) becomes the maximum, while the deconstructive parts (nodes) of the standing wave correspond to the parts of standing wave where its amplitude (amplitude of an electric field) becomes the minimum.

Therefore, the distance between each terminal 3 and the end surface 16b can be identified by detecting the signal strength at each terminal 3 while changing the frequency of the position detection signal. Hence, by combining information on the distance between each terminal 3 and the end surface 16b and information on the shape of the electromagnetic wave propagation medium 1c (information on the placement-allowable positions of the terminals 3 on electromagnetic wave propagation medium 1c), the position of each terminal 3 can be detected.

For example, FIG. 27 depicts a case where the frequency of the position detection signal transmitted from the base unit 2 and propagating through the electromagnetic wave propagation medium 1c is f3, showing a standing wave generated out of the position detection signal with the frequency f3 and a reflected wave resulting from the reflection of the position detection signal by the end surface 16b, as "standing wave (frequency 3f)". FIG. 27 also depicts a case where the frequency of the position detection signal transmitted from the base unit 2 and propagating through the electromagnetic wave propagation medium 1c is f4, showing a standing wave generated out of the position detection signal with the frequency f4 and a reflected wave resulting from the reflection of the position detection signal by the end surface 16b, as "standing wave (frequency 4f)". The standing wave formed of the position detection signal with the frequency that gives it a wavelength λ and a standing wave resulting from the reflection of the position detection signal by the end surface 16b alternately repeats the part where the amplitude of the standing wave (amplitude of an electric field) becomes the maximum and the part where the amplitude of the standing wave (amplitude of an electric field) becomes the minimum every time the standing wave advances by 4/1 of the wavelength λ along the propagation direction of the position detection signal.

When the wavelength of the transmitted signal with the frequency f3 in the electromagnetic wave propagation medium 1c is $\lambda_3$, therefore, the standing wave formed of the transmitted signal with the frequency f3 and the reflected wave of that signal alternately repeats the part (antinode) where the amplitude of the standing wave becomes the maximum and the part (node) where the amplitude of the standing wave becomes the minimum every time the standing wave advances by $\lambda_3/4$ along the propagation direction of the position detection signal. When the wavelength of the transmitted signal with the frequency f4 in the electromagnetic wave propagation medium 1c is $\lambda_4$, therefore, the standing wave formed of the transmitted signal with the frequency f4 and the reflected wave of that signal alternately repeats the part (antinode) where the amplitude of the standing wave becomes the maximum and the part (node) where the amplitude of the standing wave becomes the minimum every time the standing wave advances by $\mu_4/4$ along the propagation direction of the position detection signal.

The graph of FIG. 27 shows signal strength detected at each terminal 3 under a condition where the standing wave is generated out of the position detection signal with the frequency f3 transmitted from the base unit 2 and the reflected wave resulting from the reflection of the position detection signal by the end surface 16b, as each black circle on a signal strength curve for "the case of the frequency f3", and also shows signal strength detected at each terminal 3 under a condition where the standing wave is generated out of the position detection signal with the frequency f4 transmitted from the base unit 2 and the reflected wave resulting from the reflection of the position detection signal by the end surface 16b, as each black circle on a signal strength curve for "the case of the frequency f4".

When the frequency of the position detection signal transmitted from the base unit 2 is f3, a signal strength value detected at each terminal 3 becomes the minimum (almost zero) when the distance from the end surface 16b to the terminal 3 is $n \times \lambda_3/2$ (n denotes an integer equal to or larger than 0), becomes the maximum when the distance from the end surface 16b to the terminal 3 is $n \times \lambda_3/2 + \lambda_3/4$ (n denotes an integer equal to or larger than 0), and becomes a value between the maximum and the minimum when the distance from the end surface 16b to the terminal 3 is a distance between $n \times \lambda_3/2$ and $n \times \lambda_3/2 + \lambda_3/4$. When the frequency of the position detection signal transmitted from the base unit 2 is f4, a signal strength value detected at each terminal 3 becomes the minimum (almost zero) when the distance from the end surface 16b to the terminal 3 is $n \times \lambda_4/2$ (n denotes an integer equal to or larger than 0), becomes the maximum when the distance from the end surface 16b to the terminal 3 is $n \times \lambda_3/2 + \lambda_3/4$ (n denotes an integer equal to or larger than 0), and becomes a value between the maximum and the minimum when the distance from the end surface 16b to the terminal 3 is a distance between $n \times \lambda_4/2$ and $n \times \lambda_4/2 + \lambda_4/4$.

Therefore, when a standing wave is generated from the position detection signal with the frequency f3 and the signal strength (signal strength of the standing wave, i.e., amplitude of the standing wave) is detected at a terminal 3 (which is assumed to be the terminal 3e in this case), if the distance d3 from the end surface 16b to the terminal 3e is expressed as $d3 = \lambda_3/2 \times n_1 + \alpha_1$ ($n_1$ denotes an integer equal to or larger than 0, $-\lambda_3/4 \leq \alpha_1 < \lambda_3/4$), the signal strength S31 at the position of the terminal 3e is determined by the value of $\alpha_1$. In other words, the value of $\alpha_1$ can be derived from the signal strength S31. Likewise, when a standing wave is generated from the position detection signal with the frequency f4 and the signal strength (signal strength of the standing wave, i.e., amplitude of the standing wave) is detected at the terminal 3e, if the distance d3 from the end surface 16b to the terminal 3e is expressed as $d3 = \lambda_4/2 \times n_2 + \alpha_2$ ($n_2$ denotes an integer equal to or larger than 0, $-\lambda_4/4 \leq \alpha_1 < \lambda_4/4$), the signal strength S32 at the terminal 3e is determined by the value of $\alpha_2$. In other words, the value of $\alpha_2$ can be derived from the signal strength S32. When the values of $\alpha_1$ and $\alpha_2$ are derived from the signal strength S31 and S32, the values of $n_1$ and $n_2$ are determined by the above relational equation: $d3 = \lambda_3/2 \times n_1 + \alpha_1 = \lambda_4/2 \times n_2 + \alpha_2$. Hence the distance d3 from the end surface 16b to the terminal 3e is given by the equation. Depending on how the frequencies f3 and f4 are selected, the distance d3 from the end surface 16b to the terminal 3e may not be determined by the position detection signal with the frequency f3 and the position detection signal with the frequency f4. In such a case, signal strength measurement is carried out using a position detection signal with a different frequency, in addition to the position detection signal with the frequency f3 and the position detection signal with the frequency f4, and the result of measurement is included in distance calculation to identify the distance d3 from the end surface 16b to the terminal 3e. This process applies also to cases of signal strength detection at the terminals 3 other than the terminal 3e, in which cases the distance d3 from the end surface 16b to each terminal 3 can be identified in the above manner.

When the base unit 2 transmits the position detection signal, a standing wave is generated out of the position detection signal and a reflected wave of the position detection signal in the electromagnetic wave propagation medium 1c. In this condition, each terminal 3 detects the signal strength (signal strength of the standing wave, i.e., amplitude of the standing wave). After the standing wave disappears following the end of transmission of the position detection signal from the base unit 2, each terminal 3 transmits information of the signal strength to the base unit 2, which receives the incoming information. This process is repeated on a necessary basis as the frequency of the position detection signal is changed. In this manner, based on information of the signal strength detected by each terminal 3, the base unit 2 identifies the distance d3 from the end surface 16b to each terminal 3.

By combining information on the distance between each terminal 3 and the end surface 16b obtained in the above a manner and information on the shape of the electromagnetic wave propagation medium 1c (information on the placement-allowable positions of the terminals 3 on electromagnetic wave propagation medium 1c), which is obtained in advance, the position of each terminal 3 can be detected.

If the information on the shape of the electromagnetic wave propagation medium 1c (information on the placement-allowable positions of the terminals 3 on electromagnetic wave propagation medium 1c) is obtained in advance, when a standing wave is generated out of the position detection signal with the frequency f3 in the electromagnetic wave propagation medium 1c, what signal strength results at each of multiple terminal placement-allowable positions on the electromagnetic wave propagation medium 1c can be estimated based on the value of the frequency f3. Therefore, by checking estimated signal strength at each terminal placement-allowable position on the electromagnetic wave propagation medium 1c against the signal strength detected by each terminal 3, which terminal 3 is placed at which of multiple terminal placement-allowable positions on the electromagnetic wave propagation medium 1c can be determined. As a result, the position of each terminal 3 can be detected. If this position determination is difficult when only the measurement results on the position detection signal with the frequency f3 is used, measurement results on the position detection signal with the frequency f4 is additionally included in the position detection process, in which case the precision of detection of the position of each terminal 3 is improved. To further improve the precision of position detection, the number of frequencies used for the signal strength measurement may be increased.

The position detection signal transmitted by the base unit 2 may also be transmitted by some terminals 3. Because the shape of a standing wave in the electromagnetic wave propagation medium 1c does not depend on the position of the base unit or terminal having transmitted the signal, the positional relation between different terminals can be identified based on the standing wave.

It is preferable that the communication device of the terminal 3 be weakly coupled electrically to the electromagnetic wave propagation medium 1c and that the amount of absorption of the signal power by the terminal 3 when it receives the signal be small. If the amount of absorption of the signal power by the terminal 3 when it receives the signal is large, the reflected wave turns out to be weaker, in which case a power difference between the antinodes and the nodes of the standing wave is small.

It is also preferable that each of intervals between the terminals 3 be the integral multiple of the half of wavelength ($\lambda/2$) of the communication signal. A standing wave is generated also out of the communication signal in the electromagnetic wave propagation medium 1c (in such a way that the standing wave is formed of the communication signal and a reflection wave resulting from the reflection of the communication signal on the end surface 16b). If the terminals 3 are present at the positions of the antinodes of the standing wave (positions at which the amplitude of the standing wave becomes the maximum), respectively, which case is realized when each of intervals between the terminals 3 is determined to be the integral multiple of the half of wavelength of the communication signal, each terminal 3 receives strong signal power, which enables highly reliable communication.

Figure 28:
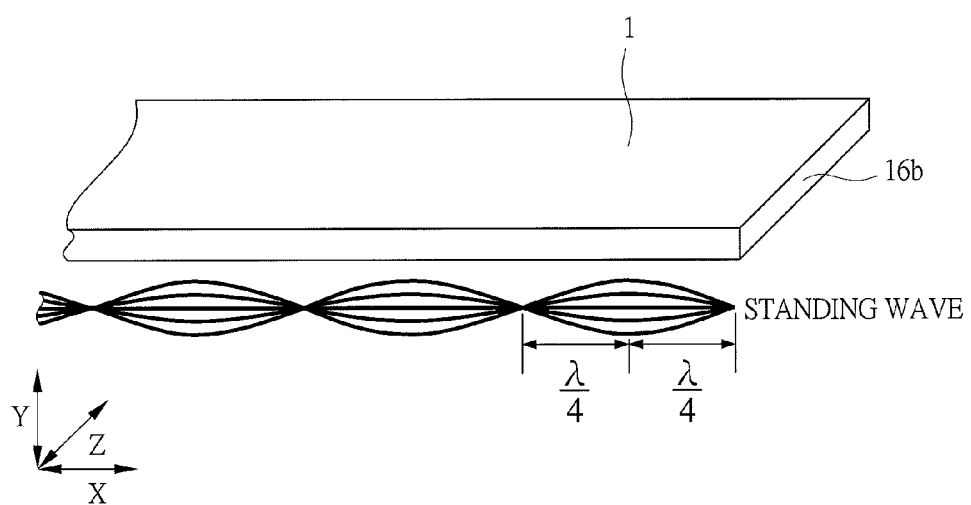
FIG. 28 is an explanatory diagram of a standing wave generated in the electromagnetic wave propagation medium.
Figure 29:
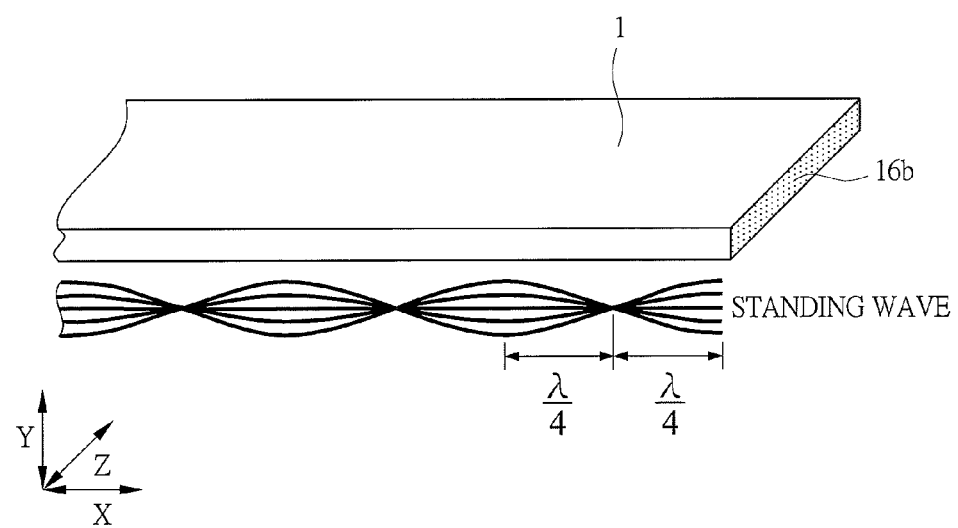
FIG. 29 is an explanatory diagram of a standing wave generated in the electromagnetic wave propagation medium.

FIGS. 28 and 29 are explanatory diagrams of a standing wave generated in the electromagnetic wave propagation medium 1c.

FIG. 28 depicts an example in which conductors that provides a short-circuiting connection between the upper and lower conductors (conductors 11 and 12) sandwiching the dielectric material (making up the electromagnetic wave propagation space 15) therebetween are formed on the end surface 16b of the electromagnetic wave propagation medium 1c. In the case of FIG. 28, because of the conductors formed on the end surface 16b, the amplitude of the electric field of a standing wave becomes the minimum on the end surface 16b and becomes the maximum at the position separated from the end surface 16b across a distance equivalent to ¼ of the signal wavelength (wavelength $\lambda$ of the position detection signal in the electromagnetic wave propagation medium 1c).

FIG. 29 depicts an example in which the upper and lower conductors (conductors 11 and 12) sandwiching the dielectric material (making up the electromagnetic wave propagation space 15) therebetween are left open to each other on the end surface 16b of the electromagnetic wave propagation medium 1c (which means that conductors that connect the upper and lower conductors are not formed on the end surface 16b so that the upper and lower conductors are left open to each other). In the case of FIG. 29, because such conductors are not formed on the end surface 16b, the amplitude of the electric field of a standing wave becomes the maximum on the end surface 16b and becomes the minimum at the position separated from the end surface 16b across a distance equivalent to ¼ of the signal wavelength (wavelength $\lambda$ of the position detection signal in the electromagnetic wave propagation medium 1c). While FIG. 27 depicts the standing wave generated in the case of FIG. 28, the standing wave in the case of FIG. 29 may be generated depending on the configuration of the end surface 16b.

Figure 30:
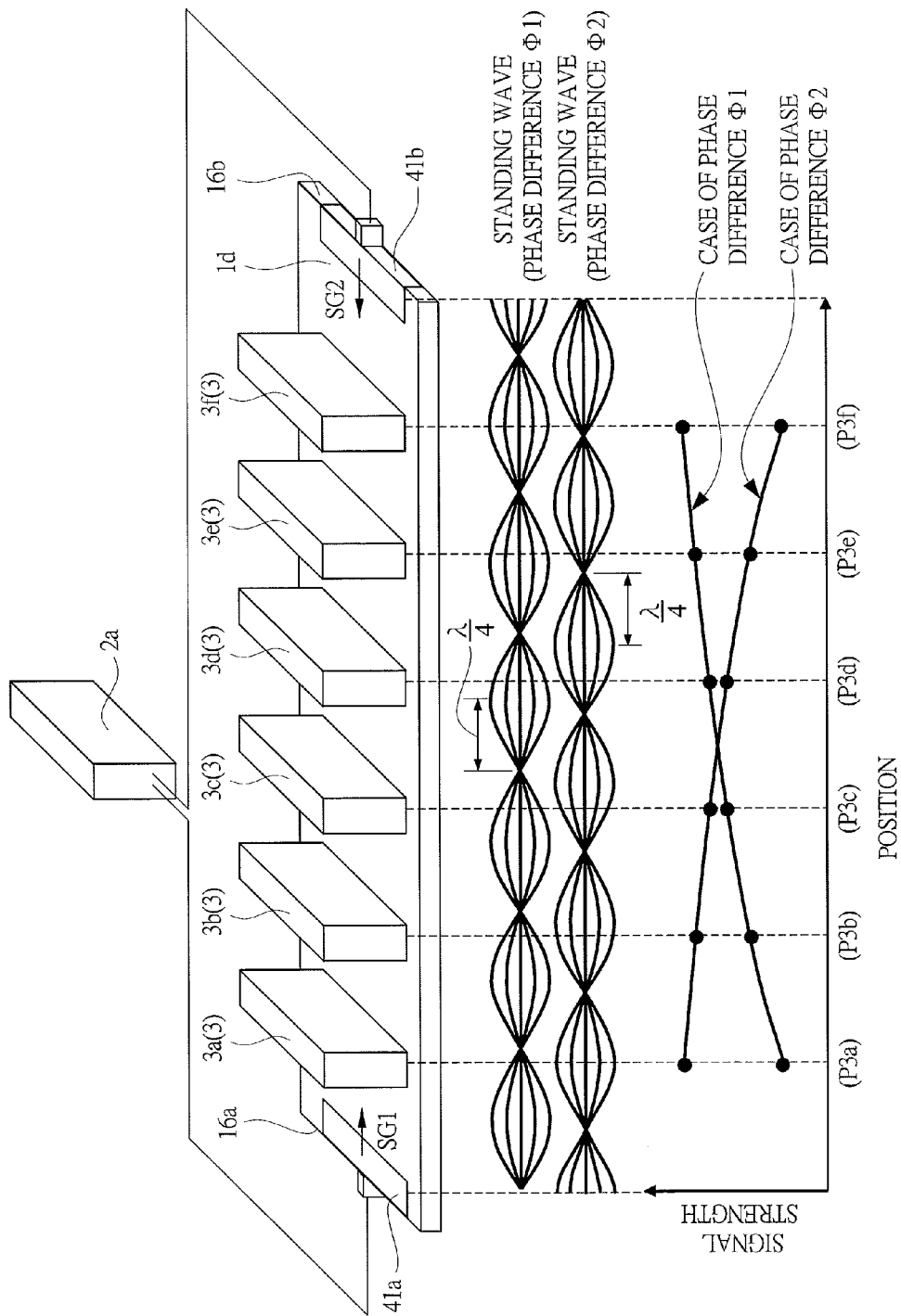
FIG. 30 is an explanatory diagram of another configuration example of the position detection system according to the fourth embodiment of the present invention.

FIG. 30 is an explanatory diagram (perspective view and a graph) of a configuration example of the position detection system (position detection apparatus) in which signals are input from multiple places to an electromagnetic wave propagation medium 1d, showing a diagram corresponding to the diagram of FIG. 27.

In the case of FIG. 30, the terminals 3 are placed (disposed) on the electromagnetic wave propagation medium 1d but a base unit 2a may not be placed (disposed) on the electromagnetic wave propagation medium 1d. The base unit 2a equivalent to the base unit 2 that has a transmitting unit capable of transmitting two signals (SG1 and SG2) different in phase but identical in frequency, and can input the signals SG1 and SG2 to the electromagnetic wave propagation medium 1d through signal input/output units 41a and 41b of the electromagnetic wave propagation medium 1d. The signals SG1 and SG2 are identical in frequency with each other but different in phase from each other.

In the case of FIG. 30, the signal SG1 and signal SG2 can be input from different locations of the electromagnetic wave propagation medium 1d (signal input/output unit 41a and signal input/output unit 41*b*) to the electromagnetic wave propagation medium 1*d*. The signal SG1 and signal SG2 propagate through the electromagnetic wave propagation medium 1*d* in directions opposite to each other, thereby generates a standing wave as an interference wave. This case will be described in details.

In the case of the electromagnetic wave propagation medium 1*d* of FIG. 30, the signal input/output unit 41*a* is disposed on the end surface 16*a* of the electromagnetic wave propagation medium 1*d* and the signal input/output unit 41*b* is disposed on the end surface 16*b* of the electromagnetic wave propagation medium 1*d*. Multiple terminals 3 are arranged in a row in the direction of heading from the end surface 16*a* (signal input/output unit 41*a*) toward the end surface 16*b* (signal input/output unit 41*b*). Except this aspect, the electromagnetic wave propagation medium 1*d* is basically identical in configuration with the electromagnetic wave propagation medium 1, and therefore will not be described repeatedly.

The signal SG1 (first position detection electromagnetic wave) is transmitted (input) from the base unit 2*a* to the electromagnetic wave propagation medium 1*d* through the signal input/output unit 41*a*, while the signal SG2 (second position detection electromagnetic wave) is transmitted (input) from the base unit 2*a* to the electromagnetic wave propagation medium 1*d* through the signal input/output unit 41*b*. The signal SG1 transmitted (input) through the signal input/output unit 41*a* to the electromagnetic wave propagation medium 1*d* propagates through the electromagnetic wave propagation medium 1*d* in the direction of traveling toward the signal input/output unit 41*b* (end surface 16*b*), while the signal SG2 transmitted (input) through the signal input/output unit 41*b* to the electromagnetic wave propagation medium 1*d* propagates through the electromagnetic wave propagation medium 1*d* in the direction of traveling toward the signal input/output unit 41*a* (end surface 16*a*). As a result, in the electromagnetic wave propagation medium 1*d*, the signal SG1 traveling from the signal input/output unit 41*a* (end surface 16*a*) toward the signal input/output unit 41*b* (end surface 16*b*) and the signal SG2 traveling from the signal input/output unit 41*b* (end surface 16*b*) toward the signal input/output unit 41*a* (end surface 16*a*) join to create a standing wave as an interference wave. Specifically, the signals SG1 and SG2 having the same frequency but traveling in the directions opposite to each other through the electromagnetic wave propagation medium 1*d* are superposed on each other (synthesized together or interfere with each other) to generate the standing wave as the interference wave in the electromagnetic wave propagation medium 1*d*.

In this manner, the standing wave is generated in the electromagnetic wave propagation medium 1*d*, out of the signals SG1 and SG2 transmitted from the base unit 2*a*. The constructive parts (antinodes) and deconstructive parts (nodes) of the generated standing wave are determined by a phase difference between the signal SG1 and the signal SG2. By adjusting respective phases of the signals SG1 and SG2 transmitted by the base unit 2*a*, the phase difference between the signal SG1 and the signal SG2 can be adjusted. Through adjustment of this phase difference, therefore, the positions of the parts (antinodes) where the amplitude (amplitude of a magnetic field) of the standing wave generated in the electromagnetic wave propagation medium 1*d* becomes the maximum and deconstructive parts (nodes) where the amplitude of the same becomes the minimum can be controlled.

When the base unit 2 transmits the signals SG1 and SG2, a standing wave is generated out of the signals SG1 and SG2 in the electromagnetic wave propagation medium 1*d*. In this condition, each terminal 3 detects the signal strength (signal strength of the standing wave, i.e., amplitude of the standing wave). After the standing wave disappears following the end of transmission of the signals SG1 and SG2 from the base unit 2, each terminal 3 transmits information of the signal strength to the base unit 2, which receives the incoming information. This process is repeated on a necessary basis as either the frequencies of the signals SG1 and SG2 or the phase difference between the signals SG1 and SG2 or both the frequencies of the signals SG1 and SG2 and the phase difference between the signals SG1 and SG2 is changed (i.e., as the positions of the antinodes and nodes of the standing wave are adjusted). In this manner, based on information of the signal strength detected by each terminal 3, the base unit 2 identifies the distance from each of the signal input/output units 41*a* and 41*b* (end surfaces 16*a* and 16*b*) to each terminal 3.

By combining information on the distance from each of the signal input/output units 41*a* and 41*b* (end surfaces 16*a* and 16*b*) to each terminal 3 obtained in the above manner and information on the shape of the electromagnetic wave propagation medium 1*d* (information on the placement-allowable positions of the terminals 3 on electromagnetic wave propagation medium 1*d*), which is obtained in advance, the position of each terminal 3 can be detected.

For example, in FIG. 30, a standing wave generated out of the signals SG1 and SG2 having a phase difference $\Phi1$ is indicated as "standing wave (phase $\Phi1$)", and a standing wave generated out of the signals SG1 and SG2 having a phase difference $\Phi2$ is indicated as "standing wave (phase $\Phi2$)". The signals SG1 and SG2 have the same frequency and therefore have the same wavelength $\lambda$ in the electromagnetic wave propagation medium 1*d*. Hence the standing waves formed of the signals SG1 and SG2 alternately repeat the antinodes and nodes of the standing waves every time the standing waves advance by 4/1 of the wavelength $\lambda$ along the propagation direction of the signals SG1 and SG2. A change in the phase difference between the signals SG1 and SG2 causes the antinodes and nodes of the standing waves to shift along the electromagnetic wave propagation direction (in a case where the phase difference is changed but the frequencies are left as they are, intervals between the antinodes and nodes of the standing waves each remain $\lambda/4$.)

The signal strength (reception signal strength) at each terminal 3 is detected as the phase difference between the signal SG1 and the signal SG2 is adjusted (i.e., as the positions of the antinodes and nodes of the standing wave are adjusted). By combining information of the result of such signal strength detection with information on the shape of the electromagnetic wave propagation medium 1*d* (information on the placement-allowable positions of the terminals 3 on electromagnetic wave propagation medium 1*d*), the position of each terminal 3 can be detected. In detection of the signal strength at each terminal 3, if the frequencies of the position detection signals (signals SG1 and SG2) are also changed as the phase difference between signals SG1 and SG2 is changed, more precise position detection can be performed.

If the information on the shape of the electromagnetic wave propagation medium 1*d* (information on the placement-allowable positions of the terminals 3 on the electromagnetic wave propagation medium 1*d*) is obtained in advance, when a standing wave is generated out of the signals SG1 and SG2 having the same frequency f3 and the phase difference $\Phi1$ in the electromagnetic wave propagation medium 1*c*, what signal strength results at each of multiple terminal placement-allowable positions on the electromagnetic wave propagation medium 1*d* can be estimated based on the value of the frequency f3 and of the phase difference Φ1. Therefore, by checking estimated signal strength at each terminal placement-allowable position on the electromagnetic wave propagation medium 1*d* against the signal strength (reception signal strength) detected by each terminal 3, which terminal 3 is placed at which of multiple terminal placement-allowable positions on the electromagnetic wave propagation medium 1*d* can be determined. As a result, the position of each terminal 3 can be detected. If this position determination is difficult when only the measurement results in the case of the phase difference between the signals SG1 and SG2 being Φ1 is used, measurement results in the case of the phase difference between the signals SG1 and SG2 being Φ2 is additionally included in the position detection process, in which case the precision of detection of the position of each terminal 3 is improved. By adding measurement results in a case of adopting another phase difference between the signals SG1 and SG2 or measurement results in a case of determining the frequency of the signals SG1 and SG2 to be f4, the precision of detection of the position of each terminal 3 is father improved.

The method described referring to FIG. 27 (method of deriving the values of $\alpha_1$ and $\alpha_2$ from signal strength and identifying the distance d3) can be applied also to the configuration of FIG. 30. In such a case, the distance d3 in the case of FIG. 27 (distance from the end surface 16*b* to the terminal 3) is equivalent to the distance from the signal input/output unit 41*a* or 41*b* to the terminal 3. If the method described referring to FIG. 27 (method of deriving the values of $\alpha_1$ and $\alpha_2$ from signal strength and identifying the distance d3) is applied to the configuration of FIG. 30, the standing wave (antinodes and nodes of the standing wave) can be shifted based on the phase difference between the signals SG1 and SG2. This facilitates identifying the distance d3, thus improves the precision of detection of the position of each terminal 3.

When the frequency of the position detection signals (signals SG1 and SG2) is not changed, the distance between different terminals 3 (placement distance) is determined to be a distance not the integral multiple of the half of wavelength of the position detection signals (signals SG1 and SG2) ($\lambda/2$) which allows detection of the position of each terminal 3. This is because that the identical phase appears in the standing wave at intervals equivalent to the integral multiple of the half of wavelength of the position detection signals (signals SG1 and SG2) ($\lambda/2$) and placing multiple terminals 3 at the positions at which the identical phase appears makes distinguishing the terminals 3 from each other impossible. However, by combining the method of this embodiment with the methods of other embodiments, the terminals 3 can be distinguished from each other. Therefore, combining the method of this embodiment with the methods of other embodiments improves position detection precision.

The signals SG1 and SG2 attenuate in the electromagnetic wave propagation medium 1*d* and their power is absorbed by each terminal. As a result, a power difference between the antinodes and nodes of the standing wave becomes small. In such a case, a signal strength difference between different terminals 3 becomes small, which raises a possibility of an error in determining the position of each terminal. For this reason, when position detection is carried out at a location close to the signal input/output unit 41*a*, the amplitude of the input signal SG2 is made larger than the amplitude of the input signal SG1 so that an amplitude difference between the signal SG1 and the signal SG2 becomes small at the location close to the signal input/output unit 41*a*. Conversely, when position detection is carried out at a location close to the signal input/output unit 41*b*, the amplitude of the input signal SG1 is made larger than the amplitude of the input signal SG2 so that an amplitude difference between the signal SG1 and the signal SG2 becomes small at the location close to the signal input/output unit 41*b*. Through this process, a sufficient power difference between the antinodes and nodes of the standing wave can be ensured over the whole of the electromagnetic wave propagation medium 1*d*.

The signal strength at each terminal 3 is detected as the amplitude difference and phase difference between the signal SG1 and the signal SG2 are adjusted. Hence the distance between each terminal 3 and each of the signal input/output units 41*a* and 41*b* can be identified based on the amplitude difference between the signal SG1 and the signal SG2 and the power difference between the antinodes and nodes of the standing wave.

FIG. 31 is an explanatory diagram (perspective view) of a configuration example of the position detection system (position detection apparatus) in which signals are input from multiple places to an electromagnetic wave propagation medium 1*e*, showing a configuration example as a modification of the configuration example of FIG. 30.

In the same manner as in the case of FIG. 30, according to the position detection system of FIG. 31, the base unit 2*a* transmits (input) the position detection signals (signals SG1 and SG2) from two places to the electromagnetic wave propagation medium 1*e*. The electromagnetic wave propagation medium 1*e* has a shape created by bending the electromagnetic wave propagation medium 1 of FIG. 1. As a result, a signal transmitting unit of the base unit 2*a* is placed closer to the electromagnetic wave propagation medium 1*e*.

Specifically, the electromagnetic wave propagation medium 1*e* of FIG. 31 has electromagnetic wave propagation portions 42*a*, 42*b*, and 42, which are connected continuously (along the electromagnetic wave propagation direction) to make up the whole structure of the electromagnetic wave propagation medium 1*e*. The electromagnetic wave propagation portions 42*a* and the electromagnetic wave propagation portions 42*b* extend almost parallel with each other and are connected to each other via the electromagnetic wave propagation portions 42*c* extending almost perpendicular to the electromagnetic wave propagation portions 42*a* and 42*b*. Specifically, the electromagnetic wave propagation portion 42*a* extending from the end surface 16*a* (concealed by the base unit 2*a* in FIG. 31) in one direction is connected to the electromagnetic wave propagation portion 42*b*, which extends almost perpendicular to the electromagnetic wave propagation portions 42*a* and is connected to the electromagnetic wave propagation portion 42*c*, which extends almost parallel with the electromagnetic wave propagation portion 42*a* toward the end surface 16*b* in one direction. As a result, the end surface 16*a* and the end surface 16*b* are adjacent to each other across the same gap as the gap between the electromagnetic wave propagation portions 42*a* and the electromagnetic wave propagation portions 42*b*. Other aspects of the configuration of the electromagnetic wave propagation medium 1*e* are basically the same as the configuration the electromagnetic wave propagation medium 1 of FIG. 1.

On this electromagnetic wave propagation medium 1*e*, the base unit 2*a* is so placed as to bridge the electromagnetic wave propagation portions 42*a* and the electromagnetic wave propagation portions 42*b*. Specifically, the base unit 2*a* placed such that it bridges the vicinity of the end surface (end surface 16a) of the electromagnetic wave propagation portions 42a and the vicinity of the end surface (end surface 16b) of the electromagnetic wave propagation portions 42b. This allows the base unit 2a to input (transmit) the signal SG1 and the signal SG2 to the electromagnetic wave propagation portions 42a and the electromagnetic wave propagation portions 42b, respectively. The signal SG1 transmitted (input) from the base unit 2a to the electromagnetic wave propagation portions 42a propagates through the electromagnetic wave propagation portions 42a, the electromagnetic wave propagation portions 42c, and the electromagnetic wave propagation portions 42b in order, thus reaching the position of placement of the base unit 2a on the electromagnetic wave propagation portions 42b. The signal SG2 transmitted (input) from the base unit 2a to the electromagnetic wave propagation portions 42b propagates through the electromagnetic wave propagation portions 42b, the electromagnetic wave propagation portions 42c, and the electromagnetic wave propagation portions 42a in order, thus reaching the position of placement of the base unit 2a on the electromagnetic wave propagation portions 42a. Hence the signal SG1 and the signal SG2 propagating through the electromagnetic wave propagation medium 1e in directions reverse to each other create a standing wave as an interference wave in the electromagnetic wave propagation medium 1e.

In this manner, even if the shape of the electromagnetic wave propagation medium is changed into the shape of the electromagnetic wave propagation medium 1e, this embodiment applies to the electromagnetic wave propagation medium 1e as in the case of FIG. 30. In this embodiment, the electromagnetic wave propagation medium may be modified into various shapes, as described in the first embodiment.

FIG. 32 is an explanatory diagram (perspective view) of a configuration example of the position detection system (position detection apparatus) in which an electromagnetic wave propagation medium 1f is placed (disposed) under the base unit 2a and the terminals 3 housed in the housing and the base unit 2a inputs signals from multiple places to the electromagnetic wave propagation medium 1f.

In the case of FIG. 32, the base unit 2a and multiple terminals 3 arranged on the shelf board 5 are placed on the electromagnetic wave propagation medium 1f. The base unit 2a transmits (inputs) the signal SG1 and the signal SG2 as the position detection signals, to the electromagnetic wave propagation medium 1f.

Specifically, in the case of FIG. 32, the electromagnetic wave propagation medium 1f has electromagnetic wave propagation portions 43a and 43f placed on a shelf board 5a, an electromagnetic wave propagation portion 43b placed on a shelf board 5b, and an electromagnetic wave propagation portion 43c placed on a shelf board 5c. The electromagnetic wave propagation medium 1f also has an electromagnetic wave propagation portion 43d connecting the electromagnetic wave propagation portions 43a, 43b, and 43c continuously and integrally on one sides of the shelf boards 5a, 5b, and 5c, and an electromagnetic wave propagation portion 43e connecting the electromagnetic wave propagation portions 43f, 43b, and 43c continuously and integrally on the other sides of the shelf boards 5a, 5b, and 5c.

Hence the electromagnetic wave propagation portions 43a and 43f, the electromagnetic wave propagation portion 43b, and the electromagnetic wave propagation portion 43c are arranged vertically across gaps such that they are almost parallel with each other. On one sides of the shelf boards 5a, 5b, and 5c, the electromagnetic wave propagation portions 43a, 43b, and 43c are connected to each other via the electromagnetic wave propagation portion 43d extending almost perpendicular to the electromagnetic wave propagation portions 43a, 43b, and 43c. On the other sides of the shelf boards 5a, 5b, and 5c, the electromagnetic wave propagation portions 43f, 43b, and 43c are connected to each other via the electromagnetic wave propagation portion 43e extending almost perpendicular to the electromagnetic wave propagation portions 43f, 43b, and 43c. The electromagnetic wave propagation portion 43a and the electromagnetic wave propagation portion 43f are both placed on the shelf board 5a, where the electromagnetic wave propagation portion 43a and the electromagnetic wave propagation portion 43f are separated from each other across a gap formed between them. The area of the electromagnetic wave propagation portion 43a on the shelf boards 5a is larger than the area of the electromagnetic wave propagation portion 43f on the shelf boards 5a.

The terminals 3 are arranged on the electromagnetic wave propagation medium such that the terminals 3a to 3f are placed (disposed) on the electromagnetic wave propagation portion 43a, the terminals 3g to 3m are placed (disposed) on the electromagnetic wave propagation portion 43b, and the terminals 3n to 3t are placed (disposed) on the electromagnetic wave propagation portion 43c. The base unit 2a is so placed (disposed) as to bridge the electromagnetic wave propagation portion 43a and the electromagnetic wave propagation portion 43f near respective one ends of the electromagnetic wave propagation portion 43a and the electromagnetic wave propagation portion 43f that are opposite to each other. This allows the base unit 2a to input the signal SG1 and the signal SG2 to the electromagnetic wave propagation portion 43a and the electromagnetic wave propagation portion 43f, respectively.

The signal SG1 input from the base unit 2a to the electromagnetic wave propagation portion 43a takes two propagation paths. When taking the first propagation path, the signal SG1 leaves the position of placement of the base unit 2a on the electromagnetic wave propagation portion 43a, propagates through the electromagnetic wave propagation portion 43a, the electromagnetic wave propagation portion 43d, the electromagnetic wave propagation portion 43c, the electromagnetic wave propagation portion 43e, and the electromagnetic wave propagation portion 43f in order, and then reaches the position of placement of the base unit 2a on the electromagnetic wave propagation portion 43f. When taking the second propagation path, the signal SG1 leaves the position of placement of the base unit 2a on the electromagnetic wave propagation portion 43a, propagates through the electromagnetic wave propagation portion 43a, approximately the half of the electromagnetic wave propagation portion 43d, the electromagnetic wave propagation portion 43b, approximately the half of the electromagnetic wave propagation portion 43e, and the electromagnetic wave propagation portion 43f in order, and then reaches the position of placement of the base unit 2a on the electromagnetic wave propagation portion 43f.

The signal SG2 input from the base unit 2a to the electromagnetic wave propagation portion 43f takes two propagation paths. When taking the first propagation path, the signal SG2 leaves the position of placement of the base unit 2a on the electromagnetic wave propagation portion 43f, propagates through the electromagnetic wave propagation portion 43f, the electromagnetic wave propagation portion 43e, the electromagnetic wave propagation portion 43c, the electromagnetic wave propagation portion 43d, and the electromagnetic wave propagation portion 43a in order, and then reaches the position of placement of the base unit 2a on the electromagnetic wave propagation portion 43a. When taking the second propagation path, the signal SG2 leaves the position of placement of the base unit 2a on the electromagnetic wave propagation portion 43f, propagates through the electromagnetic wave propagation portion 43f, approximately the half of the electromagnetic wave propagation portion 43e, the electromagnetic wave propagation portion 43b, approximately the half of the electromagnetic wave propagation portion 43d, and the electromagnetic wave propagation portion 43a in order, and then reaches the position of placement of the base unit 2a on the electromagnetic wave propagation portion 43a.

The first propagation path for the signal SG1 and the first propagation path for the signal SG2 are identical in course but are reverse in direction to each other. The first propagation path for the signal SG1 and the second propagation path for the signal SG2 are identical in course but are reverse in direction to each other. The electromagnetic wave propagation medium 1f, therefore, has two electromagnetic wave propagation paths through each of which the signal SG1 and the signal SG2 propagate in directions reverse to each other.

Because the signal SG1 and the signal SG2 propagate through electromagnetic wave propagation medium if in directions reverse to each other, the signal SG1 and signal SG2 transmitted (input) from the base unit 2a create a standing wave as an interference wave in the electromagnetic wave propagation medium 1f. The standing wave may be generated as the standing wave extending over the whole of the electromagnetic wave propagation portions 43a, 43b, 43c, 43d, 43e, and 43f.

When such electromagnetic wave propagation medium 1f is used, the standing wave is generated in the electromagnetic wave propagation medium 1f in the above manner. By applying the position detection method of this embodiment (position detection method described with reference to FIGS. 27 and 30), therefore, the position of each terminal 3 can be detected.

Let position 44 represent the position at which the electromagnetic wave propagation portion 43b is connected to the electromagnetic wave propagation portion 43d and position 45 represent the position at which the electromagnetic wave propagation portion 43b is connected to the electromagnetic wave propagation portion 43e. The signal SG1 transmitted from the base unit 2a travels through the electromagnetic wave propagation portion 43a and approximately the half of the electromagnetic wave propagation portion 43d to reach the position 44, at which the signal SG1 branches into a signal that travels further through the electromagnetic wave propagation portion 43d to enter the electromagnetic wave propagation portion 43c and into a signal that enters the electromagnetic wave propagation portion 43b to travel therethrough. The signal SG2 transmitted from the base unit 2a travels through the electromagnetic wave propagation portion 43f and approximately the half of the electromagnetic wave propagation portion 43e to reach the position 45, at which the signal SG2 branches into a signal that travels further through the electromagnetic wave propagation portion 43e to enter the electromagnetic wave propagation portion 43c and into a signal that enters the electromagnetic wave propagation portion 43b to travel therethrough. In this manner, the position 44 serves as a point of branching for the signal SG1 and the position 45 serves as a point of branching for the signal SG2. It is preferable that a difference between the distance d5 between the position 44 and the position 45 that is measured along the electromagnetic wave propagation portions 43d, 43c, and 43e and the distance d4 between the position 44 and the position 45 that is measured along the electromagnetic wave propagation portion 43b (i.e., d5−d4) be the integral multiple of the wavelength of the position detection signal (signals SG1 and SG2), that is, d5−d4=λ×n be satisfied (n denotes an integer). When this condition is met, the electromagnetic wave propagating through the electromagnetic wave propagation portion 43b on the shelf board 5b and the electromagnetic wave propagating through the electromagnetic wave propagation portion 43c on the shelf board 5c are synthesized at the same phase, in which case the standing wave generated out of the signals SG1 and SG2 does not collapse, allowing a power difference between its antinodes (where the amplitude of the standing wave becomes the maximum) and nodes (where the amplitude of the standing wave becomes the minimum) to be kept large. Hence position detection precision is improved. In this manner, when multiple propagation paths for the electromagnetic wave (signals SG1 and SG2) are present in the electromagnetic wave propagation medium 1f, a difference in the lengths of the propagation paths should preferably be the integral multiple of the wavelength of the electromagnetic wave (signals SG1 and SG2) in the electromagnetic wave propagation medium 1f.

According to the design conception of the fourth embodiment, when detection of the positions of multiple communication devices (terminals 3) placed near the electromagnetic wave propagation medium (1c, 1d, 1e, 1f) is carried out, an interference wave (standing wave) is used, which is generated out of two or more electromagnetic waves (the position detection signal transmitted from the base unit 2 and a reflected wave of the position detection signal in the case of FIG. 27 and the signals SG1 and SG2 in the case of FIGS. 30 and 31) in the electromagnetic wave propagation medium (1c, 1d, 1e, 1f). In this case, as the positions of the parts (antinodes) where the amplitude of the interference wave (standing wave) in the electromagnetic wave propagation medium (1c, 1d, 1e, 1f) becomes the maximum and the parts (nodes) where the amplitude of the same becomes the minimum are adjusted by changing either the frequencies or phases of the electromagnetic waves or both of the frequencies and phases, the signal strength of the interference wave (standing wave) is detected by each of the communication devices (terminals 3). Hence the position of each of the communication devices (terminals 3) is detected based on the signal strength detected by each of the communication devices (terminals 3).

As described above, according to the configuration of the position detection system (position detection apparatus) of the fourth embodiment, the position of each terminal placed near the electromagnetic wave propagation medium can be detected. By generating a standing wave in the electromagnetic wave propagation medium and changing the positions of the antinodes (where the amplitude of the standing wave becomes the maximum) and nodes (where the amplitude of the standing wave becomes the minimum) of the standing wave, the position of each terminal can be detected.

The position of the terminal is detected by causing the position detection signal to be reflected by an end surface of the electromagnetic wave propagation medium to change the frequency of the position detection signal. This eliminates the need of terminating the end surface of the electromagnetic wave propagation medium with given impedance or providing the end surface with an electromagnetic wave absorber, thus allowing the electromagnetic wave propagation medium to be realized with low cost.

The base unit transmits position detection signals from multiple places to the electromagnetic wave propagation medium, in which the positions of the antinodes (where the amplitude of the standing wave becomes the maximum) and nodes (where the amplitude of the standing wave becomes the minimum) of the standing wave are adjusted through the phases and frequencies of the position detection signals. This increases a degree of freedom in adjusting the positions of the antinodes (where the amplitude of the standing wave becomes the maximum) and nodes (where the amplitude of the standing wave becomes the minimum), thus improving position detection precision.

By adjusting transmission power for transmitting position detection signals from multiple places to the electromagnetic wave propagation medium, a power difference between the antinodes (where the amplitude of the standing wave becomes the maximum) and nodes (where the amplitude of the standing wave becomes the minimum) of the standing wave can be increased in a given area of the electromagnetic wave propagation medium. As a result, a terminal present in the given area can be identified, which improves position detection precision.

When multiple propagation paths are created as a result of branching and rejoining of the electromagnetic wave propagation medium, a difference in the lengths of those paths (propagation path lengths) is determined to be the integral multiple of the wavelength of the position detection signal. This improves position detection precision.

It is clear that if a terminal has information for use in position detection, such a terminal becomes capable of position detection as the base unit is.

Using information on the shape of the electromagnetic wave propagation medium (information of the placement-allowable positions of the terminals on the electromagnetic wave propagation medium) for detection of the position enables highly precise position detection and also allows detection of the positions of terminals arranged two-dimensionally or three-dimensionally.

To increase a power difference between the antinodes (where the amplitude of the standing wave becomes the maximum) and nodes (where the amplitude of the standing wave becomes the minimum) of the standing wave, each terminal is electrically coupled weakly to the electromagnetic wave propagation medium. This makes coupler designing easy.

By determining each of intervals between the terminals 3 to be the integral multiple of the half of wavelength of the communication signal (i.e., n×λ/2, where n denotes an integer), highly reliable communication can also be realized.

The same frequency can be adopted as the frequency of the communication signal and position detection signal. As a result, highly reliable communication and highly precise position detection using a frequency that makes signal attenuation in the electromagnetic wave propagation medium less can be achieved simultaneously.

The terminals and the base unit may be incorporated in the system such that the base unit for position detection is installed temporarily and following completion of detection of the position of each terminal, the base unit for position detection is removed, and then the system including the terminals but not including the base unit is operated.

In the system including the terminals housed in the housing, the electromagnetic wave propagation medium is laid in the housing. This configuration allows detection of each terminal.

The fourth embodiment may be executed in combination with one or more of the first to third embodiments, in which case more precise position detection is performed.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention is not limited to the above embodiments but may be embodied as various modifications. For example, the above embodiments have been described in detail to give the understandable details of the present invention and should not be strictly interpreted as embodiments that always include every constituent element described herein. Part of a configuration example of one embodiment may be replaced with another configuration example of the same embodiment or with a configuration example of another embodiment. To a configuration example of one embodiment, another configuration example of the same embodiment or a configuration example of another embodiment may be added. Some of constituent elements of each embodiment may be deleted or replaced with other constituent elements or other constituent elements may be added to each embodiment.

INDUSTRIAL APPLICABILITY

The present invention is applicable to a position detection system using an electromagnetic wave propagation medium.

DESCRIPTION OF REFERENCE NUMERALS 1, 1a, 1b, 1c, 1d, 1e, 1f Electromagnetic wave propagation medium
2, 2a, 2b Base unit
3, 3a to 3t Terminal
Housing
5, 5a, 5b, 5c Shelf board
11, 12, 13, 14 Conductor
15 Electromagnetic wave propagation space
16a, 16b End surface
21a, 21b, 21c, 21d, 21e, 21f, 21g Electromagnetic wave propagation medium
21h, 21i, 21j, 21k, 21m Electromagnetic wave propagation medium portion
31a, 31b Communication device
32 Impedance adjuster
32 Coupler
33a, 33b Switch
34 Receiver
35 Transmitter
36 Impedance adjuster
41a, 41b Signal input/output unit
42a, 42b, 42c, 42d, 42e, 42f Electromagnetic wave propagation medium portion
44, 45 Position
P2, P3a, P3b, P3c, P3d, P3e, P3f, P4, P5 Position
SG1, SG2 Signal
SL, SL1a, SL1b, SL1c, SL1d, SL1e, SL1f Slot
$W_1, W_2, W_3, W_4$ Width
d1, d2, d3, d4, d5 Distance

The invention claimed is:

1. A position detection system comprising: a non-transitory electromagnetic wave propagation medium extending in a propagation direction of an electromagnetic wave and having an electromagnetic wave propagation space sandwiched between conductors in a direction perpendicular to the propagation direction; and a plurality of communication devices placed near the non-transitory electromagnetic wave propagation medium, wherein the plurality of communication devices include a first communication device whose position is known in advance, wherein the first communication device transmits a first position detection signal through the non-transitory electromagnetic wave propagation medium to the plurality of communication devices other than the first communication device and detects positions of a plurality of the communication devices other than the first communication device based on reception signal strength of the first position detection signal, and wherein the first position detection signal is different in frequency from a communication signal used for communication carried out between the plurality of communication devices through the non-transitory electromagnetic wave propagation medium, and is attenuated more heavily during its propagation through the non-transitory electromagnetic wave propagation medium than the communication signal.

2. The position detection system according to claim 1, wherein the non-transitory electromagnetic wave propagation medium includes:
a first conductor and a second conductor opposite to each other across the electromagnetic wave propagation space in a first direction perpendicular to the propagation direction; and a third conductor and a fourth conductor opposite to each other across the electromagnetic wave propagation space in a second direction perpendicular to the propagation direction and to the first direction, wherein a first distance between the first conductor and the second conductor along the first direction is equal to or smaller than a second distance between the third conductor and the fourth conductor along the second direction, and wherein a wavelength of the first position detection signal in the non-transitory electromagnetic wave propagation medium is larger than two times the second distance.

3. The position detection system according to claim 2, wherein a wavelength of the communication signal in the non-transitory electromagnetic wave propagation medium is equal to or smaller than the second distance.

4. The position detection system according to claim 3, wherein the first position detection signal has a frequency lower than that of the communication signal, wherein the first communication device transmits the first position detection signal and a second position detection signal having a frequency lower than that of the first position detection signal through the non-transitory electromagnetic wave propagation medium to the plurality of communication devices other than the first communication device, and
wherein the positions of the plurality of communication devices other than the first communication device are detected based on reception signal strength of the first position detection signal and reception signal strength of the second position detection signal.

5. The position detection system according to claim 1, wherein the plurality of communication devices includes the first communication device and a second communication device, wherein the second communication device transmits a second position detection signal to a plurality of the communication devices other than the first and second communication devices, wherein the positions of the plurality of communication devices other than the first communication device are detected based on reception signal strength of the first position detection signal and reception signal strength of the second position detection signal, and wherein the first position detection signal and the second position detection signal are attenuated more heavily during their propagation through the non-transitory electromagnetic wave propagation medium than the communication signal.

6. The position detection system according to claim 1, wherein the positions of the plurality of communication devices other than the first communication device are detected based on information of reception signal strength of the first position detection signal and information on placement-allowable positions of the plurality of communication devices in the non-transitory electromagnetic wave propagation medium.

7. The position detection system according to claim 2, wherein the non-transitory electromagnetic wave propagation medium has a first area and a second area that are different in the second distance from each other, wherein the second distance in the first area is longer than the second distance in the second area, wherein the first communication device is placed in the first area of the non-transitory electromagnetic wave propagation medium, wherein the first communication device transmits the first position detection signal and a second position detection signal having a frequency higher than that of the first position detection signal through the non-transitory electromagnetic wave propagation medium to the plurality of communication devices other than the first communication device, and detects positions of the plurality of communication devices other than the first communication device based on reception signal strength of the first position detection signal and reception signal strength of the second position detection signal, wherein a wavelength of the communication signal in a non-transitory electromagnetic wave propagation medium is equal to or shorter than two times the second distance in the second area, wherein a wavelength of the first position detection signal in the non-transitory electromagnetic wave propagation medium is equal to or longer than two times the second distance in the first area, and wherein a wavelength of the second position detection signal in the non-transitory electromagnetic wave propagation medium is equal to or shorter than two times the second distance in the first area and is longer than two times the second distance in the second area.

8. A position detection system comprising:
a non-transitory electromagnetic wave propagation medium extending in a propagation direction of an electromagnetic wave and having an electromagnetic wave propagation space sandwiched between conductors in a direction perpendicular to the propagation direction; and a plurality of communication devices placed near the non-transitory electromagnetic wave propagation medium, wherein the plurality of communication devices include a first communication device whose position is known in advance, wherein, when a position of a second communication device among the plurality of communication devices is detected, the first communication device transmits a position detection signal multiple times through the non-transitory electromagnetic wave propagation medium to the second communication device as reception states of a plurality of the communication devices other than the first and second communication devices are switched, wherein, because of the reception state switching, the plurality of the communication devices other than the first and second communication devices change a rate of absorption of power of the position detection signal propagating through the non-transitory electromagnetic wave propagation medium, and wherein the position of the second communication device is detected based on signal reception strength of the position detection signal received by the second communication device multiple times.

9. The position detection system of claim 8, wherein each of the plurality of communication devices other than the first communication device has an antenna coupled to the non-transitory electromagnetic wave propagation medium, and wherein the reception state switching is carried out by electrically connecting or disconnecting a receiver incorporated in the communication device to or from the antenna.

10. The position detection system of claim 8, wherein each of the plurality of communication devices other than the first communication device has an antenna coupled to the non-transitory electromagnetic wave propagation medium, and wherein the reception state switching is carried out by adjusting impedance matching between a receiver incorporated in the communication device and the antenna.

11. A position detection system comprising: a non-transitory electromagnetic wave propagation medium extending in a propagation direction of an electromagnetic wave and having an electromagnetic wave propagation space sandwiched between conductors in a direction perpendicular to the propagation direction; and a plurality of communication devices placed near the non-transitory electromagnetic wave propagation medium, wherein the non-transitory electromagnetic wave propagation medium has a first end surface and a second end surface located opposite to each other in the propagation direction, and when detection of positions of the plurality of communication devices is carried out, an interference wave is generated by a first position detection signal which is input to the non-transitory electromagnetic wave propagation medium and propagates through the non-transitory electromagnetic wave propagation medium from the first end surface to the second end surface and a second position detection signal which propagates through the non-transitory electromagnetic wave propagation medium from the second end surface to the first end surface, the second position detection signal is a reflected wave resulting from reflection of the first position detection signal on the second end surface of the non-transitory electromagnetic wave propagation medium, or a position detection signal which is input to the non-transitory electromagnetic wave propagation medium from the second end surface and identical in frequency with, but different in phase from, the first position detection signal, a distance between each of the communication devices and the second end surface is detected based on signal strength of the interference wave detected by each of the plurality of communication devices, and a position of the plurality of communication devices is detected by information on the distance between each of the communication devices and the second end surface and information on a shape of the non-transitory electromagnetic wave propagation medium.

12. The position detection system according to claim 11, wherein the second position detection signal is a reflected wave resulting from reflection of the first position detection signal on the second end surface of the non-transitory electromagnetic wave propagation medium, and when detection of positions of the plurality of communication devices is carried out, signal strength of the interference wave is detected by the plurality of communication devices as positions of a part of the interference wave where an amplitude of the interference wave becomes maximum and a part of the interference wave where the amplitude becomes minimum in the non-transitory electromagnetic wave propagation medium are adjusted by changing a frequency of the first position detection signal, and a distance between each of the communication devices and the second end surface is detected based on the signal strength of the interference wave detected by each of the plurality of communication devices.

13. The position detection system according to claim 11, wherein the second position detection signal is a position detection signal which is input to the non-transitory electromagnetic wave propagation medium from the second end surface and identical in frequency with, but different in phase from, the first position detection signal, and when detection of positions of the plurality of communication devices is carried out, signal strength of the interference wave is detected by the plurality of communication devices as positions of a part of the interference wave where an amplitude of the interference wave becomes maximum and a part of the interference wave where the amplitude becomes minimum in the non-transitory electromagnetic wave propagation medium are adjusted by changing either a frequency or a phase difference of the first position detection signal and the second position detection signal or both frequency and phase difference of the first position detection signal and the second position detection signal, while maintaining that the first position detection signal is identical in frequency with the second position detection signal, and a distance between each of the communication devices and the second end surface is detected based on signal strength of the interference wave detected by each of the plurality of communication devices.

* * * * *